US012146966B2

(12) United States Patent
Kato et al.

(10) Patent No.: US 12,146,966 B2
(45) Date of Patent: Nov. 19, 2024

(54) DISTANCE MEASUREMENT APPARATUS, INFORMATION PROCESSING METHOD, AND INFORMATION PROCESSING APPARATUS

(71) Applicant: Panasonic Intellectual Property Management Co., Ltd., Osaka (JP)

(72) Inventors: Yumiko Kato, Osaka (JP); Yasuhisa Inada, Osaka (JP); Toshiyasu Sugio, Osaka (JP); Noritaka Iguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 341 days.

(21) Appl. No.: 17/529,239

(22) Filed: Nov. 17, 2021

(65) Prior Publication Data

US 2022/0075077 A1    Mar. 10, 2022

Related U.S. Application Data

(63) Continuation of application No. PCT/JP2020/022058, filed on Jun. 4, 2020.

(30) Foreign Application Priority Data

Jul. 26, 2019    (JP) .................................. 2019-138193
Nov. 14, 2019    (JP) .................................. 2019-206498

(51) Int. Cl.
  *G01S 17/00*     (2020.01)
  *G01S 7/48*      (2006.01)
  *G01S 17/931*    (2020.01)

(52) U.S. Cl.
  CPC .......... *G01S 17/931* (2020.01); *G01S 7/4808* (2013.01); *G06T 2207/10028* (2013.01)

(58) Field of Classification Search
  CPC ................. G01S 17/931; G01S 7/4808; G06T 2207/10028

(Continued)

(56) References Cited

U.S. PATENT DOCUMENTS

2014/0064555 A1    3/2014  Sebastian et al.
2018/0136333 A1    5/2018  Masuda et al.
(Continued)

FOREIGN PATENT DOCUMENTS

JP    10-021401      1/1998
JP    2009-294128    12/2009
(Continued)

OTHER PUBLICATIONS

International Search Report of PCT application No. PCT/JP2020/022058 dated Aug. 25, 2020.

*Primary Examiner* — Tiffany P Young
(74) *Attorney, Agent, or Firm* — Rimon P.C.

(57) ABSTRACT

A distance measurement apparatus comprises a light emitter that emits a plurality of light beams toward a scene in different directions and at different timings, a light receiver that includes an array of a plurality of light-receiving elements and detects reflected light from the scene produced by the emission of each light beam with the plurality of light-receiving elements, and a signal processing circuit that generates and outputs output data including measurement data indicating the positions or distances of a plurality of points in the scene on the basis of a signal outputted by the light receiver. The output data includes the data of a plurality of blocks, and individual time data is attached to each of the plurality of blocks.

18 Claims, 55 Drawing Sheets

(58) Field of Classification Search
USPC .......................................................... 701/301
See application file for complete search history.

(56) References Cited

U.S. PATENT DOCUMENTS

| | | | |
|---|---|---|---|
| 2018/0217258 | A1 | 8/2018 | Hirasawa et al. |
| 2018/0364333 | A1 | 12/2018 | Jungwirth et al. |
| 2019/0146504 | A1* | 5/2019 | Lee .......................... B25J 19/02 |
| 2020/0011998 | A1* | 1/2020 | Koyama ................ G01S 7/4817 |
| 2020/0025931 | A1* | 1/2020 | Liang .................... G06F 18/251 |
| 2020/0183126 | A1* | 6/2020 | Zhou ..................... G02B 7/1821 |
| 2020/0333460 | A1 | 10/2020 | Tsuji et al. |

FOREIGN PATENT DOCUMENTS

| | | |
|---|---|---|
| JP | 2011-170599 | 9/2011 |
| JP | 2015-535925 | 12/2015 |
| JP | 2016-224062 | 12/2016 |
| JP | 2017-161500 | 9/2017 |
| JP | 2018-066574 | 4/2018 |
| JP | 2019-535014 | 12/2019 |
| WO | 2017/047687 | 3/2017 |
| WO | 2017/098966 | 6/2017 |
| WO | 2018/055449 | 3/2018 |
| WO | 2019/098263 | 5/2019 |

\* cited by examiner

FIG. 6A

| IMAGE SENSOR POSITION | IMAGE SENSOR NORMAL DIRECTION | IMAGE SENSOR ANGLE OF FIELD |
|---|---|---|
| (x1, y1, z1) | (X1, Y1, Z1) | (w1, h1) |

FIG. 6B

| BEAM DIRECTION | PIXEL RANGE | TIME |
|---|---|---|
| $(xx_1, yy_1, zz_1)$ | $(xs_1, ys_1)$ $(xe_1, ye_1)$ | $hh_1:mm_1',ss_1'',ms_1.\mu s_1$ |
| $(xx_2, yy_2, zz_2)$ | $(xs_2, ys_2)$ $(xe_2, ye_2)$ | $hh_2:mm_2',ss_2'',ms_2.\mu s_2$ |
| $(xx_3, yy_3, zz_3)$ | $(xs_3, ys_3)$ $(xe_3, ye_3)$ | $hh_3:mm_3',ss_3'',ms_3.\mu s_3$ |
| ⋮ | ⋮ | ⋮ |

FIG. 6C

| PIXEL | DISTANCE |
|---|---|
| (0, 0) | $dd_1$ |
| (0, 1) | $dd_2$ |
| (0, 2) | $dd_3$ |
| (0, 3) | $dd_4$ |
| ⋮ | ⋮ |

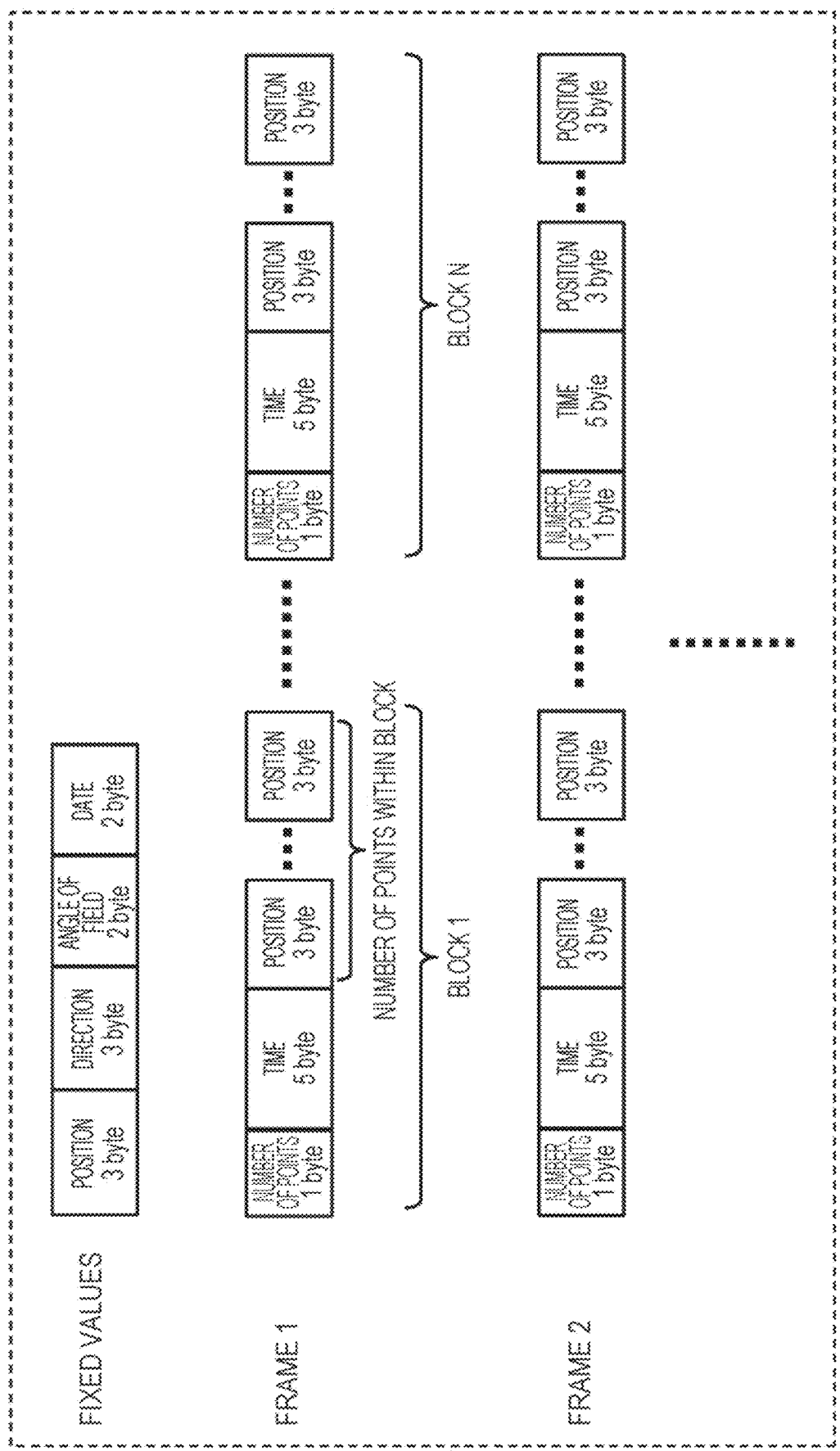

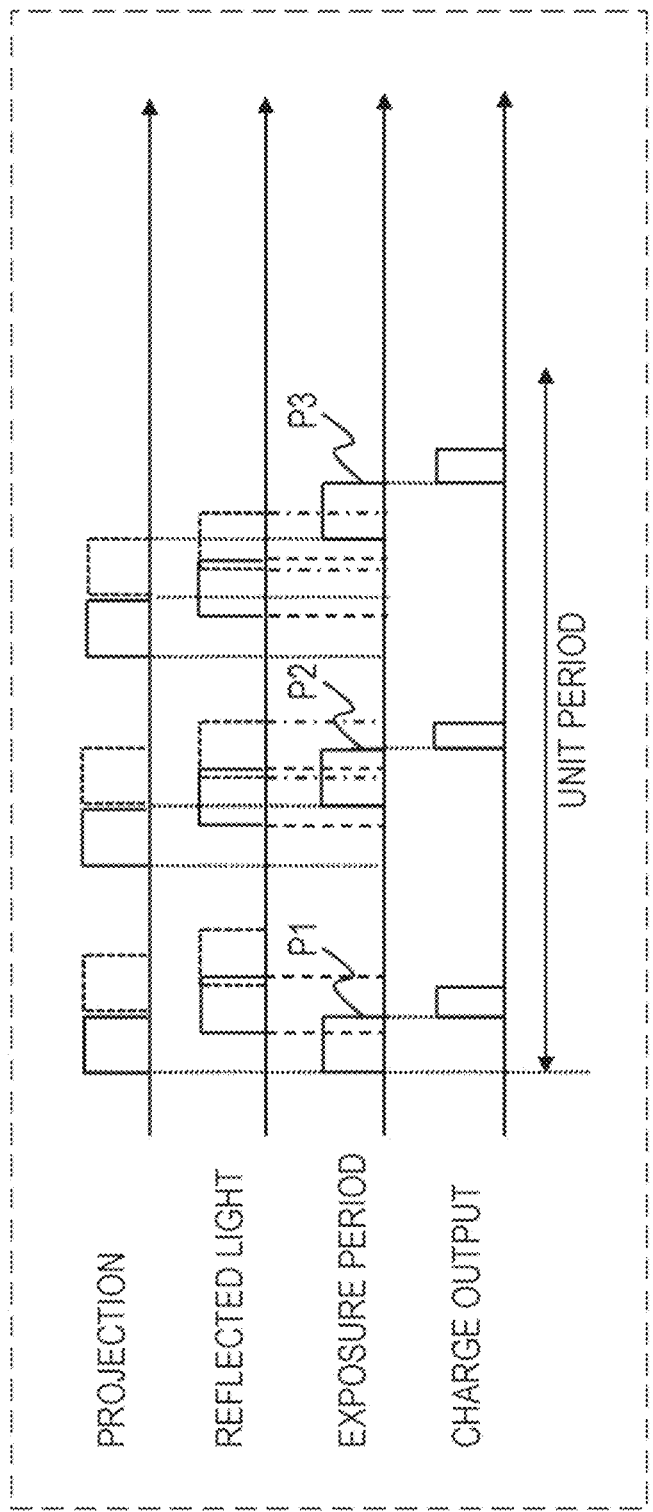

FIG. 20

| BEAM DIRECTION | PIXEL RANGE | STANDARD PIXEL RANGE |
|---|---|---|
| $(xx_1, yy_1, zz_1)$ | $(xs_{10}, 0)\ (xe_{10}, 0)$<br>$(xs_{11}, 1)\ (xe_{11}, 1)$<br>$(xs_{12}, 2)\ (xe_{12}, 2)$<br>$\vdots$<br>$(xs_{1ye}, ye)(xe_{1ye}, ye)$ | $(xs_1, ys_1)\ (xe_1, ye_1)$ |
| $(xx_2, yy_2, zz_2)$ | $(xs_{20}, 0)\ (xe_{20}, 0)$<br>$(xs_{21}, 1)\ (xe_{21}, 1)$<br>$(xs_{22}, 2)\ (xe_{22}, 2)$<br>$\vdots$<br>$(xs_{2ye}, ye)(xe_{2ye}, ye)$ | $(xs_2, ys_2)\ (xe_2, ye_2)$ |
| $\vdots$ | $\vdots$ | $\vdots$ |

FIG. 27

| BEAM SHAPE ID | BEAM DIRECTION | PIXEL RANGE | TIME |
|---|---|---|---|
| 001 | $(xx_{11}, yy_{11}, zz_{11})$<br>$(xx_{12}, yy_{12}, zz_{12})$<br>$(xx_{13}, yy_{13}, zz_{13})$<br>⋮ | $(xs_1,ys_1)(xe_1,ye_1)$<br>$(xs_2,ys_2)(xe_2,ye_2)$<br>$(xs_3,ys_3)(xe_3,ye_3)$<br>⋮ | $hh_1{:}mm_1',ss_1'',ms_1.\mu s_1$<br>$hh_2{:}mm_2',ss_2'',ms_2.\mu s_2$<br>$hh_3{:}mm_3',ss_3'',ms_3.\mu s_3$<br>⋮ |
| 002<br>⋮ | $(xx_{21}, yy_{21}, zz_{21})$<br>$(xx_{22}, yy_{22}, zz_{22})$<br>$(xx_{23}, yy_{23}, zz_{23})$<br>⋮ | $(xs_1,ys_1)(xe_1,ye_1)$<br>$(xs_2,ys_2)(xe_2,ye_2)$<br>$(xs_3,ys_3)(xe_3,ye_3)$<br>⋮ | $hh_1{:}mm_1',ss_1'',ms_1.\mu s_1$<br>$hh_2{:}mm_2',ss_2'',ms_2.\mu s_2$<br>$hh_3{:}mm_3',ss_3'',ms_3.\mu s_3$<br>⋮ |

FIG. 30

| BEAM TYPE | BEAM DIRECTION | PIXEL RANGE | TIME |
|---|---|---|---|
| FLASH |  | $(xs_{f0}, 0)$ $(xe_{f0}, 0)$<br>$(xs_{f1}, 1)$ $(xe_{f1}, 1)$<br>$(xs_{f2}, 2)$ $(xe_{f2}, 2)$<br>$\vdots$ | $hh_f{:}mm_f{'},ss_f{''},ms_f,\mu s_f$ |
| BEAM | $(xx_{11}, yy_{11}, zz_{11})$<br>$(xx_{12}, yy_{12}, zz_{12})$<br>$(xx_{13}, yy_{13}, zz_{13})$<br>$\vdots$ | $(xs_1, ys_1)\ (xe_1, ye_1)$<br>$(xs_2, ys_2)\ (xe_2, ye_2)$<br>$(xs_3, ys_3)\ (xe_3, ye_3)$<br>$\vdots$ | $hh_1{:}mm_1{'},ss_1{''},ms_1,\mu s_1$<br>$hh_2{:}mm_2{'},ss_2{''},ms_2,\mu s_2$<br>$hh_3{:}mm_3{'},ss_3{''},ms_3,\mu s_3$<br>$\vdots$ |

FIG. 32

| BEAM DIRECTION | PIXEL RANGE | TIME |
|---|---|---|
| $(xx_{11}, yy_{11}, zz_{11})$<br>$(xx_{12}, yy_{12}, zz_{12})$ | $(xs_{11}, ys_{11})(xe_{11}, ye_{11})$<br>$(xs_{12}, ys_{12})(xe_{12}, ye_{12})$ | $hh_1:mm_1',ss_1'',ms_1.\mu s_1$ |
| $(xx_{21}, yy_{21}, zz_{21})$<br>$(xx_{22}, yy_{22}, zz_{22})$ | $(xs_{21}, ys_{21})(xe_{21}, ye_{21})$<br>$(xs_{22}, ys_{22})(xe_{22}, ye_{22})$ | $hh_2:mm_2',ss_2'',ms_2.\mu s_2$ |
| ⋮ | ⋮ | ⋮ |

FIG. 34A

| EXPOSURE PERIOD | EXPOSURE TIME |
|---|---|
| a | $hh_{a1}:mm_{a1}',ss_{a1}'',ms_{a1}.\mu s_{a1}$ <br> $hh_{a2}:mm_{a2}',ss_{a2}'',ms_{a2}.\mu s_{a2}$ <br> $hh_{a3}:mm_{a3}',ss_{a3}'',ms_{a3}.\mu s_{a3}$ <br> ⋮ |
| b | $hh_{b1}:mm_{b1}',ss_{b1}'',ms_{b1}.\mu s_{b1}$ <br> $hh_{b2}:mm_{b2}',ss_{b2}'',ms_{b2}.\mu s_{b2}$ <br> $hh_{b3}:mm_{b3}',ss_{b3}'',ms_{b3}.\mu s_{b3}$ <br> ⋮ |

FIG. 34B

| PIXEL RANGE | TIME |
|---|---|
| $(xs_1,ys_1)(xe_1,ye_1)$ | $hh_1:mm_1',ss_1'',ms_1.\mu s_1$ |
| $(xs_2,ys_2)(xe_2,ye_2)$ | $hh_2:mm_2',ss_2'',ms_2.\mu s_2$ |
| $(xs_3,ys_3)(xe_3,ye_3)$ | $hh_3:mm_3',ss_3'',ms_3.\mu s_3$ |
| ⋮ | ⋮ |

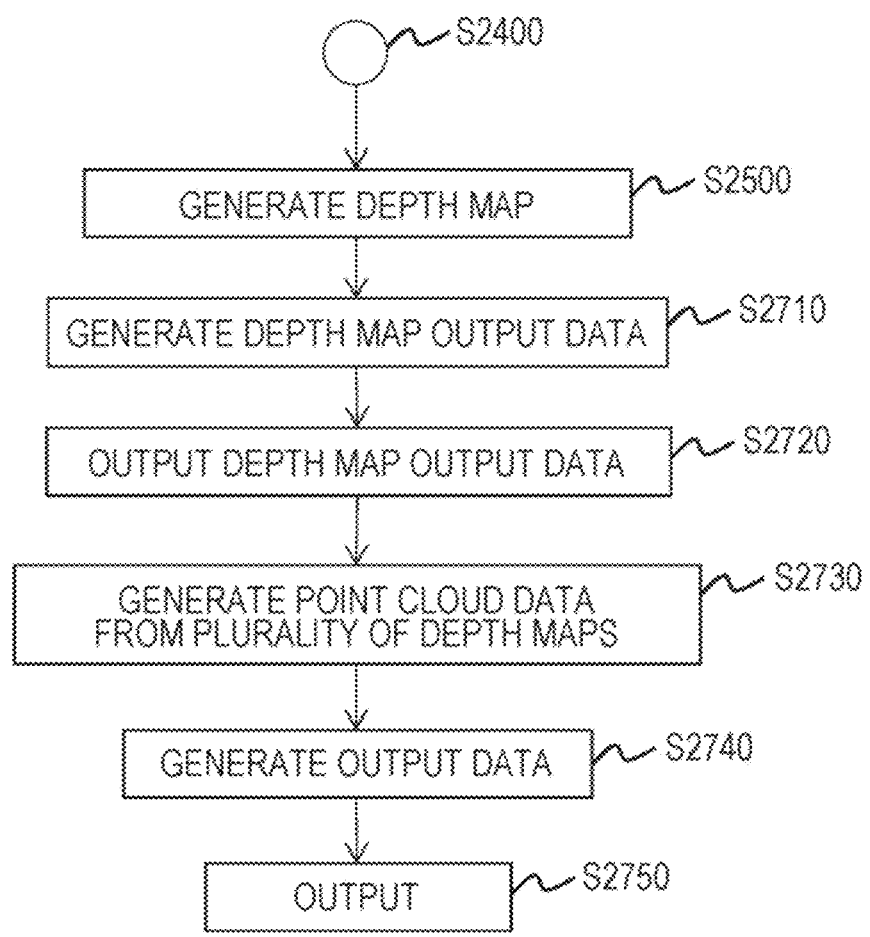

FIG. 40A

```
FIXED VALUE: xxx
NUMBER OF BLOCKS IN FRAME: N
DATE: YYYY-MM-DD
TIME INFORMATION T0: $hh_0:mm_0':ss_0'',ms_0,\mu s_0$
TIME INFORMATION T1: $hh_1:mm_1':ss_1'',ms_1,\mu s_1$
  :
TIME INFORMATION T(N-1): $hh_{n-1}:mm_{n-1}':ss_{n-1}'',ms_{n-1},\mu s_{n-1}$
TOTAL NUMBER OF POINTS IN POINT CLOUD: NumOfPoint
POINT P0: (x0,y0,z0,T0) *POSITION INFORMATION + TIME ID
POINT P1: (x1,y1,z1,T0)
POINT P2: (x2,y2,z2,T1)
  :
POINT Pn: (xn,yn,zn,T5)
  :
```

FIG. 42

| SPACE-TIME COORDINATES | ACQUISITION SOURCE |
|---|---|
| $(x_{11}, y_{11}, d_{11}, t_{11})$ | DISTANCE MEASUREMENT APPARATUS 1 |
| $(x_{12}, y_{12}, d_{12}, t_{12})$ | DISTANCE MEASUREMENT APPARATUS 1 |
| ⋮ | ⋮ |
| $(x_{21}, y_{21}, d_{21}, t_{21})$ | DISTANCE MEASUREMENT APPARATUS 2 |
| $(x_{22}, y_{22}, d_{22}, t_{22})$ | DISTANCE MEASUREMENT APPARATUS 2 |
| ⋮ | ⋮ |

DISTANCE MEASUREMENT APPARATUS, INFORMATION PROCESSING METHOD, AND INFORMATION PROCESSING APPARATUS

BACKGROUND

1. Technical Field

The present disclosure relates to a distance measurement apparatus, an information processing method, and an information processing apparatus.

2. Description of the Related Art

In the related art, various devices that scan a space with light and receive reflected light from an object to measure the distance to the object have been proposed. Distance information for the target scene may be converted into three-dimensional point cloud data and used, for example. Typically, point cloud data is data in which a distribution of points where an object exists in a scene is expressed by three-dimensional coordinates.

Japanese Laid-open Patent Publication Nos. 2011-170599 and 2009-294128 disclose systems that acquire information about the distance to an object by scanning a space with a light beam and detecting reflected light from the object with a light sensor. The systems generate and output information associated with the measurement time of each point in the point cloud data.

Japanese Laid-open Patent Publication No. 2016-224062 and U.S. Patent Application No. 2018/0217258 disclose apparatuses that acquire distance information by scanning a space with a light beam and receiving reflected light from the object with an image sensor.

SUMMARY

One non-limiting and exemplary embodiment provides a technology related to the acquisition and processing of distance data or a depth map. For example, one aspect of the present disclosure provides a technology that facilitates the integration of depth map data or point cloud data generated individually by a plurality of apparatuses. Also, another aspect of the present disclosure provides a technology that facilitates the integration of depth map data or point cloud data with other data.

In one general aspect, the techniques disclosed here feature a distance measurement apparatus including a light emitter that emits a plurality of light beams toward a scene in different directions and at different timings, a light receiver that includes an array of a plurality of light-receiving elements and detects reflected light from the scene produced by the emission of each light beam with the plurality of light-receiving elements, and a signal processing circuit that generates and outputs output data including measurement data indicating the positions or distances of a plurality of points in the scene on the basis of a signal outputted by the light receiver. The output data includes the data of a plurality of blocks with individual time data is attached to each of the plurality of blocks, and each of the plurality of blocks includes the measurement data of a plurality of points measured using the same light beam from among the plurality of light beams.

It should be noted that general or specific embodiments may be implemented as a system, an apparatus, a method, an integrated circuit, a computer program, a computer-readable recording medium such as a recording disk, or any selective combination thereof. Computer-readable recording media include volatile recording media as well as non-volatile recording media such as Compact Disc-Read-Only Memory (CD-ROM). An apparatus may also include one or more apparatuses. In the case where an apparatus includes two or more apparatuses, the two or more apparatuses may be disposed inside a single piece of equipment or disposed separately in two or more discrete pieces of equipment. In the specification and claims herein, an "apparatus" may not only refer to a single apparatus, but also to a system including a plurality of apparatuses.

According to an aspect of the present disclosure, the integration of data including depth map data or point cloud data is facilitated.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6A is a first diagram illustrating an example of information recorded to a recording medium;

FIG. 6B is a second diagram illustrating an example of information recorded to a recording medium;

FIG. 6C is a third diagram illustrating an example of information recorded to a recording medium;

FIG. 7A is a diagram illustrating an example of an output data format;

FIG. 18B is a fourth diagram for explaining a distance measurement method by indirect ToF;

FIG. 20 is a diagram illustrating an example of information recorded to a block range storage unit;

FIG. 27 is a diagram illustrating an example of information recorded to a recording medium in Embodiment 2;

FIG. 30 is a diagram illustrating an example of information recorded to a recording medium in Embodiment 3;

FIG. 32 is a diagram illustrating an example of information recorded to a recording medium in Embodiment 4;

FIG. 34A is a diagram illustrating an example of information recorded to a recording medium in Embodiment 5;

FIG. 34B is a diagram illustrating an example of information recorded to a recording medium in Embodiment 5;

FIG. 37 is a diagram illustrating a portion of operations by a distance measurement apparatus in Embodiment 6;

FIG. 40A is a diagram illustrating an example of a data format of encoded point cloud data;

FIG. 42 is a diagram illustrating an example of data recorded to a recording medium in the vehicle control system;

DETAILED DESCRIPTION

In the present disclosure, all or part of the circuits, units, devices, members, or sections, or all or part of the function blocks in the block diagrams, may also be executed by one or multiple electronic circuits, including a semiconductor device, a semiconductor integrated circuit (IC), or a large-scale integration (LSI) chip, for example. An LSI chip or IC may be integrated into a single chip, or may be configured by combining multiple chips. For example, function blocks other than memory elements may be integrated into a single chip. Although referred to as an LSI chip or IC herein, such electronic circuits may also be called a system LSI chip, a very large-scale integration (VLSI) chip, or an ultra-large-scale integration (ULSI) chip, depending on the degree of integration. A field-programmable gate array (FPGA) programmed after fabrication of the LSI chip, or a reconfigurable logic device in which interconnection relationships inside the LSI chip may be reconfigured or in which circuit demarcations inside the LSI chip may be set up, may also be used for the same purpose.

Furthermore, the function or operation of all or part of a circuit, unit, device, member, or section may also be executed by software processing. In this case, the software is recorded onto a non-transitory recording medium, such as one or multiple ROM modules, optical discs, or hard disk drives, and when the software is executed by a processor, the function specified by the software is executed by the processor and peripheral devices. A system or device may also be provided with one or multiple non-transitory recording media on which the software is recorded, a processor, and necessary hardware devices, such as an interface, for example.

<Example of Configuration to which Embodiments Described Later May be Applied>

Before describing the following embodiments, an example of a configuration to which the embodiment described later may be applied will be described.

Figure 1:
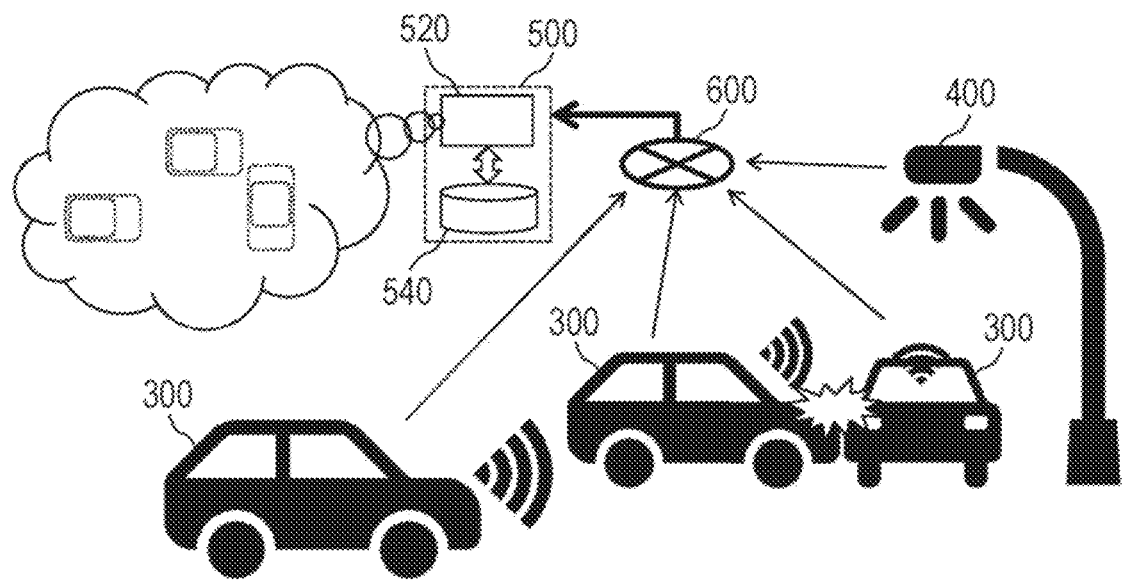
FIG. 1 is a conceptual diagram schematically illustrating a system that monitors a traffic environment.

FIG. 1 is a conceptual diagram schematically illustrating an example of a system including a server 500 that monitors the traffic conditions of a road. The server 500 is connected, over a network 600, to a distance measurement apparatus installed onboard moving bodies 300 such as vehicles and also to a distance measurement apparatus provided in a stationary system 400 such as a traffic signal. The stationary system 400 may also be a system provided in a stationary object other than a traffic signal, including public property or other infrastructure such as lighting equipment, a utility pole, or a guard rail, for example. Each distance measurement apparatus is provided with a light source and a light sensor, and successively generates and outputs sensor data including distance information. The sensor data is data indicating a depth map or a three-dimensional point cloud, for example. In the following description, a three-dimensional point cloud is simply referred to as a "point cloud" unless specifically indicated otherwise. Note that in this example, the distance measurement apparatuses provided in the moving bodies 300 and the stationary system 400 are provided with a light source and a light sensor, but some or all of the distance measurement apparatuses may also measure distance by some other method. For example, a distance measurement apparatus that measures distance by using radio waves such as millimeter waves may be used, or a distance measurement apparatus that measures distance by using a two-dimensional image acquired by one or multiple cameras may be used.

The server 500 acquires data indicating the position and attitude of the distance measurement apparatus and sensor data from each moving body 300 and each stationary system 400. The server 500 is provided with a processor 520 and a recording medium 540. The processor 520 successively combines the sensor data acquired from each of the distance measurement apparatuses to generate data indicating the road environment, and records the generated data to the recording medium 540. The processor 520 generates point cloud data expressed in a three-dimensional coordinate system specific to the server 500, for example. Such data may be used for the purpose of investigating the cause of an accident when an accident occurs, for example.

Note that in this example, the server 500 acquires data indicating the position and attitude of the distance measurement apparatus and sensor data from the moving bodies 300 and the stationary system 400, but the data to be acquired may also be the sensor data only. In this case, for example, the server 500 estimates the position and attitude of each distance measurement apparatus by using the sensor data acquired from each distance measurement apparatus.

Also, in this example, the point cloud data generated by the server 500 is expressed in a coordinate system specific to the server 500, but the coordinate system of the point cloud data generated by the server 500 does not need to be specific to the server 500. For example, it may be possible to designate the coordinate system of the point cloud to the server 500 from an external source, and the coordinate system of the point cloud data may be aligned with the coordinate system of three-dimensional map data used by the server 500.

Figure 2:
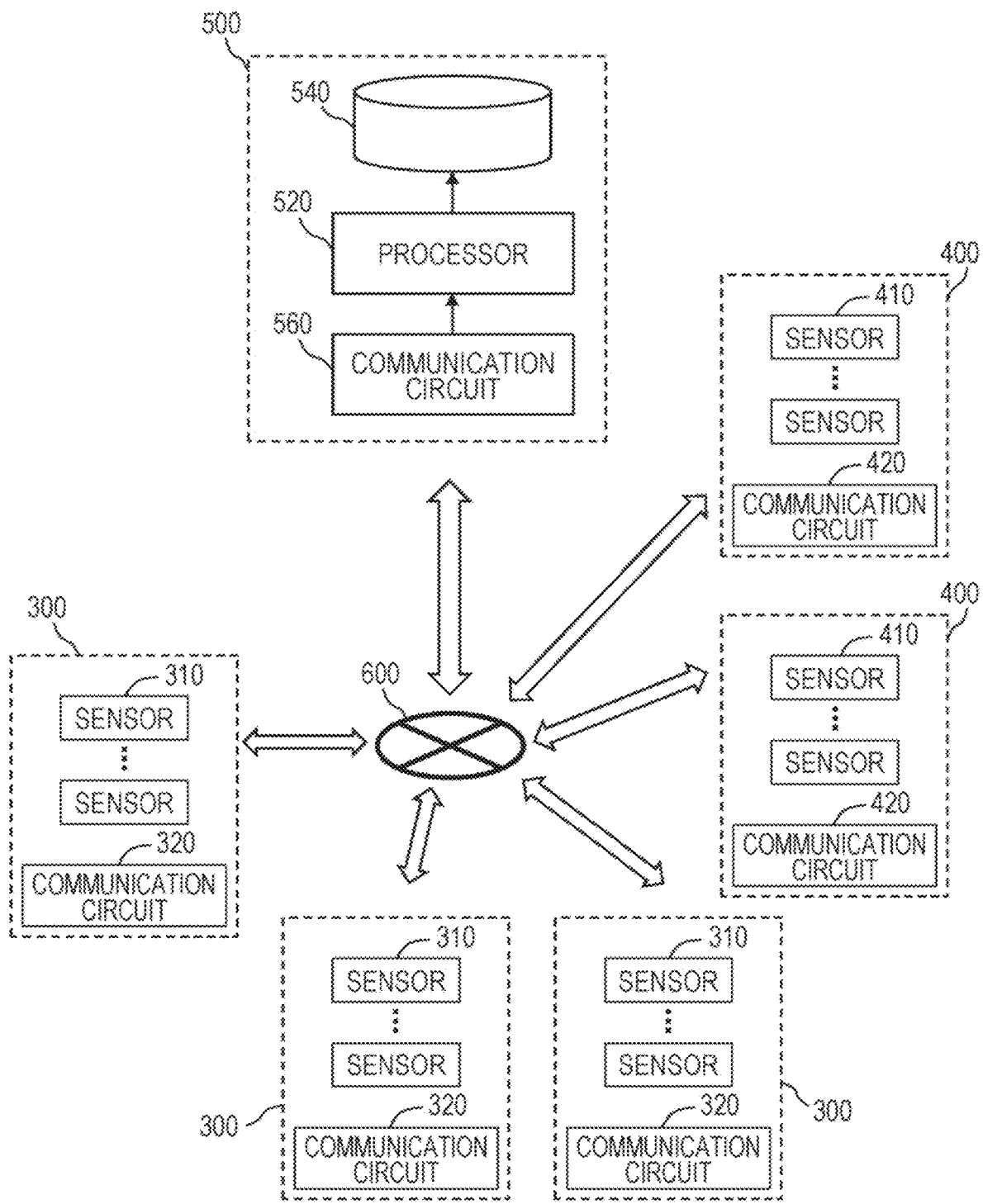
FIG. 2 is a block diagram illustrating an example configuration of the system.

FIG. 2 is a block diagram illustrating a more detailed example of the configuration of the above system. The system in this example includes a plurality of moving bodies 300 and a plurality of stationary systems 400. There may be any number of moving bodies 300 and any number of stationary systems 400.

Each moving body 300 is provided with a plurality of distance measurement sensors 310 disposed at different positions and attitudes, and a communication circuit 320. Similarly, each stationary system 400 is provided with a plurality of distance measurement sensors 410 disposed at different positions and attitudes, and a communication circuit 420. Each of the distance measurement sensors 310 and 410 measures distance and generates sensor data expressing a depth map or a three-dimensional point cloud. The sensor data is transmitted to the server 500 by the communication circuit 320 or 420.

The server 500 is provided with a communication circuit 560 in addition to the processor 520 and the recording medium 540. The processor 520 successively acquires sensor data through the communication circuit 560, and records the sensor data to the recording medium 540. By performing appropriate processing such as time adjustment and coordinate conversion on the acquired sensor data, the processor 520 can generate combined point cloud data for a specific time and a specific place.

Figure 3:
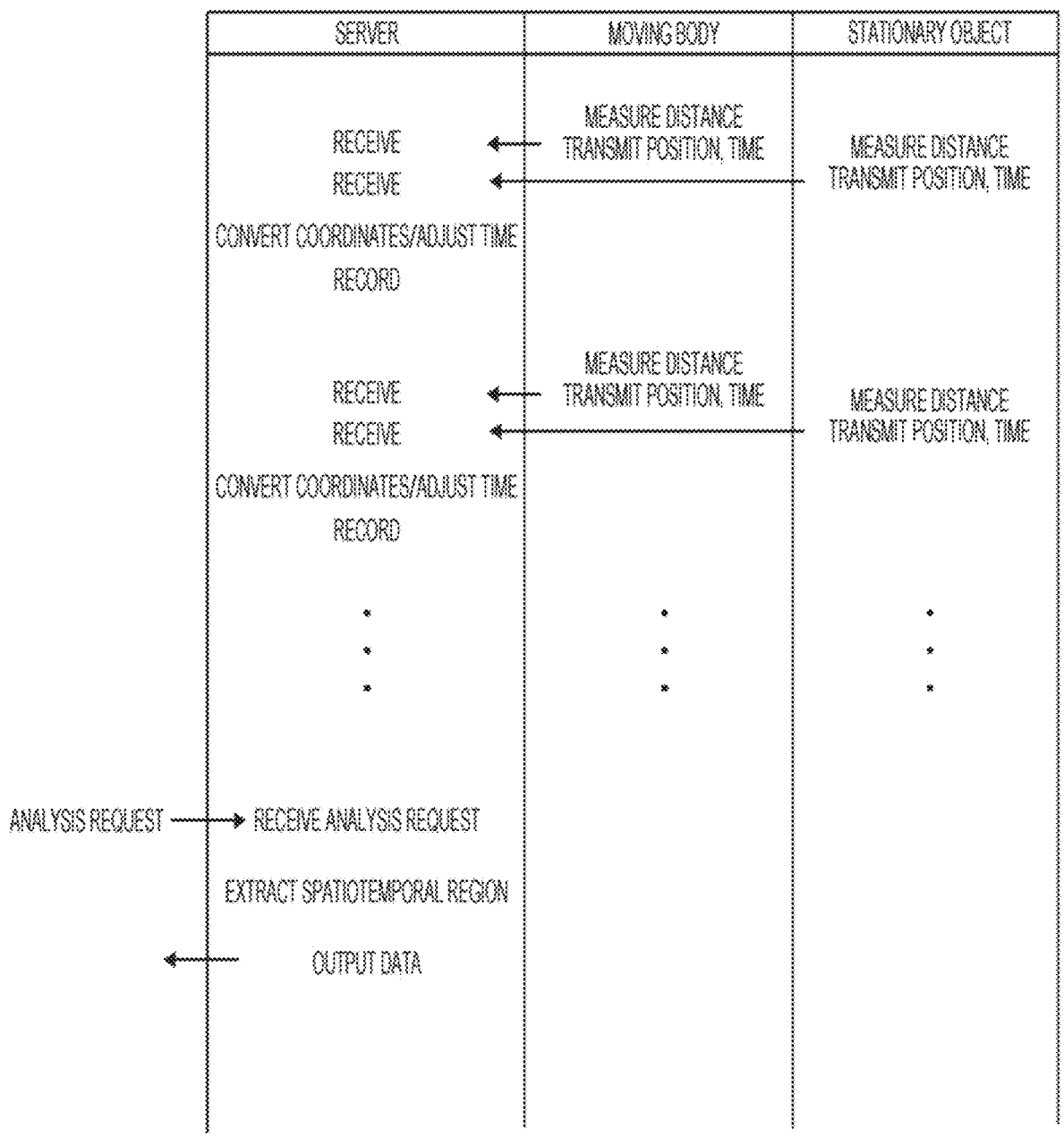
FIG. 3 is a diagram illustrating a simplified example of the flow of data in the system.

FIG. 3 is a diagram illustrating a simplified example of operations by the server 500, the moving bodies 300, and the stationary systems 400 as well as the flow of data. For simplicity, in FIG. 3 the plurality of moving bodies 300 are collectively represented as a single moving body, and the plurality of stationary systems 400 are collectively represented as a single stationary object. Each of the distance measurement sensors 310 and 410 in each of the moving bodies 300 and the stationary systems 400 measures distance repeatedly and successively generates data including the position of an object in a scene and time information. The data is sent to the server 500. The server 500 performs appropriate processing such as time adjustment and coordinate conversion on the acquired data, and records the data to the recording medium 540. Such operations are repeated at fixed intervals, for example.

The server 500 may receive, from an external source, an instruction requesting the analysis of the road environment at a specific date and time and a specific place. In this case, the processor 520 acquires data for the specific date, time, and place from the recording medium 540, and generates and outputs data according to the request. Through such operations, data useful for revealing the cause of an accident can be acquired, for example.

In a system like the above, it is important to accurately record the time when the data at each position was acquired to generate accurate road environment data by combining successively generated sensor data. In particular, ascertaining the accurate position and movement speed of an object at a specific time and a specific place to reveal the cause of a vehicular accident demands three-dimensional position data of the scene of the accident and accurate time information indicating when each piece of position data was acquired.

To acquire information about a distance distribution of a target scene, it is conceivable to use a distance measurement apparatus that scans the scene with a light beam and detects reflected light with an image sensor. As described later, by applying time of flight (ToF) technology, the distance to an object irradiated by a light beam can be measured. By measuring the distance while scanning the scene with a light beam, depth map data or point cloud data converted from depth map data can be generated. In the present disclosure, a single collection of depth map data or point cloud data may be referred to as a "frame". The above corresponds to a "frame" as a unit of image data outputted from an image sensor in some cases, but is different in other cases. The depth map data or point cloud data is repeatedly generated at a fixed frame rate, for example. It is also possible to output a frame of depth map data or point cloud data in association with a certain time.

For example, an automobile traveling at a speed of 60 kilometers (km) per hour moves approximately 1.66 centimeters (cm) per millisecond (ms). A typical video image has a frame rate of 30 fps, that is, 30 frames per second. In other words, one frame is acquired approximately every 33 ms. A vehicle traveling at 60 km/h moves approximately 55 cm in 33 ms. Consequently, there is a possibility of being unable to clarify the positional relationships among a plurality of moving objects such as vehicles, pedestrians, or bicycles with the time information for a single frame.

In a distance measurement sensor that acquires distance information by using an image sensor, short-range three-dimensional measurement is performed using a flash, for example. On the other hand, a method of emitting a light beam with a narrow beam diameter to detect reflected light from an object also exists. Such a method is suited to the acquisition of long-range distance information exceeding 100 m. With a distance measurement sensor like the above, the difference between the light projection timing and the light reception timing can be used to measure distance.

As an example herein, the case of scanning a scene with a light beam of narrow beam diameter and detecting reflected light with an image sensor is assumed. The light beam emitted in the state of a narrow beam diameter only reaches an object positioned in a limited range within the scene. Consequently, the image sensor receives reflected light from only the object positioned in a narrow range every time a single light beam is emitted. In other words, reflected light is received by only the portion of light-receiving elements positioned in the range corresponding to the position of the object from among a plurality of light-receiving elements provided in the image sensor. By performing a scan operation that detects reflected light while successively changing the direction of the light beam, distance information for the entire range detectable by the image sensor can be obtained. With such a configuration, the timing when the light beam is emitted is different depending on the direction. In a configuration in which a single depth map is generated every time a single scan is completed, the timing of light reception is different depending on the portion of the depth map. For example, in the case of a depth map outputted at 30 fps, a difference of up to approximately 30 ms may occur depending on the pixel.

In this way, the times of distance measurement are different depending on the portion of the depth map or the point cloud, even within the same frame. For this reason, in the case where data collected from a plurality of distance measurement sensors is combined on the basis of frame times, there is a possibility that the position information for the same object will be different between sensors, even if data from frames with the same times are used. Because of these discrepancies in the position information, there is a possibility that the combined position information may be insufficiently accurate.

On the other hand, a method of recording precise time information for every pixel in depth map data or for every point in point cloud data is also conceivable. With such a method, the problem described above can be avoided. However, attaching precise time information to every pixel in depth map data or every point in point cloud data creates an enormous amount of data, which necessitates an extremely high-speed communication network as well as a high-performance computational processor.

Hereinafter, an overview of embodiments of the present disclosure will be described.

A distance measurement apparatus according to an embodiment of the present disclosure is provided with a light emitter, a light receiver, and a signal processing circuit. The light emitter emits a plurality of light beams toward a scene in different directions and at different timings. The light receiver includes an array of a plurality of light-receiving elements, and detects reflected light from the scene produced by the emission of each light beam with the plurality of light-receiving elements. On the basis of a signal outputted from the light receiver, the signal processing circuit generates and outputs output data including measurement data indicating the positions or distances of a plurality of points in the scene that respectively correspond to light-receiving elements that detected reflected light from among the plurality of light-receiving elements. The output data includes data of a plurality of blocks, with individual time data attached to each of the plurality of blocks, and each of the plurality of blocks includes the measurement data of a plurality of points measured using the same light beam from among the plurality of light beams.

The time data attached to each block may indicate the time at which the light beam corresponding to the block from among the plurality of light beams was emitted.

The time data attached to each block may indicate the time at which reflected light of the light beam corresponding to the block from among the plurality of light beams was received by one of the plurality of light-receiving elements.

The light emitter may be configured to vary a shape and/or a diameter of the emitted light beams. The number or range of the points belonging to each block is different according to the shape and/or diameter of the light beam corresponding to the block.

The plurality of blocks may include two or more blocks that share the time data.

The signal processing circuit may generate point cloud data including information about three-dimensional coordinates of the plurality of points as the output data.

The signal processing circuit may generate depth map data expressing a distance distribution of the plurality of points as the output data.

The time data expresses time in units of microseconds or in units of nanoseconds, for example.

An information processing method according to another embodiment of the present disclosure comprises acquiring each of first output data and second output data treated as the output data from a first distance measurement apparatus and a second distance measurement apparatus, each of which acts as the distance measurement apparatus described in any of the above, and generating three-dimensional point cloud data by extracting, from each of the first output data and the second output data, the data of one or more blocks having time data included within a predetermined time range, and combining the extracted data into the same coordinate system.

The information processing method according to another embodiment of the present disclosure includes the following steps.

Acquire first output data including first measurement data indicating the positions or distances of a plurality of points in a scene and including the data of a plurality of blocks that each include the first measurement data for a subset of points from among the plurality of points, with individual time data attached to each of the plurality of blocks.

Acquire second output data including second measurement data indicating the positions or distances of another plurality of points in the scene, with time data attached to the second measurement data for each of the other plurality of points.

Generate three-dimensional point cloud data by respectively extracting, from the first output data and the second output data, the first measurement data for one or more points and the second measurement data for one or more points having time data included within a predetermined time range, and combining the extracted data into the same coordinate system.

Here, the second output data may also include the data of a plurality of blocks with individual time data attached to each block, similarly to the first output data. Alternatively, time data may be attached individually to each point in the second output data, or shared time data may be attached to all points expressed by the second output data. The above "plurality of points" and "other plurality of points" may also be points that overlap with each other.

The combining may include merging data from the first measurement data and the second measurement data that overlap each other in a spatiotemporal region on a basis of a confidence level of the first measurement data and the second measurement data.

The confidence level may be determined on the basis of at least one selected from the group consisting of the following (a) to (d), for example.

(a) At least one of the movement speed of a first measurement apparatus that generated the first measurement data or the movement speed of a second measurement apparatus that generated the second measurement data.

(b) The relationship between the position and attitude of at least one of the first measurement apparatus or the second measurement apparatus, and the direction of the sun.

(c) At least one of the spatial density of the plurality of points expressed by the first measurement data or the spatial density of the other plurality of points expressed by the second measurement data.

(d) The relationship between at least one of the positions of the plurality of points expressed by the first measurement data or the positions of the other plurality of points expressed by the second measurement data, and the position of one or more structures indicated by map data.

At least one of the first measurement apparatus that measured the first measurement data or the second measurement apparatus that measured the second measurement data may be installed in a moving body. The combining may be executed by an information processing apparatus provided in a stationary object or configured to communicate with the stationary object. The information processing apparatus may be configured to acquire the measurement data from at least one of the first measurement apparatus or the second measurement apparatus in a case where the moving body is positioned within a predetermined distance range from the stationary object.

The method may further comprise extracting, in response to an analysis request signal, partial three-dimensional point cloud data from the combined three-dimensional point cloud data that corresponds to a spatiotemporal region designated by the analysis request signal.

The extracting may include configuring the partial three-dimensional point cloud data as the data of a plurality of frames sampled at a predetermined period.

The extracting may include extracting point cloud data corresponding to a moving body from among the three-dimensional point cloud data. The method may further comprise generating tracking data about the moving body.

An information processing apparatus according to another embodiment of the present disclosure comprises a processor. The processor acquires each of first output data and second output data treated as the output data from a first distance measurement apparatus and a second distance measurement apparatus, each of which acts as the distance measurement apparatus described in any of the above, and generates three-dimensional point cloud data by extracting, from each of the first output data and the second output data, the data of one or more blocks having time data included within a predetermined time range, and combining the extracted data into the same coordinate system.

An information processing apparatus according to another embodiment of the present disclosure comprises a processor. The processor executes the following steps.

Acquire first output data including first measurement data indicating the positions or distances of a plurality of points in a scene and including the data of a plurality of blocks that each include the first measurement data for a subset of points from among the plurality of points, with individual time data attached to each of the plurality of blocks.

Acquire second output data including second measurement data indicating the positions or distances of another plurality of points in the scene, with time data attached to the second measurement data for each of the other plurality of points.

Generate three-dimensional point cloud data by respectively extracting, from the first output data and the second output data, the first measurement data for one or more points and the second measurement data for one or more points having time data included within a predetermined time range, and combining the extracted data into the same coordinate system.

An information processing apparatus according to another embodiment of the present disclosure comprises a processor, wherein the processor executes the following actions.

Acquire light reception data generated at different timings by a light receiver including an array of a plurality of light-receiving elements.

Generate measurement data indicating positions or distances of a plurality of points in a scene on a basis of the light reception data.

Generate and output output data including the data of a plurality of blocks, each of which includes the measurement data for a subset of points from the plurality of points, with individual time data attached to each of the plurality of blocks.

A data generation apparatus according to another embodiment of the present disclosure generates three-dimensional data, the three-dimensional data including first measurement data measured in a first period and second measurement data measured in a second period, the first measurement data including a plurality of blocks, a first block among the plurality of blocks including measurement data indicating the positions or distances of a plurality of points measured by emitting one or a plurality of beams, the data generation apparatus including a processor and a memory connected to the processor, wherein the processor generates the data of a plurality of blocks, generates time data expressing a plurality of measurement times corresponding to each of the plurality of blocks, and outputs three-dimensional data storing the data of the plurality of blocks and the time data, the time data being determined on the basis of the emission time of a beam emitted to measure the plurality of points included in each block.

A data processing apparatus according to another embodiment of the present disclosure processes three-dimensional data, the three-dimensional data including first measurement data measured in a first period and second measurement data measured in a second period, the first measurement data including a plurality of blocks, a first block among the plurality of blocks including measurement data indicating the positions or distances of a plurality of points measured by emitting one or a plurality of beams, the data processing apparatus including a processor and a memory connected to the processor, wherein the processor reads out the three-dimensional data stored in the memory, the three-dimensional data including the data of the plurality of blocks and time data expressing a plurality of measurement times corresponding to each of the plurality of blocks, and generates second three-dimensional data using the data of the plurality of blocks and the time data, the time data being determined on the basis of the emission time of a beam emitted to measure the plurality of points included in each block.

Hereinafter, embodiments of the present disclosure will be described more specifically. Note that the embodiments described hereinafter all illustrate general or specific examples. Features such as numerical values, shapes, structural elements, placement and connection states of structural elements, steps, and the ordering of steps indicated in the following embodiments are merely examples, and are not intended to limit the present disclosure. In addition, among the structural elements in the following embodiments, structural elements that are not described in the independent claim indicating the broadest concept are described as arbitrary or optional structural elements. Also, each diagram is a schematic diagram, and does not necessarily illustrate a strict representation. Furthermore, in the drawings, structural elements that are substantially the same are denoted with the same signs, and duplicate description of such structural elements may be reduced or omitted in some cases.

Embodiment 1

A distance measurement apparatus according to Embodiment 1 will be described. A point cloud data acquisition system according to Embodiment 1 is provided with a beam scanner that emits a light beam toward a scene targeted for distance measurement, an image sensor that detects reflected light from an object in the scene, a control circuit that controls the light projection operations by the beam scanner and the light detection operations by the image sensor, a clock that generates time information, a signal processing circuit that generates data indicating a distribution of objects in the scene on the basis of a signal acquired from the image sensor and a signal acquired from the control circuit, and a recording medium that records the generated data. The control circuit records the timing of light projection by the beam scanner and the timing of light reception by the image sensor to the recording medium as precise time information. The signal processing circuit includes a distance calculation unit that calculates a distance for each pixel on the basis of the signal acquired from the image sensor and the signal acquired from the control circuit, a depth map generation unit that generates depth map data on the basis of the calculated distance for each pixel, and a point cloud data generation unit that converts the distance information for each pixel in the depth map into point cloud data. The signal processing circuit divides the point cloud into a plurality of blocks by treating a plurality of points with distance information acquired at the same time from among the point cloud as a single block, and outputs each block with time information attached.

[1-1 Configuration of Point Cloud Data Acquisition System]

Figure 4:
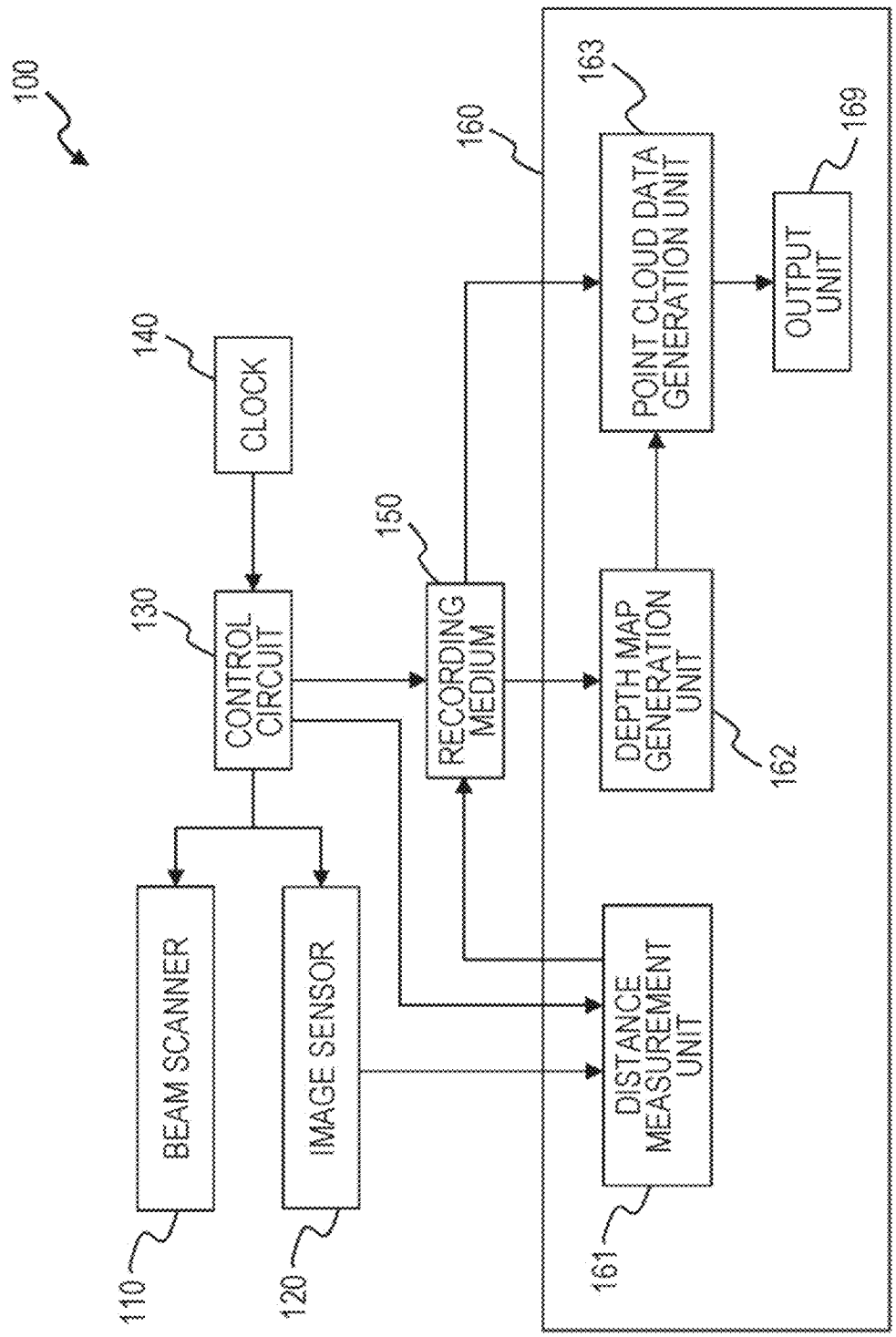
FIG. 4 is a block diagram illustrating a configuration of a distance measurement apparatus according to Embodiment 1.

FIG. 4 is a block diagram illustrating a configuration of a distance measurement apparatus 100 according to Embodiment 1. As illustrated in FIG. 4, the distance measurement apparatus 100 is provided with a beam scanner 110, an image sensor 120, a control circuit 130, a clock 140, a recording medium 150, and a signal processing circuit 160. The signal processing circuit 160 includes a distance measurement unit 161, a depth map generation unit 162, a point cloud data generation unit 163, and an output unit 169.

The beam scanner 110 is a type of light emitter that emits a light beam. The beam scanner 110 includes a laser light source, for example. The beam scanner 110 emits a light beam in a designed direction in response to an instruction from the control circuit 130. In one example, the beam scanner 110 repeats an operation of scanning a target scene with a light beam. In another example, the beam scanner 110 performs an operation of scanning a specific region in a target scene in response to a predetermined trigger. The beam scanner 110 executes a single scan within a predetermined length of time. This length of time is referred to as the "frame time". The beam scanner 110 successively emits a plurality of light beams in different directions within the frame time. The frame time of each frame and the number of emitted light beams are not necessarily the same, and may be different for each frame in some cases.

The image sensor 120 is a type of light receiver, and is provided with an array of a plurality of light-receiving elements arranged two-dimensionally on a light-receiving surface. An optical component such as a lens that forms an image on the light-receiving surface of the image sensor 120 may also be provided. The image sensor 120 receives reflected light from an object positioned on the path of an emitted light beam. Each light-receiving element includes a photoelectric transducer such as a photodiode and one or more charge storage units, and stores a quantity of charge according to the intensity of the received light. In the following description, the light-receiving elements may be referred to as "pixels". In response to an instruction from the control circuit 130, the image sensor 120 causes each light-receiving element to store charge, and outputs an electrical signal corresponding to the quantity of stored charge. Only a portion of all light-receiving elements receives the reflected light of a single light beam. Light beams are emitted repeatedly in different directions, and every time a light beam is emitted, reflected light is detected by a different group of light-receiving elements. The pattern and order of the light beam emission directions are preset.

By detecting the reflected light beams produced due to the emission of a preset series of light beams, the image sensor 120 generates the data of a single frame. In the present embodiment, the image sensor 120 outputs data for all pixels as the data of a single frame at the stage when the scanning by light beams is completed for an entire scene detectable by the image sensor 120. The image sensor 120 outputs 30 frames per second, for example. This frame rate is merely an example, and the frame rate is set appropriately according to the application.

Note that in the above description, data is outputted at the stage when the scanning by light beams is completed for an entire scene detectable by the image sensor 120, but data obtained by emitting a light beam in a direction corresponding to a partial region of the pixels provided in the image sensor 120 may also be outputted. In this case, the image sensor 120 may output the data obtained from all pixels or output only the data obtained from the pixels in the partial region described above.

The control circuit 130 may be achieved by an electronic circuit including a processor, such as a microcontroller unit (MCU) for example. The control circuit 130 determines the emission timing and emission direction of light beams by the beam scanner 110, as well as the exposure timing of the image sensor 120. The control circuit 130 outputs a projection control signal and an exposure control signal to the beam scanner 110 and the image sensor 120, respectively, in accordance with the determined timings. The projection control signal is generated such that light beams are emitted successively in predetermined directions and in a predetermined order.

Figure 5:
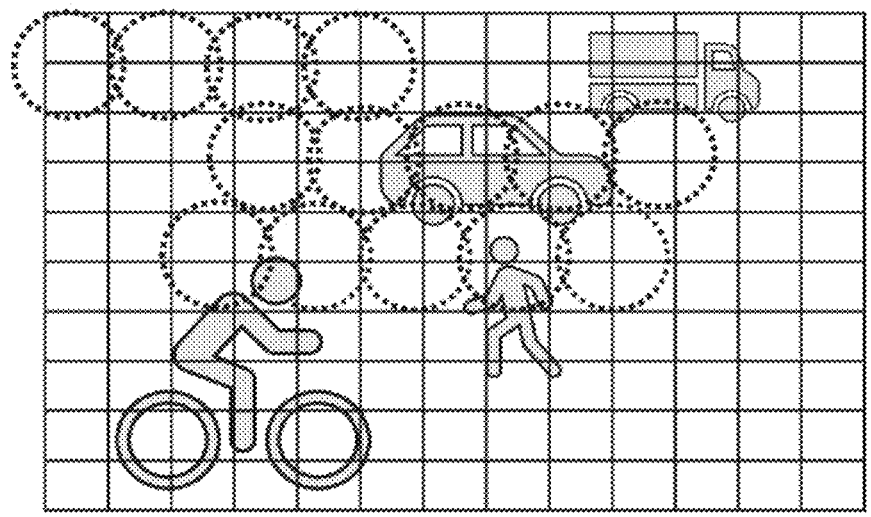
FIG. 5 is a diagram schematically illustrating how a scene targeted for distance measurement is scanned by light beams.

FIG. 5 is a diagram schematically illustrating how a scene targeted for distance measurement is scanned by light beams. In FIG. 5, the spots of a plurality of light beams are illustrated as dotted-line circles, but the number of light beams emitted at the same time may be any number equal to or greater than 1. In the present embodiment, light beams are successively emitted to comprehensively irradiate a two-dimensional plane parallel to the light-receiving surface of the image sensor 120. The control circuit 130 records information indicating the projection direction and projection timing of the light beams to the recording medium 150. Note that the scanning by light beams may be configured in any way. The gridlines in FIG. 5 represent the pixels of the image sensor 120. Note that the pixels of the image sensor 120 are actually finer, but are illustrated more roughly than the actual pixels in FIG. 5 for legibility. The same also applies to the drawings referenced hereinafter.

The clock 140 is a circuit that outputs precise time information necessary for the control of the beam scan. The clock 140 measures time with nanosecond or microsecond precision for example, and outputs information about the time. The clock 140 may be achieved by an integrated circuit such as a real-time clock, for example. The clock 140 may also be synchronized with a time server. For the synchronization, a protocol such as the Network Time Protocol (NTP) or the Precision Time Protocol (PTP) may be used, for example. Alternatively, Global Positioning System (GPS) information may be used to synchronize the time based on the time of a server as a reference. Note that the method of time synchronization is not limited to the above, and any method may be used. Through time synchronization, the distance measurement apparatus 100 acting as a client can acquire accurate time information.

The recording medium 150 may be memory such as ROM or RAM, for example. The recording medium 150 records various data generated by the control circuit 130 and the signal processing circuit 160. Furthermore, the recording medium 150 may also store computer programs executed by the control circuit 130 and the signal processing circuit 160.

The recording medium 150 records the information indicating the projection direction and projection timing of the light beams outputted from the control circuit 130. Additionally, the recording medium 150 also records various data generated by the signal processing circuit 160. For example, the recording medium 150 records distance data for each pixel calculated by the distance measurement unit 161. In the present embodiment, as described later, blocks of corresponding pluralities of pixels are recorded in association with each combination of a projection direction and a projection timing of a light beam.

FIGS. 6A to 6C illustrate examples of information recorded to the recording medium 150. FIG. 6A illustrates information shared among a plurality of frames. FIG. 6B illustrates information that is shared within a single frame, but varies for each frame. FIG. 6C illustrates information that is different for each pixel.

As illustrated in FIG. 6A, the information shared among a plurality of frames includes information indicating the position of the image sensor 120 inside a vehicle, the normal direction of the light-receiving surface, and the angle of field. The position of the image sensor 120 inside a vehicle may be expressed in a three-dimensional coordinate system taking the center of the vehicle as the origin, for example. The normal direction of the light-receiving surface of the image sensor 120 may be expressed by the components of a normal vector expressed in the three-dimensional coordinate system. The angle of field may be expressed by an angle in the horizontal plane and an angle in the vertical plane, for example.

As illustrated in FIG. 6B, the information that varies for each frame includes the beam direction, the pixel range indicating a block, and time information. In the present embodiment, a pixel group that receives the reflected light of a light beam in one direction emitted from the beam scanner 110 is treated as a single block. Even if the directions of the light beams are the same, the path of the reflected light will move depending on the position of an object, and therefore the positions of the blocks may be different every time light is projected. In the case where distance measurement using a light beam in one direction is performed once per frame, the blocks may be different for each frame. Note that in actual distance measurement, because the energy of the reflected light is small, not enough charge may be stored from a single projection and exposure in some cases. In such cases, sufficient charge may be stored by repeatedly projecting light in the same direction multiple times and repeating exposure for a single distance measurement. A method of determining the precise time in this case will be described later. In the example of FIG. 6B, numerical values expressing a unit vector of the beam direction in a three-dimensional coordinate system is recorded as the information indicating the beam direction. Note that an identifier (ID) for identifying a block may also be recorded instead of the information indicating the beam direction. The pixel range of a block may be specified by the coordinates of a first pixel (for example, the upper-leftmost pixel) and the coordinates of a last pixel (for example, the lower-rightmost pixel) among the plurality of pixels included in the block, for example. The specification of the pixel range of a block is not limited to coordinate values, and may also be specified by pixel IDs. The measurement time is recorded in association with the beam direction and the pixel range of a block. The time may be recorded in units of microseconds or nanoseconds, for example. Note that date information may also be recorded in addition to time information. The measurement time is determined by the timing of the emission of a light beam or by the timing of receiving the reflected light of the light beam. Consequently, the time is shared within a block corresponding to a light beam in one direction. In the example of FIG. 6C, the information for each pixel includes distance information calculated by the signal processing circuit 160.

Note that in the above description, the emission time at which the light beam is emitted or the time of receiving the reflected light of the light beam is treated as the measurement time, but a time different from the above may also be treated as the measurement time. For example, any information that can be used to specify or estimate the measurement time of position data measured by the emission of a light beam, such as the average of the emission time and the reception time, or an emission time indicated in an instruction to the beam scanner 110, may also be used as the measurement time.

The signal processing circuit 160 is an electronic circuit including a processor such as a CPU and/or a GPU, for example. The functions of the distance measurement unit 161, the depth map generation unit 162, the point cloud data generation unit 163, and the output unit 169 in the signal processing circuit 160 may be achieved by having the processor of the signal processing circuit 160 execute a program stored in the recording medium 150, for example. In this case, the processor functions as distance measurement unit 161, the depth map generation unit 162, the point cloud data generation unit 163, and the output unit 169. Each of these function units may also be achieved by special-purpose hardware. Note that the control circuit 130 and the signal processing circuit 160 may also be achieved by a single circuit. For example, a single MCU may include the functions of both the control circuit 130 and the signal processing circuit 160. The recording medium 150 may also be included in the circuit.

The distance measurement unit 161 acquires a signal, outputted from the image sensor 120, indicating the quantity of charge stored by each pixel in response to the reception of light in each exposure period. On the basis of the signal, the distance measurement unit 161 calculates the distance to a certain object at a position corresponding to each pixel, and records distance information for each pixel to the recording medium 150. The distance information may be recorded in the format illustrated in FIG. 6C, for example.

The depth map generation unit 162 generates depth map data on the basis of the measured distance information for each pixel.

The point cloud data generation unit 163 converts the generated depth map data into point cloud data in a three-dimensional coordinate space taking a predetermined point as the origin. The origin may be set to a center position of vehicle in which the distance measurement apparatus 100 is installed. Additionally, the point cloud data generation unit 163 associates the projection time for each pixel block with the point cloud data, and generates point cloud data with added measurement time information for each block.

The output unit 169 outputs the point cloud data with added measurement time information. The point cloud data is recorded to the recording medium 150, for example.

Note that the measurement time information attached to the point cloud data may also be expressed in units of time different from the units of time of the time information outputted by the clock 140. For example, whereas the time information outputted by the clock 140 is expressed in units time on the order of nanoseconds or in units of time on the order of microseconds, in some cases it may be sufficient for the measurement time information attached to the point cloud data to be expressed in units of time on the order of milliseconds. In such cases, the control circuit 130 or the signal processing circuit 160 may also derive the measurement time expressed in the units of time used in the measurement time information on the basis of the time information outputted by the clock 140. Here, the units of time used in the measurement time information may be predetermined or set according to an external instruction. Additionally, the output data may also include time unit information indicating the units of time of the measurement time information. In this case, the time unit information is stored in a header region or the like attached to the output data, for example.

FIG. 7A illustrates an example of the output data format. In this example, fixed values which are data shared among a plurality of frames and data that is different for each frame are outputted. The fixed values may be outputted at a frequency of once for every predetermined plurality of frames, for example.

The fixed values may include values indicating the position of the image sensor 120 inside a vehicle, the normal direction of the light-receiving surface of the image sensor 120, the angle of field of the image sensor 120, and the date. The position of the image sensor 120 may be expressed by a 3-byte value expressed in a three-dimensional coordinate system taking the center of the vehicle as the origin, for example. The normal direction of the light-receiving surface may be expressed by a 3-byte value expressed in the above three-dimensional coordinate system, for example. The angle of field may be expressed by a 2-byte value, for example. The date includes information about the year, month, and day, and may be expressed by a 2-byte value, for example.

In the example of FIG. 7A, the output data for each frame includes, as the data for each block, information about the number of points included in the block, the measurement time of the block, and the position of each of the plurality of points included in the block. The number of points included in the block may be expressed in 1 byte, for example. The measurement time may be expressed in 5 bytes in units of microseconds, for example. The position of each point in the block may be three-dimensional coordinates and may be expressed in 3 bytes, for example. By iterating data sets of the number of points in each block, the time, and the position of each point a number of iterations equal to the number of blocks, the outputting of the data for a single frame is completed. Note that in the example of FIG. 7A, the number of blocks is a known fixed value.

Figure 7B:
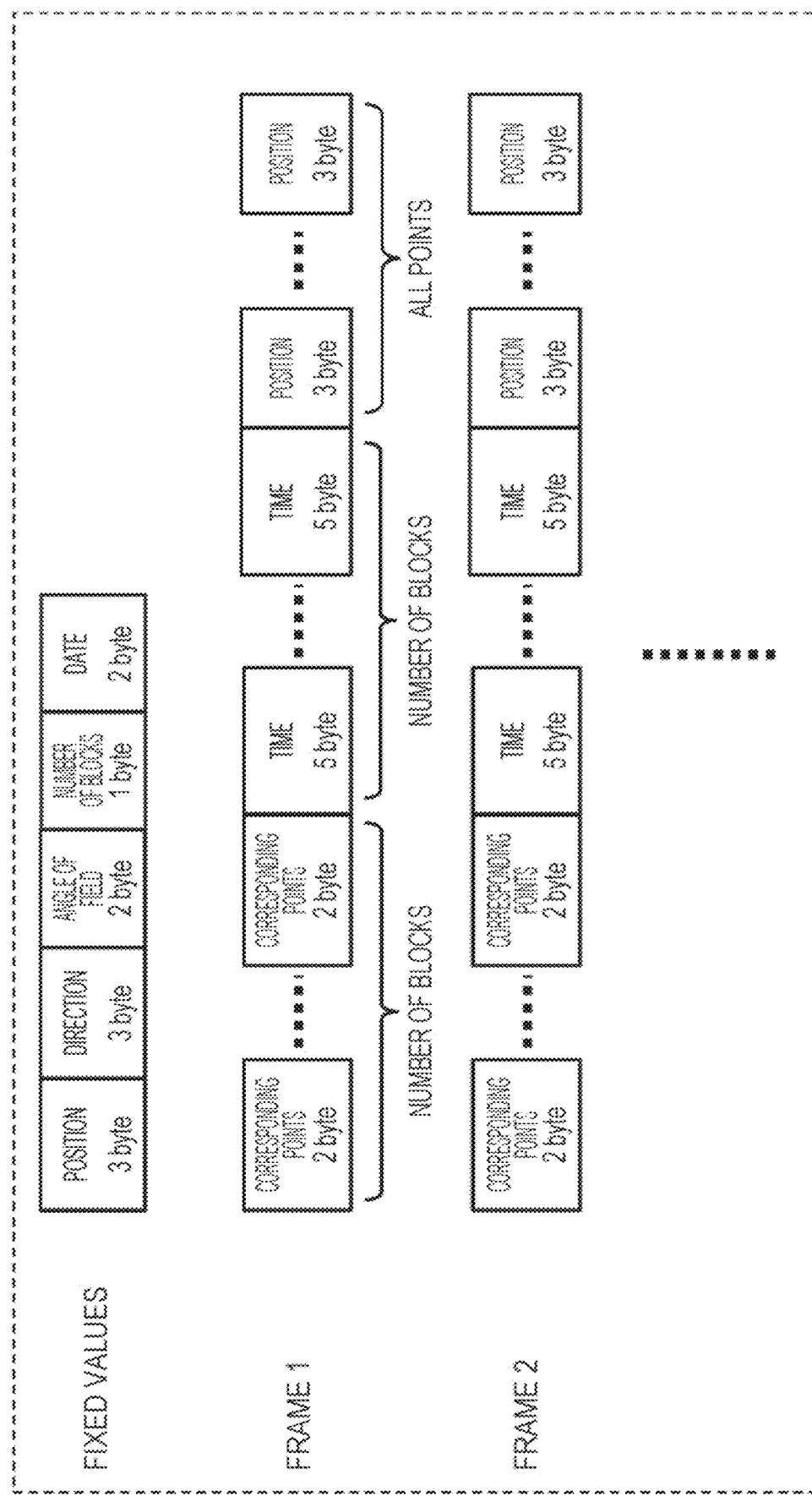
FIG. 7B is a diagram illustrating another example of an output data format.

FIG. 7B illustrates another example of the output data format. In this example, ID numbers associating each point of point cloud data with each pixel in the depth map acting as the source from which the point cloud data is converted are assigned sequentially. The number of blocks, that is, the number of light beam directions within a single frame, is outputted as a fixed value shared among all frames. Moreover, data is outputted for each frame. For each frame, the plurality of points included in each block may be specified by the 2 bytes of the ID (1 byte, for example) of the first point and the ID (1 byte, for example) of the last point among the plurality of points included in each of the blocks. This data is outputted a number of times equal to the number of blocks, and thereafter, the measurement time for each block is outputted in 5 bytes in units of microseconds a number of times equal to the number of blocks. At this time the data of the plurality of points corresponding to a block and the time data are outputted in an arrangement such that information about the same block is in the same order. After the data for each block, the position of each point of the point cloud in the three-dimensional coordinate system is outputted in 3 bytes, for example. The points in the point cloud at this time are arranged in order of the point cloud ID. The position is outputted in 3 bytes for each point, and it outputted consecutively a number of times equal to the number of points. Note that in the case where the number of blocks differs depending on the frame, information about the number of blocks may also be included in the information for each frame.

[1-1-2 Configuration of Beam Scanner 110]

Next, an example of the configuration of the beam scanner 110 will be described. The beam scanner 110 is a light emitter capable of varying the emission direction of a light beam according to control by the control circuit 130. The beam scanner 110 uses successive light beams to irradiate a partial region inside a scene targeted for distance measurement. To achieve the above function, the beam scanner 110 is provided with a function of varying the emission direction of a light beam. For example, the beam scanner 110 may be provided with a light-emitting element such as a laser and at least one movable mirror such as a MEMS mirror, for example. Light emitted from the light-emitting element is reflected by the movable mirror and pointed toward a predetermined region inside the scene targeted for distance measurement. By driving the movable mirror, the control circuit 130 can vary the emission direction of the light beam.

A light emitter capable of varying the emission direction of light with a structure different than a light emitter including a movable mirror may also be used. For example, a light emitter using a reflection waveguide as disclosed in Patent Literature 4 may be used. Alternatively, a light emitter that uses an antenna array to vary the direction of the light of the entire array by adjusting the phase of light outputted from each antenna may be used.

Hereinafter, an example of the configuration of the beam scanner 110 will be described.

Figure 8:
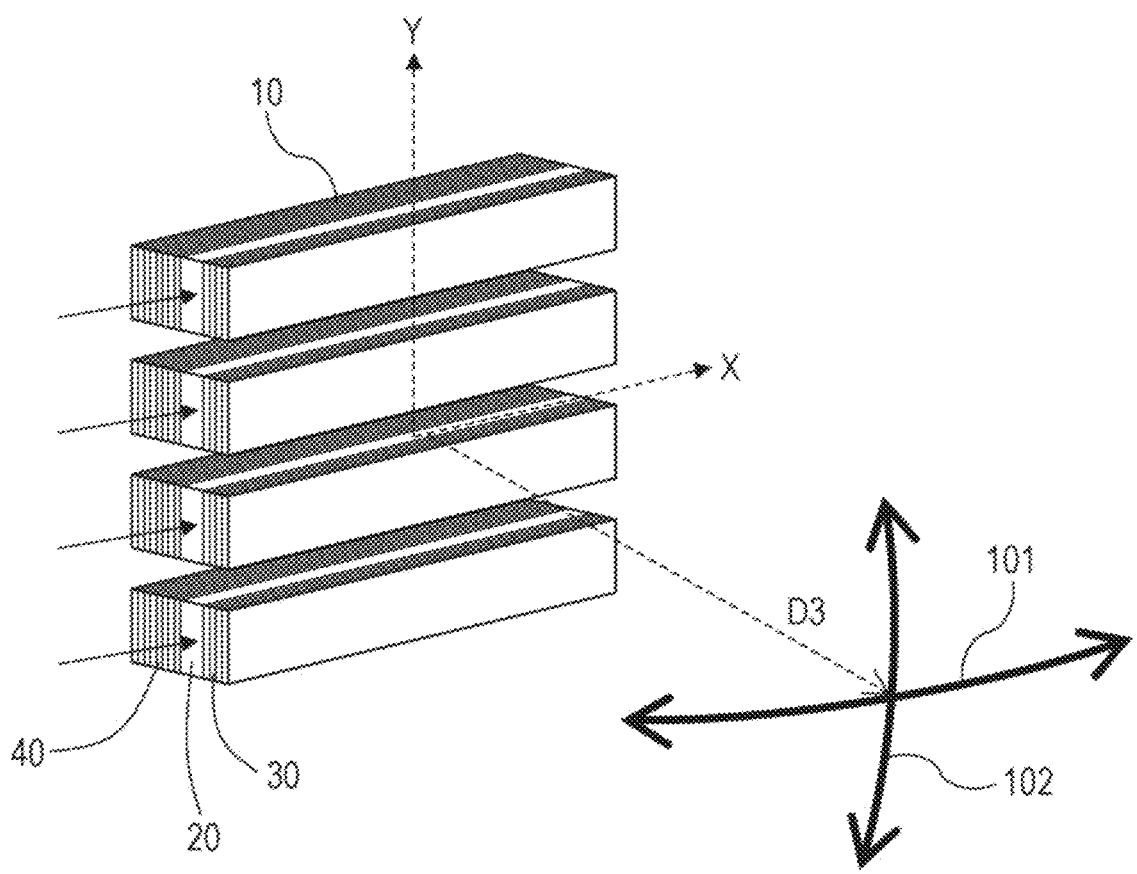
FIG. 8 is a perspective view schematically illustrating an example of a light emitter.

FIG. 8 is a perspective view schematically illustrating an example of a light emitter that may be used as the beam scanner 110. The light emitter is provided with an optical waveguide array including a plurality of optical waveguide elements 10. Each of the plurality of optical waveguide elements 10 has an elongated shape in a first direction (the X direction in FIG. 8). The plurality of optical waveguide elements 10 are arranged regularly in a second direction (the Y direction in FIG. 8) intersecting the first direction. The plurality of optical waveguide elements 10 cause light to propagate in the first direction while also causing light to be emitted in a third direction D3 intersecting a virtual plane parallel to the first and second directions.

Each of the plurality of optical waveguide elements 10 includes a first mirror 30 and a second mirror 40 facing each other, and an optical waveguide layer 20 positioned between the mirror 30 and the mirror 40. The mirror 30 and the mirror 40 each include a reflective surface intersecting the third direction D3 at the interface with the optical waveguide layer 20. The mirror 30, the mirror 40, and the optical waveguide layer 20 have elongated shapes in the first direction.

The reflective surface of the first mirror 30 and the reflective surface of the second mirror 40 face each other substantially in parallel. Of the two mirrors 30 and 40, at least the first mirror 30 has a property of transmitting a portion of the light propagating through the optical waveguide layer 20. In other words, the first mirror 30 has a higher light transmittance with respect to such light than the second mirror 40. Consequently, a portion of the light propagating through the optical waveguide layer 20 is emitted externally from the first mirror 30. Such mirrors 30 and 40 may be multilayer mirrors formed using multiple layers of a dielectric material, for example.

By adjusting the phase of the light inputted into each of the optical waveguide elements 10 and additionally adjusting the refractive index or the thickness of the optical waveguide layer 20 or adjusting the wavelength of the light inputted into the optical waveguide layer 20 of the optical waveguide elements 10, it is possible to emit light in any direction.

Figure 9:
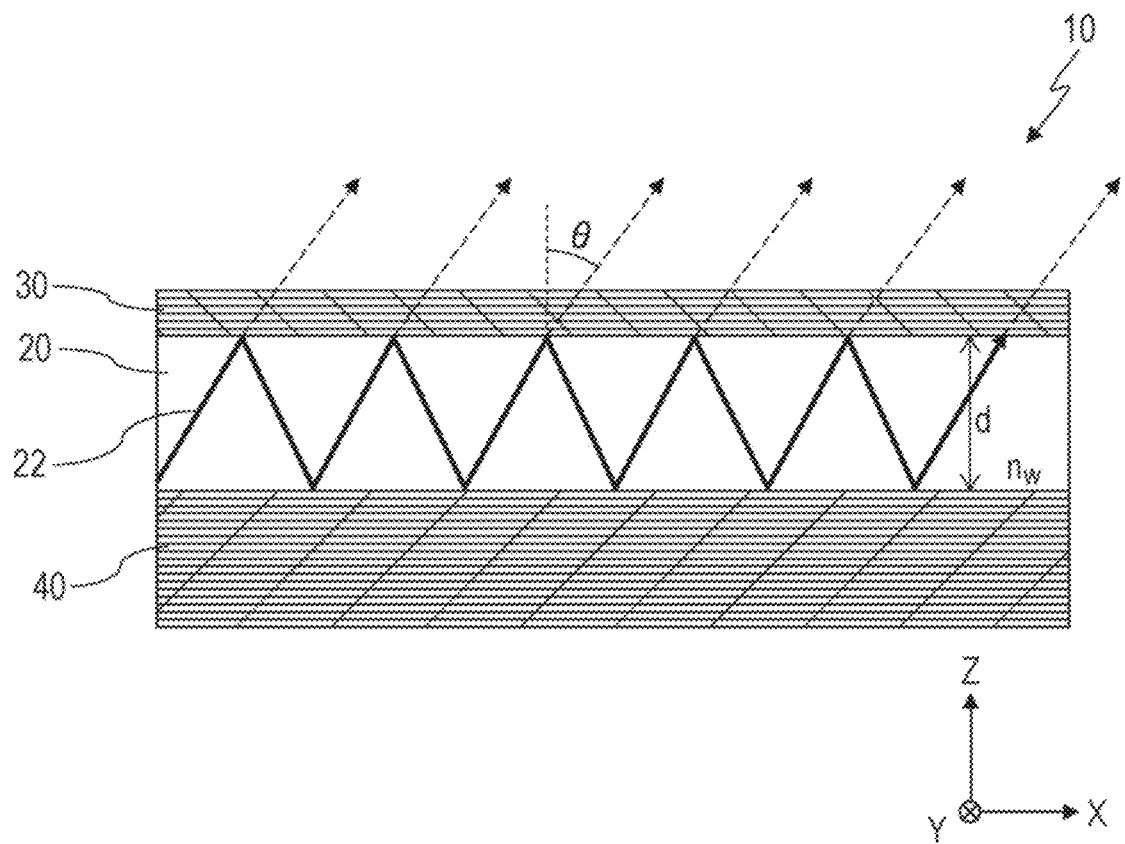
FIG. 9 is a diagram schematically illustrating an example of the cross-sectional structure of a single optical waveguide element and propagated light.

FIG. 9 is a diagram schematically illustrating an example of the cross-sectional structure of a single optical waveguide element 10 and propagated light. In FIG. 9, the direction perpendicular to the X and Y directions illustrated in FIG. 8 is designated the Z direction, and a cross section parallel to the XZ plane of an optical waveguide element 10 is illustrated schematically. In the optical waveguide element 10, the pair of mirrors 30 and 40 are disposed with the optical waveguide layer 20 sandwiched in between. Light 22 introduced from one end of the optical waveguide layer 20 in the X direction propagates through the optical waveguide layer 20 while being repeatedly reflected by the first mirror 30 provided on the upper surface and the second mirror 40 provided on the lower surface of the optical waveguide layer 20. The light transmittance of the first mirror 30 is higher than the light transmittance of the second mirror 40. For this reason, a portion of the light can be outputted mainly from the first mirror 30.

In an ordinary optical waveguide such as optical fiber, light propagates through the optical waveguide while repeatedly undergoing total reflection. In contrast, in the optical waveguide element 10 according to the present embodiment, light propagates while being repeatedly reflected by the mirrors 30 and 40 disposed above and below the optical waveguide layer 20. For this reason, there are no constraints on the propagation angle of the light. Here, the propagation angle of the light refers to the angle of incidence with respect to the interface between the mirror 30 or 40 and the optical waveguide layer 20. Light incident at angles close to perpendicular with respect to the mirror 30 or the mirror 40 can also be propagated. In other words, light incident on the interface at an angle smaller than the critical angle of total reflection can also be propagated. For this reason, the group velocity of light in the propagation direction of the like is greatly lowered compared to the speed of light in free space. With this arrangement, the optical waveguide element 10 has a property whereby the propagation conditions of light vary greatly depending on the wavelength of the light, the thickness of the optical waveguide layer 20, and the refractive index of the optical waveguide layer 20. Such an optical waveguide is referred to as a "reflection waveguide" or a "slow light waveguide".

The angle of emergence θ of light emitted in air from the optical waveguide element 10 is expressed by the following Expression (1).

$$\sin\theta = \sqrt{n_w^2 - \left(\frac{m\lambda}{2d}\right)^2} \qquad (1)$$

As Expression (1) demonstrates, the emission direction of light can be changed by changing any of the wavelength λ of the light in air, the refractive index $n_w$ of the optical waveguide layer 20, or the thickness d of the optical waveguide layer 20.

For example, in the case where $n_w=2$, d=387 nm, $\lambda=1550$ nm, and m=1, the angle of emergence is 0°. If the refractive index is changed to $n_w=2.2$ from the above state, the angle of emergence changes to approximately 66°. On the other hand, if the thickness is changed to d=420 nm without changing the refractive index, the angle of emergence changes to approximately 51°. If the wavelength is changed to $\lambda=1500$ nm without changing the refractive index or the thickness, the angle of emergence changes to approximately 30°. In this way, the emission direction of light can be changed by changing any of the wavelength $\lambda$ of the light, the refractive index $n_w$ of the optical waveguide layer 20, or the thickness d of the optical waveguide layer 20.

The wavelength $\lambda$ of light may be included in the wavelength band from 400 nm to 1100 nm (from visible light to near-infrared) with which a high detection sensitivity is obtained in a typical image sensor that detects light by absorbing light with silicon (Si), for example. In another example, the wavelength $\lambda$ may be included in the near-infrared wavelength band from 1260 nm to 1625 nm, which has relatively low transmission loss in optical fiber or an Si optical waveguide. Note that these wavelength ranges are examples. The wavelength band of light to be used is not limited to the wavelength band of visible light or infrared light, and may also be the wavelength band of ultraviolet light, for example.

The light emitter may be provided with a first adjustment element that varies at least one of the refractive index of the optical waveguide layer 20, the thickness of the optical waveguide layer 20, or the wavelength in each optical waveguide element 10. With this arrangement, the direction of emitted light can be adjusted.

To adjust the refractive index of at least a portion of the optical waveguide layer 20, the optical waveguide layer 20 may include a liquid crystal material or an electro-optic material. The optical waveguide layer 20 may be sandwiched by a pair of electrodes. By applying a voltage to the pair of electrodes, the refractive index of the optical waveguide layer 20 can be varied.

To adjust the thickness of the optical waveguide layer 20, at least one actuator may be connected to at least one of the first mirror 30 or the second mirror 40, for example. By varying the distance between the first mirror 30 and the second mirror 40 with the at least one actuator, the thickness of the optical waveguide layer 20 can be varied. If the optical waveguide layer 20 is formed using a liquid, the thickness of the optical waveguide layer 20 may be varied easily.

In the optical waveguide array in which the plurality of optical waveguide elements 10 are arranged in one direction, the light emission direction changes due to the interference of light emitted from each of the plurality of optical waveguide elements 10. By adjusting the phase of the light supplied to each optical waveguide element 10, the light emission direction can be varied. Hereinafter, the above principle will be described.

Figure 10A:
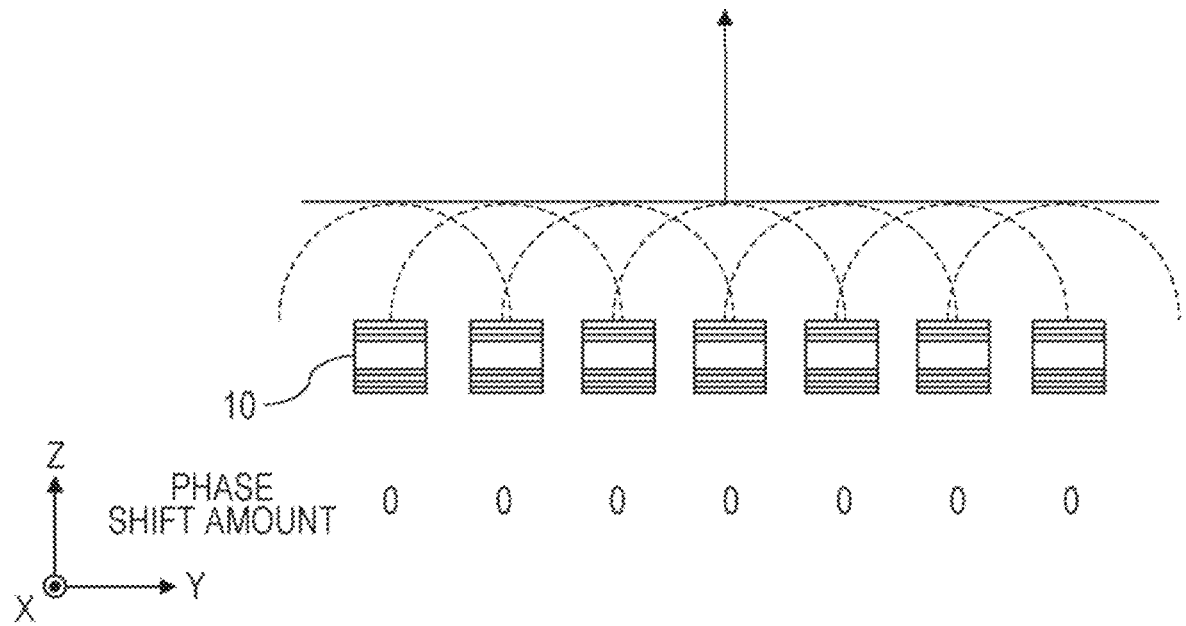
FIG. 10A is a diagram illustrating a cross section of an optical waveguide array that emits light in a direction perpendicular to the emission surface of the optical waveguide array.

FIG. 10A is a diagram illustrating a cross section of an optical waveguide array that emits light in a direction perpendicular to the emission surface of the optical waveguide array. In FIG. 10A, a phase shift magnitude of the light propagating through each optical waveguide element 10 is also described. Here, the phase shift magnitude is a value based on the phase shift of light propagating through the optical waveguide element 10 at the left end. The optical waveguide array according to the present embodiment includes a plurality of optical waveguide elements 10 arranged at equal intervals. In FIG. 10A, the dashed arcs illustrate the wavefront of the light emitted from each optical waveguide element 10. The straight line illustrates the wavefront formed by the interference of light. The arrow illustrates the direction of the light emitted from the optical waveguide array (that is, the direction of the wavenumber vector). In the example of FIG. 10A, the phases of the light propagating through the optical waveguide layer 20 in each optical waveguide element 10 are all the same. In this case, light is emitted in a direction (Z direction) perpendicular to both the arrangement direction (Y direction) of the plurality of optical waveguide elements 10 and the extension direction (X direction) of the optical waveguide layer 20.

Figure 10B:
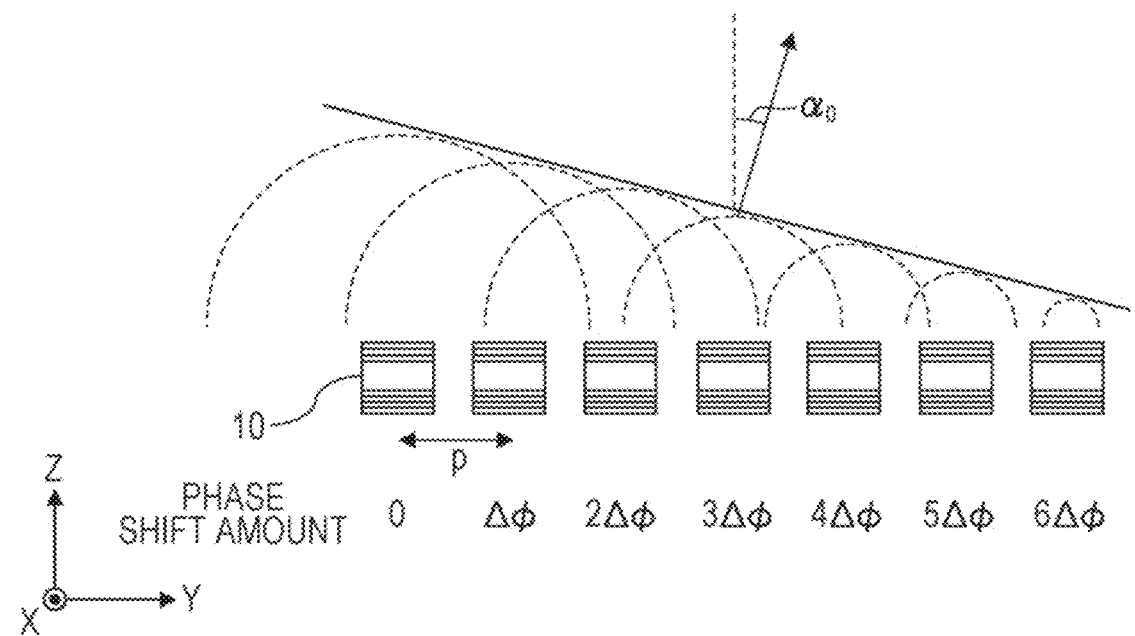
FIG. 10B is a diagram illustrating a cross section of an optical waveguide array that emits light in a direction different from the direction perpendicular to the emission surface of the optical waveguide array.

FIG. 10B is a diagram illustrating a cross section of an optical waveguide array that emits light in a direction different from the direction perpendicular to the emission surface of the optical waveguide array. In the example illustrated in FIG. 10B, the phases of the light propagating through the optical waveguide layer 20 in the plurality of optical waveguide elements 10 differ by a fixed magnitude ($\Delta_\varphi$) in the arrangement direction. In this case, light is emitted in a direction different from the Z direction. By varying $\Delta_\varphi$, the Y-direction component of the wavenumber vector of the light can be varied. Provided that p is the center-to-center distance between two adjacent optical waveguide elements 10, the angle of emergence $\alpha_0$ of the light is expressed by the following Expression (2).

$$\sin\alpha_0 = \frac{\Delta\phi\lambda}{2\pi p} \tag{2}$$

When the number of optical waveguide elements 10 is N, the spread angle $\Delta\alpha$ of the angle of emergence of the light is expressed by the following Expression (3).

$$\Delta\alpha = \frac{2\lambda}{Np \cos \alpha_0} \tag{3}$$

Consequently, the greater the number of optical waveguide elements 10, the more the spread angle $\Delta\alpha$ can be decreased.

Figure 11:
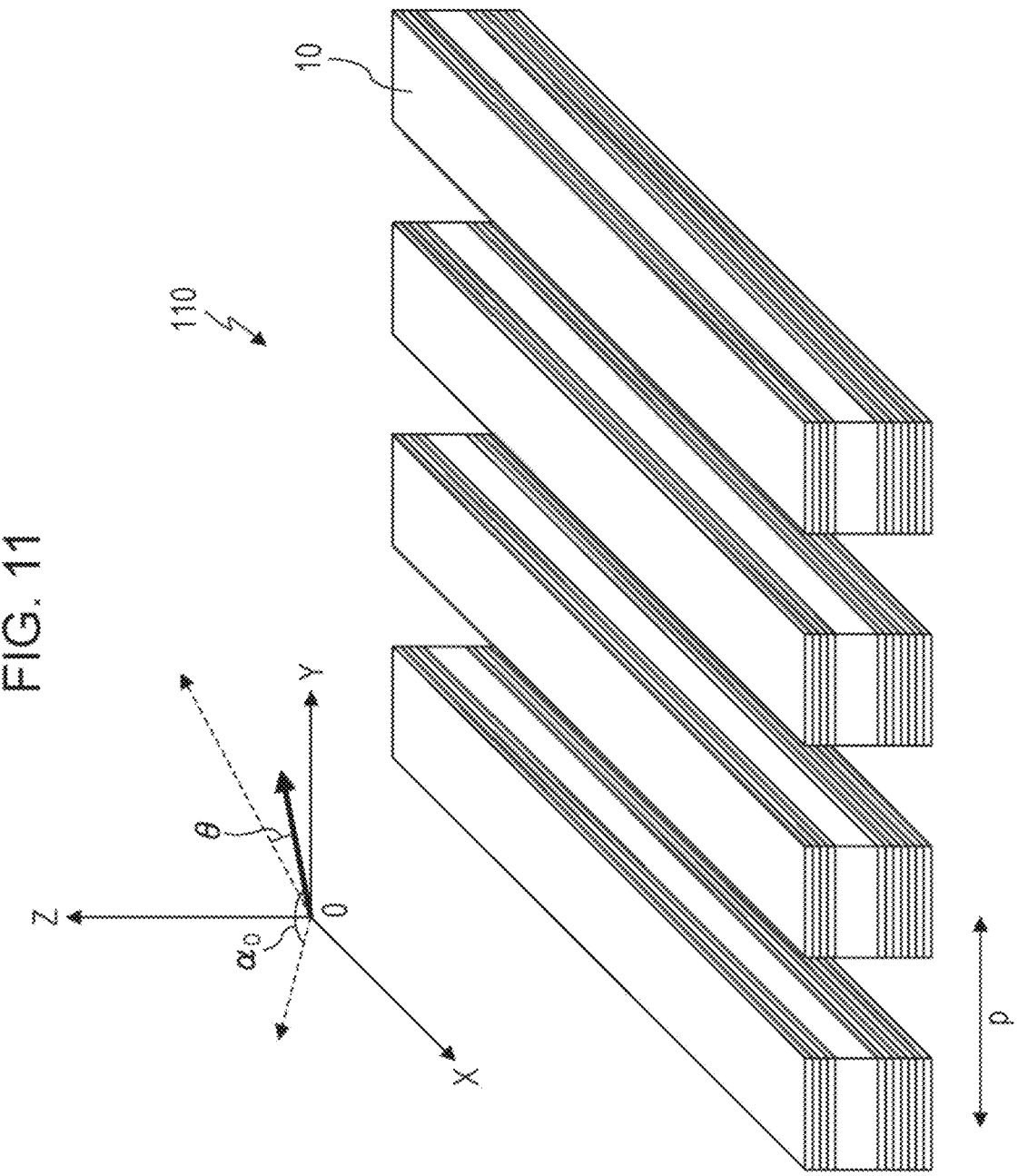
FIG. 11 is a perspective view schematically illustrating an optical waveguide array in a three-dimensional space.

FIG. 11 is a perspective view schematically illustrating the optical waveguide array in a three-dimensional space. The bold arrow illustrated in FIG. 11 indicates the direction of light emitted from the light emitter. Also, θ is the angle obtained between the light emission direction and the YZ plane. The angle θ satisfies Expression (2). Also, $\alpha_0$ is the angle obtained between the light emission direction and the XZ plane. The angle do satisfies Expression (3).

To control the phase of the light emitted from each of the optical waveguide elements 10, a phase shifter that shifts the phase of the light may be provided upstream before the light is introduced into the optical waveguide elements 10, for example. The light emitter may be provided with a plurality of phase shifters respectively connected to the plurality of optical waveguide elements 10, and a second adjustment element that adjusts the phase of the light propagating through each phase shifter. Each phase shifter includes an optical waveguide coupled to the optical waveguide layer 20 in a corresponding one of the plurality of optical waveguide elements 10 directly, or through another optical waveguide. The second adjustment element varies the direction of light emitted from the plurality of optical waveguide elements 10

(that is, the third direction D3) by respectively varying the differences in the phase of the light propagating to the plurality of optical waveguide elements 10 from the plurality of phase shifters. In the following description, the arranged plurality of phase shifters may be referred to as the "phase shifter array", similarly to the optical waveguide array.

Figure 12:
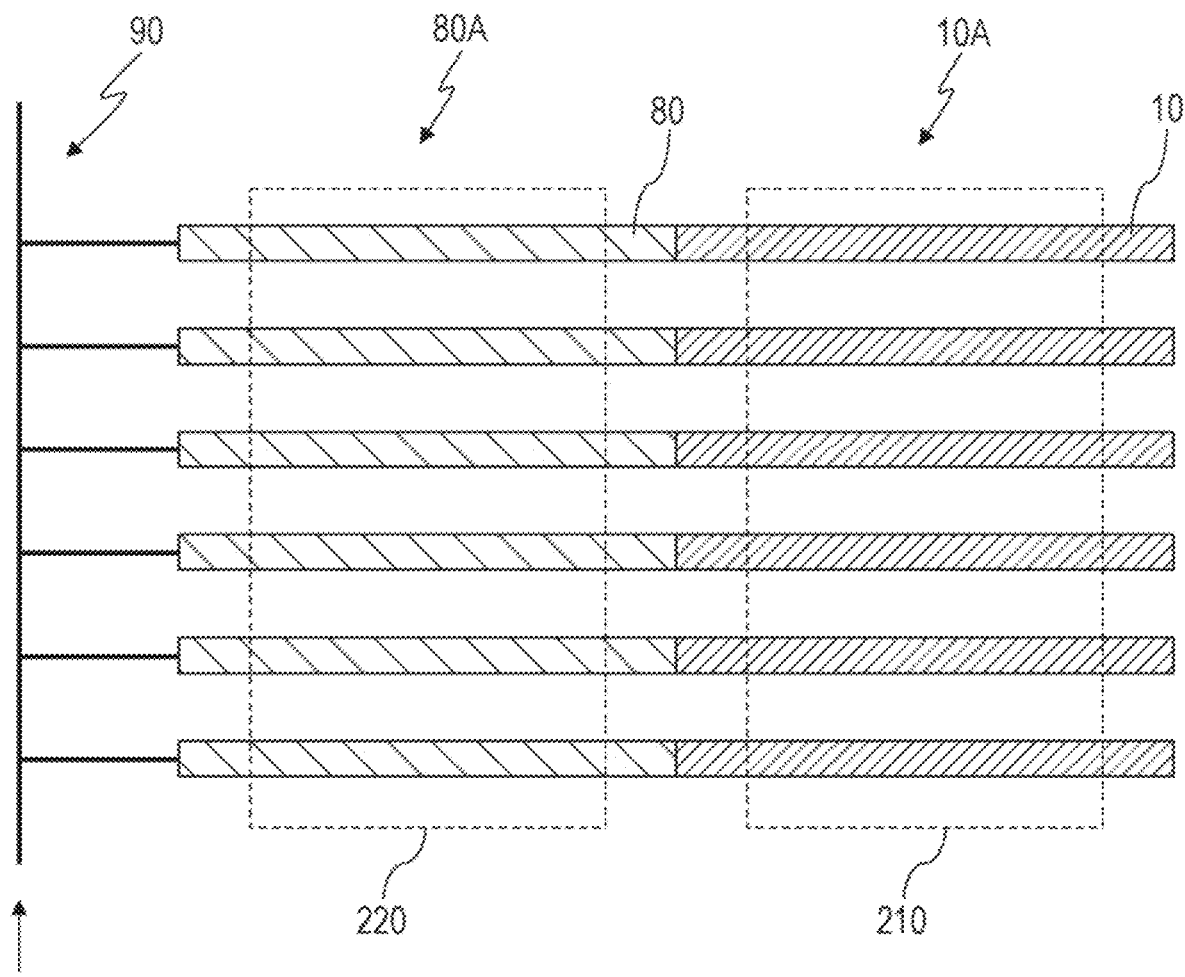
FIG. 12 is a schematic diagram of an optical waveguide array and a phase shifter array as viewed from the normal direction of the light emission surface.

FIG. 12 is a schematic diagram of an optical waveguide array 10A and a phase shifter array 80A as viewed from the normal direction (Z direction) of the light emission surface. In the example illustrated in FIG. 12, all phase shifters 80 have the same propagation characteristics, and all optical waveguide elements 10 have the same propagation characteristics. Each of the phase shifters 80 and each of the optical waveguide elements 10 may be the same length or different lengths. In the case where the phase shifters 80 are of equal length, the phase shift magnitude of each can be adjusted by the driving voltage, for example. Also, by adopting a structure in which the length of each of the phase shifters 80 is varied in equal steps, the phase shift of the equal steps can also be applied at the same driving voltage. Furthermore, the light emitter is additionally provided with an optical splitter 90 that splits light into the plurality of phase shifters 80, a first driving circuit 210 that drives each optical waveguide element 10, and a second driving circuit 220 that drives each phase shifter 80. The straight arrow in FIG. 12 illustrates the input of light. By independently controlling the first driving circuit 210 and the second driving circuit 220 provided separately, the light emission direction can be varied two-dimensionally. In this example, the first driving circuit 210 functions as one element of the first adjustment element, and the second driving circuit 220 functions as one element of the second adjustment element.

The first driving circuit 210 varies the angle of the light emitted from the optical waveguide layer 20 in each optical waveguide element 10 by varying at least one of the refractive index or the thickness of the optical waveguide layer 20. The second driving circuit 220 varies the phase of the light propagating internally through an optical waveguide 20a in each phase shifter 80 by varying the refractive index of the optical waveguide 20a. The optical splitter 90 may be configured by an optical waveguide through which light propagates by total reflection, or may be configured by a reflection waveguide similar to the optical waveguide elements 10.

Note that light may be respectively introduced into the phase shifters 80 after controlling the phase of each beam of light in the optical splitter 90. For the phase control, a passive phase control structure that controls the phase by adjusting the length of the optical waveguides leading to the phase shifters 80 can be used, for example. Alternatively, a phase shifter controllable by an electrical signal and having functions similar to the phase shifters 80 may be used. According to such a method, the phase may be adjusted before the light is introduced into the phase shifters 80 such that light of equal phase is supplied to all of the phase shifters 80, for example. With such adjustment, the control of each phase shifter 80 by the second driving circuit 220 can be simplified.

Details such as the operating principle and the operation method of the above light emitter are disclosed in Patent Literature 4. The entire disclosure of Patent Literature 4 is incorporated herein by reference.

Figure 13:
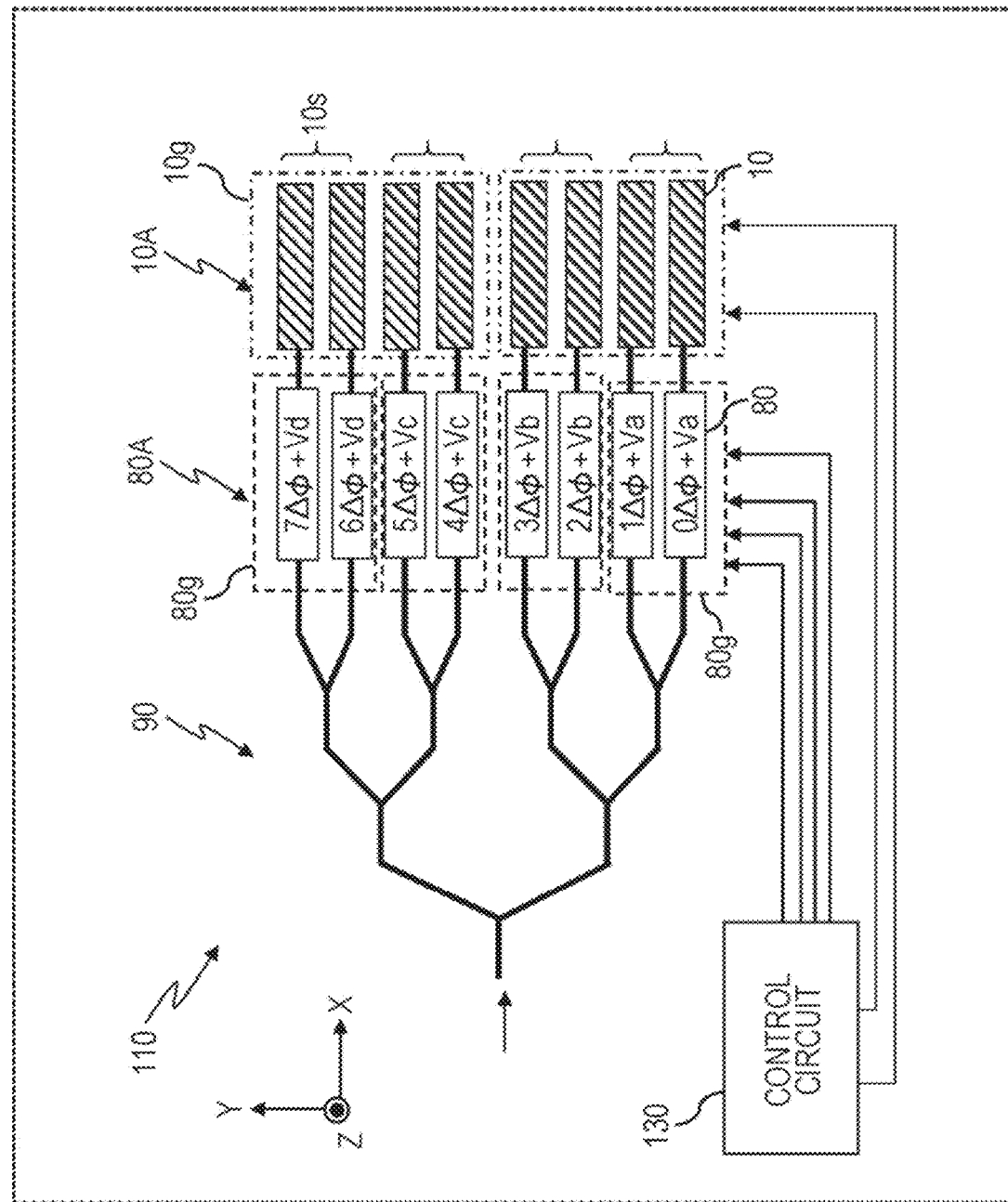
FIG. 13 is a diagram illustrating another example of a beam scanner.

FIG. 13 is a diagram illustrating another example of the beam scanner 110. The beam scanner 110 in this example is provided with an optical waveguide array 10A and a phase shifter array 80A connected to the optical waveguide array 10A. The optical waveguide array 10A includes a plurality of optical waveguide groups 10g arranged in the Y direction. Each optical waveguide group 10g includes one or more optical waveguide elements 10. The phase shifter array 80A includes a plurality of phase shifter groups 80g arranged in the Y direction. Each phase shifter group 80g includes one or more phase shifters 80. In this example, the grouping of the phase shifter groups 80g differs from the grouping of the optical waveguide groups 10g. More specifically, two phase shifter groups 80g are connected to one optical waveguide group 10g.

The phase shift magnitude of each phase shifter 80 is controlled individually by the control circuit 130. The phase shift magnitude of each phase shifter 80 is controlled to be the sum of a first phase shift magnitude corresponding to the order of arrangement (an integer multiple of $\Delta_\varphi$) and a second phase shift magnitude different for each phase shifter group 80g (one of Va, Vb, Vc, or Vd). By varying the second phase shift magnitude for each phase shifter group 80g, the Y component of the emission direction of the light beam and the spread angle of the spot size in the Y direction are controlled.

On the other hand, the control circuit 130 determines the value of the applied voltage individually for each optical waveguide group 10g. By controlling the voltage applied to each optical waveguide group 10g, the X component of the emission direction of the light beam is controlled. The emission direction of light is determined according to the combination of the phase shifter group 80g and the optical waveguide group 10g. In the example of FIG. 13, light is emitted in the same direction from a group 10s of two adjacent optical waveguide elements 10 connected to one phase shifter group 80g. If the luminous flux emitted from one optical waveguide group 10g is treated as a single light beam, two light beams can be emitted at the same time in the example of FIG. 13. The number of beams can be increased further by increasing the numbers of optical waveguide elements 10 and phase shifters 80.

Figure 14:
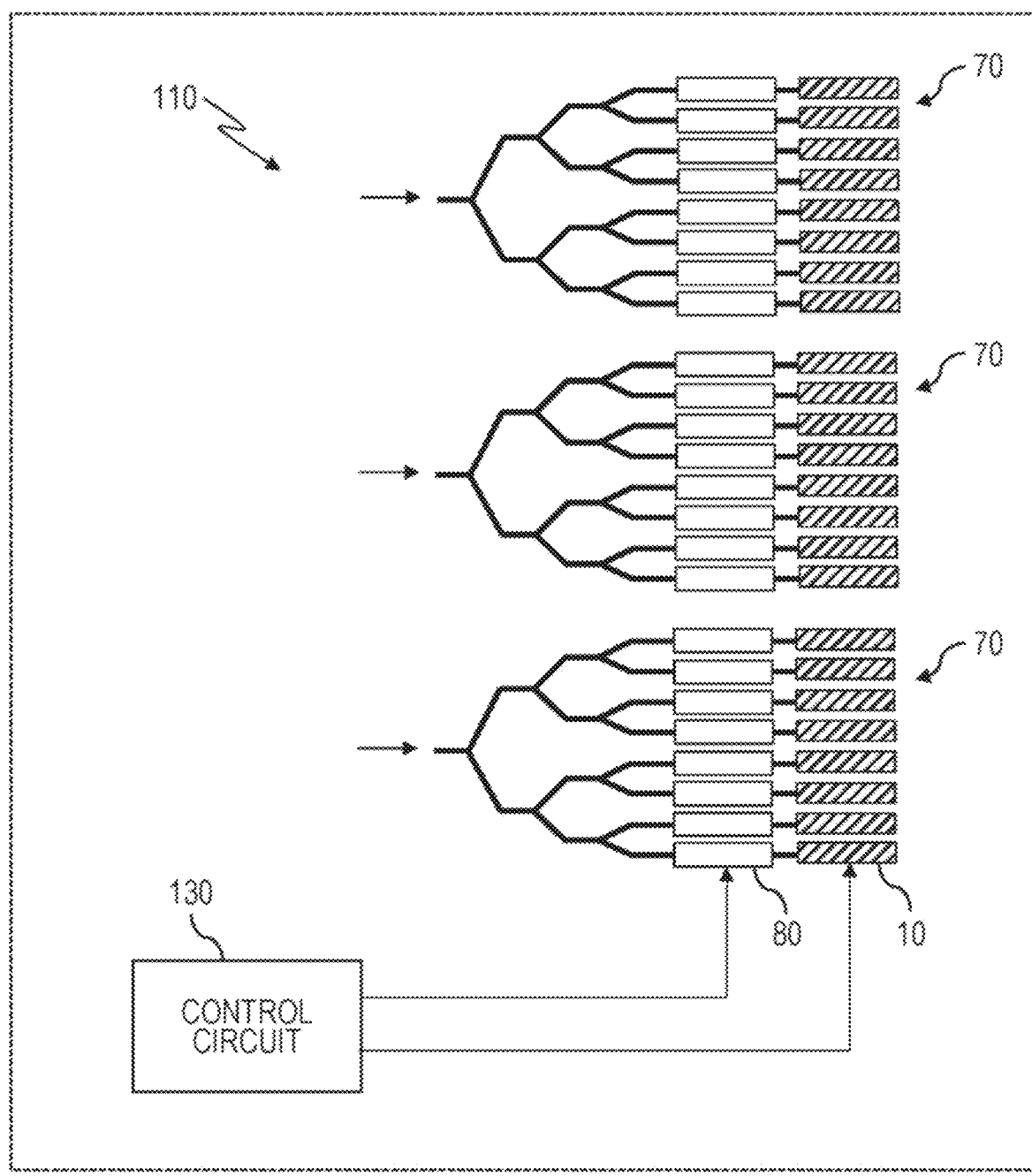
FIG. 14 is a diagram illustrating yet another example configuration of a beam scanner.

FIG. 14 is a diagram illustrating another example of the configuration of the beam scanner 110. The beam scanner 110 in this example is provided with a plurality of light emitters 70, each of which emits a light beam in a different direction. In this example, a plurality of phase shifters 80 and a plurality of optical waveguide elements 10 are mounted on a single chip. The control circuit 130 controls the voltage applied to each phase shifter 80 and each optical waveguide element 10 in each light emitter 70. With this arrangement, the control circuit 130 controls the direction of the light beam emitted from each light emitter 70. In this example, the beam scanner 110 is provided with three light emitters 70, but a greater number of light emitters 70 may also be provided.

Figure 15:
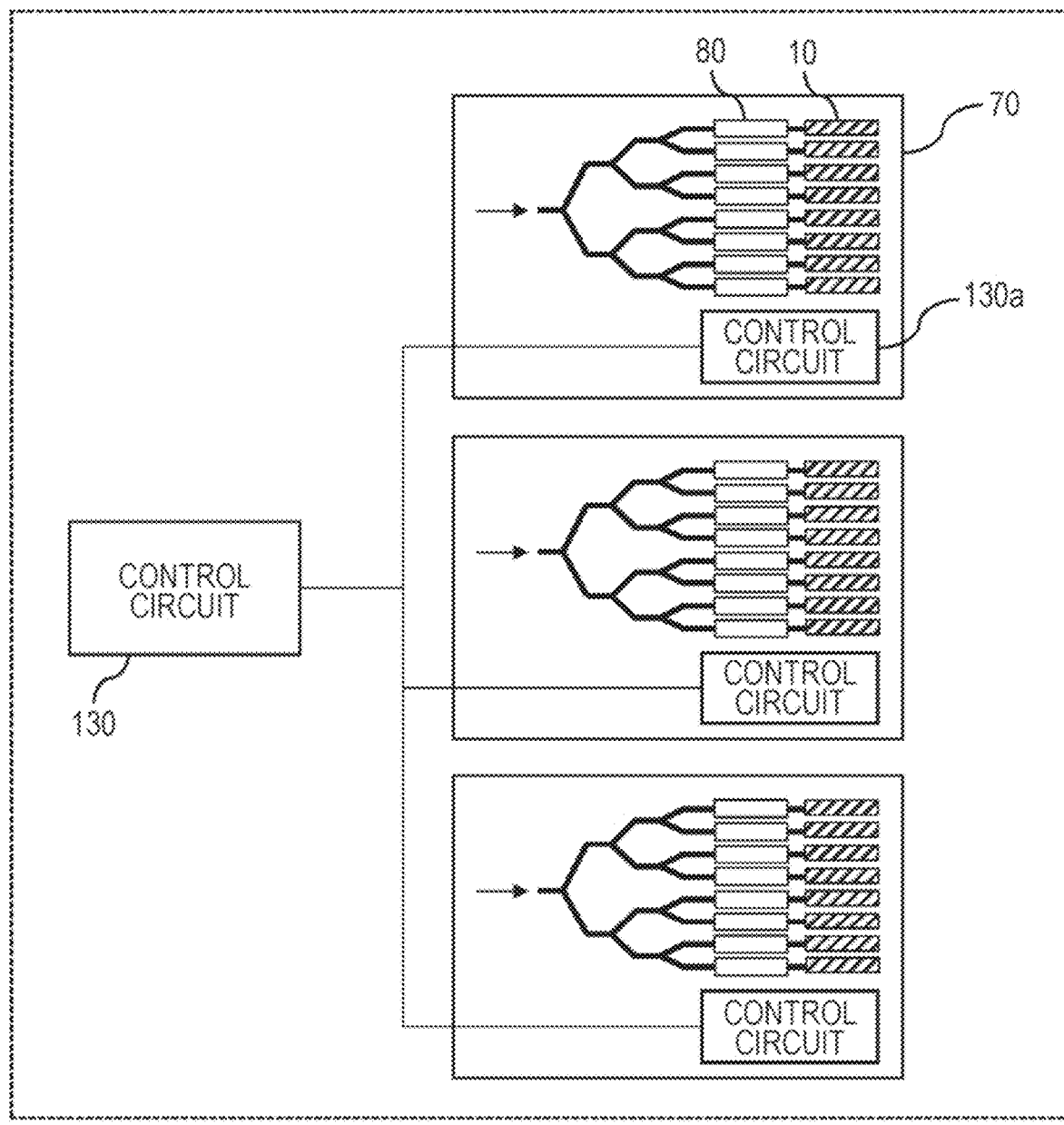
FIG. 15 is a diagram illustrating yet another example configuration of a beam scanner.

FIG. 15 is a diagram illustrating another example of the configuration of the beam scanner 110. The beam scanner 110 in this example is provided with a plurality of light emitters 70, each of which is mounted on a different chip. The plurality of light emitters 70 emit light beams in different directions. Each light emitter 70 is provided with a control circuit 130a that determines a voltage to be applied to a plurality of phase shifters 80 and a plurality of optical waveguide elements 10. The control circuit 130a in each light emitter 70 is controlled by an external control circuit 130. In this example as well, the beam scanner 110 is provided with three light emitters 70, but a greater number of light emitters 70 may also be provided.

Figure 16:
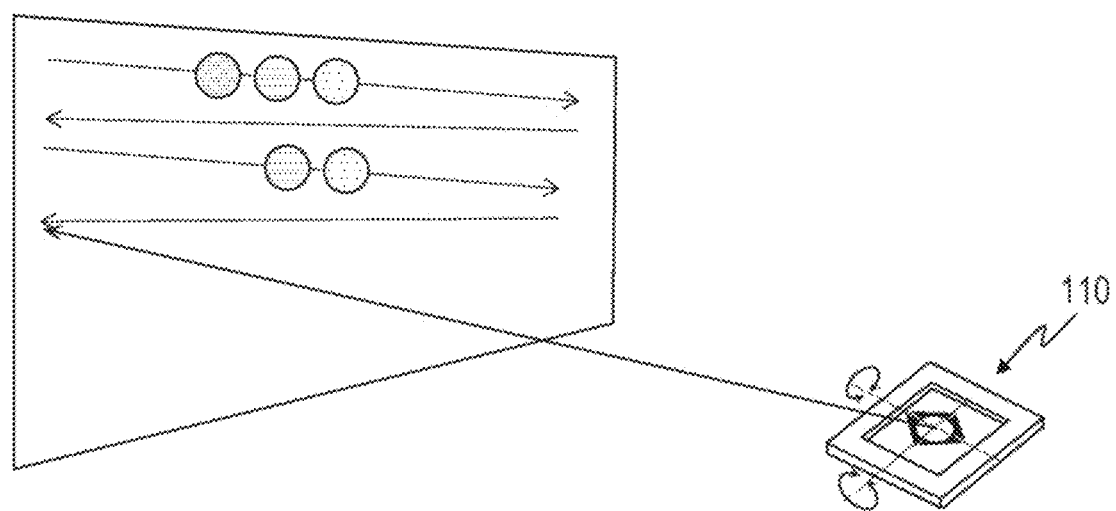
FIG. 16 is a diagram illustrating yet another example of a beam scanner.

FIG. 16 is a diagram illustrating yet another example of the beam scanner 110. In this example, the beam scanner 110 is provided with a light-emitting element such as a laser and at least one movable mirror such as a MEMS mirror. Light emitted from the light-emitting element is reflected by the movable mirror and directed toward a predetermined region inside a target region (displayed as a rectangle in FIG. 16). By driving the movable mirror, the control circuit 130 varies the direction of the light emitted from the beam scanner 110. With this arrangement, the target region can be scanned with light as indicated by the dotted-line arrows in FIG. 16 for example.

[1-1-3 Configuration of Image Sensor 120]

Next, an example of the configuration of the image sensor 120 will be described. The image sensor 120 is provided with a plurality of light-receiving elements arranged two-dimensionally on a light-receiving surface. An optical component not illustrated may also be provided facing the light-receiving surface of the image sensor 120. The optical component may include at least one lens, for example. The optical component may also include another optical element such as a prism or a mirror. The optical component may be designed such that light diffused from a single point on an object in a scene is condensed onto a single point on the light-receiving surface of the image sensor 120.

The image sensor 120 may be a charge-coupled device (CCD) sensor, a complementary metal-oxide-semiconductor (CMOS) sensor, or an infrared array sensor, for example. Each light-receiving element includes a photoelectric transducer such as a photodiode for example and one or more charge storage units. Charge produced by photoelectric conversion is stored in the charge storage unit(s) for the duration of an exposure period. The charge stored in the charge storage unit(s) is outputted after the exposure period ends. With this arrangement, each light-receiving element outputs an electrical signal corresponding to the amount of light received during the exposure period. The electrical signal may be referred to as "light reception data". The image sensor 120 may be a monochrome image sensor or a color image sensor. For example, a color image sensor including an R/G/B, R/G/B/IR, or R/G/B/W filter may be used. The image sensor 120 is not limited to the wavelength range of visible light, and may also have detection sensitivity in a wavelength range such as ultraviolet, near-infrared, mid-infrared, or far-infrared. The image sensor 120 may also be a sensor utilizing a single-photon avalanche diode (SPAD). The image sensor 120 may be provided with the mechanism of an electronic shutter capable of reading out the signals from all exposed pixels at once, otherwise known as a global shutter. The electronic shutter may also be a rolling shutter, which performs exposure line by line, or an area shutter, which performs exposure in only a partial area in coordination with the range being irradiated by a light beam.

[1-1-4 Example of distance measurement method]

In the present embodiment, the signal processing circuit 160 measures the distance to an object according to a distance measurement method called indirect ToF. Hereinafter, an example of a typical distance measurement method using indirect ToF will be described. Note that the distance measurement method is not limited to indirect ToF, and a distance measurement method using direct ToF may also be used.

ToF is a method of measuring the distance from a device to an object by measuring the time of flight taken for light emitted from a light source to be reflected by the object and return to a photodetector near the light source. A method of measuring the time of flight directly is called direct ToF. A method of providing a plurality of exposure periods and calculating the time of flight from the energy distribution of the reflected light in each exposure period is called indirect ToF.

Figure 17A:
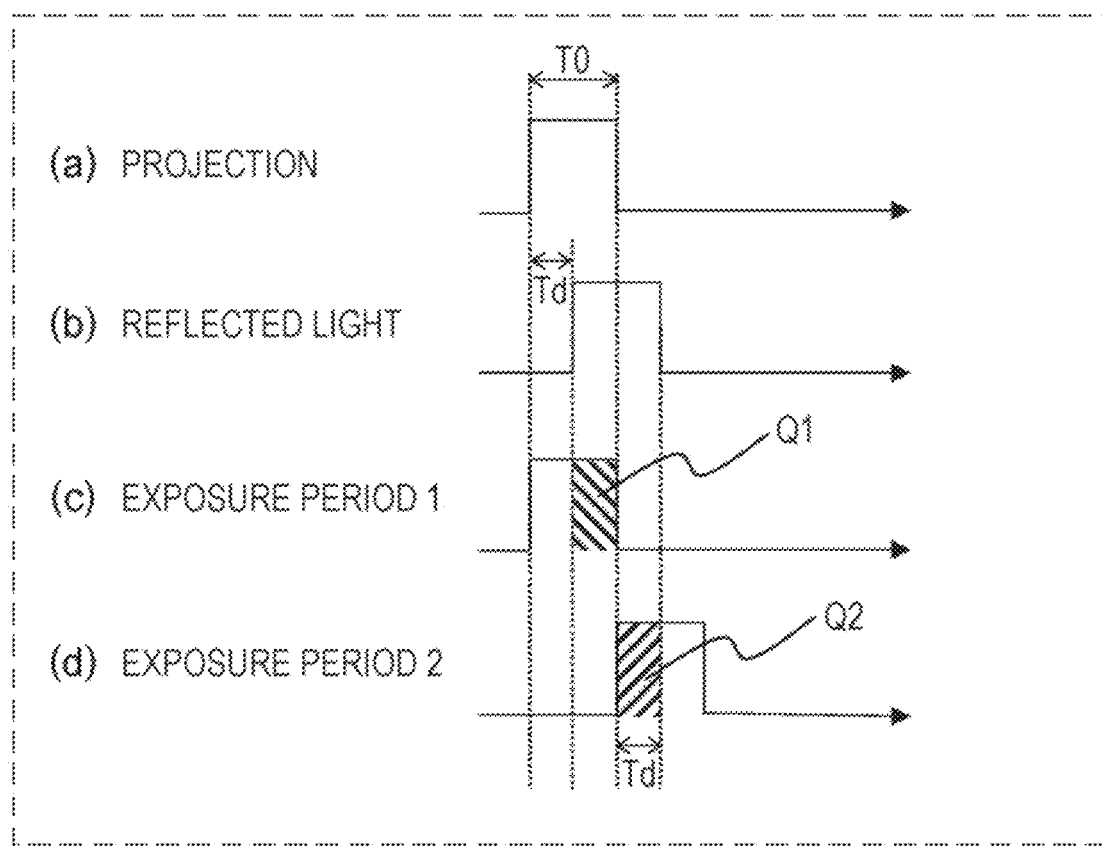
FIG. 17A is a first diagram for explaining a distance measurement method by indirect ToF.

FIG. 17A is a diagram illustrating an example of the light projection timing, the arrival timing of reflected light, and two exposure timings in indirect ToF. The horizontal axis represents time. The rectangular portions indicate the respective periods of the light projection, the arrival of reflected light, and the two exposures. In this example, a case in which a single light beam is emitted and a light-receiving element receiving reflected light produced by the light beam is exposed twice successively is described for simplicity. The portion (a) in FIG. 17A illustrates the timing at which light is emitted from a light source. Here, T0 is the pulse width of the light beam used for distance measurement. The portion (b) in FIG. 17A illustrates the period in which the light beam that has been emitted from the light source and reflected by an object arrives at the image sensor. Here, Td is the time of flight of the light beam. In the example of FIG. 17A, reflected light arrives at the image sensor in a time Td shorter than the duration T0 of the light pulse. The portion (c) in FIG. 17A illustrates a first exposure period of the image sensor. In this example, exposure is started at the same time as the start of light projection, and exposure is ended at the same time as the end of light projection. In the first exposure period, the early-returning portion of the reflected light is photoelectrically converted, and the charge generated thereby is stored. Here, Q1 represents the energy of the light photoelectrically converted in the first exposure period. The energy Q1 is proportional to the quantity of charged stored in the first exposure period. The portion (d) in FIG. 17A illustrates a second exposure period of the image sensor. In this example, the second exposure period is started at the same time as the end of light projection, and is ended at the time point when the same time as the pulse width T0 of the light beam, or in other words the same time as the first exposure period, elapses. Here, Q2 represents the energy of the light photoelectrically converted in the second exposure period. The energy Q2 is proportional to the quantity of charged stored in the second exposure period. In the second exposure period, the portion of the reflected light arriving after the end of the first exposure period is received. Because the length of the first exposure period is equal to the pulse width T0 of the light beam, the duration of the reflected light received in the second exposure period is equal to the time of flight Td.

At this point, let Cfd1 be the integrated quantity of charge stored in the light-receiving element in the first exposure period, let Cfd2 be the integrated quantity of charge stored in the light-receiving element in the second exposure period, let Iph be the photoelectric current, and let N be the number of charge transfer clock cycles. The output voltage of the light-receiving element in the first exposure period is expressed by Vout1 as follows.

$$Vout1 = Q1/Cfd1 = N \times Iph \times (T0-Td)/Cfd1$$

The output voltage of the light-receiving element in the second exposure period is expressed by Vout2 as follows.

$$Vout2 = Q2/Cfd2 = N \times Iph \times Td/Cfd2$$

In the example of FIG. 17A, the duration of the first exposure period is equal to the duration of the second exposure period, and therefore Cfd1=Cfd2. Consequently, Td can be expressed by the following formula.

$$Td = \{Vout2/(Vout1+Vout2)\} \times T0$$

Provided that C is the speed of light (approximately $3\times10^8$ m/s), the distance L between the device and the object is expressed by the following formula.

$$L=\tfrac{1}{2}\times C\times Td=\tfrac{1}{2}\times C\times\{Vout2/(Vout1+Vout2)\}\times T0$$

Because the image sensor actually outputs charge stored in the exposure periods, in some cases it may not be possible to perform two exposures consecutively in time. In such cases, the method illustrated in FIG. 17B may be used, for example.

Figure 17B:
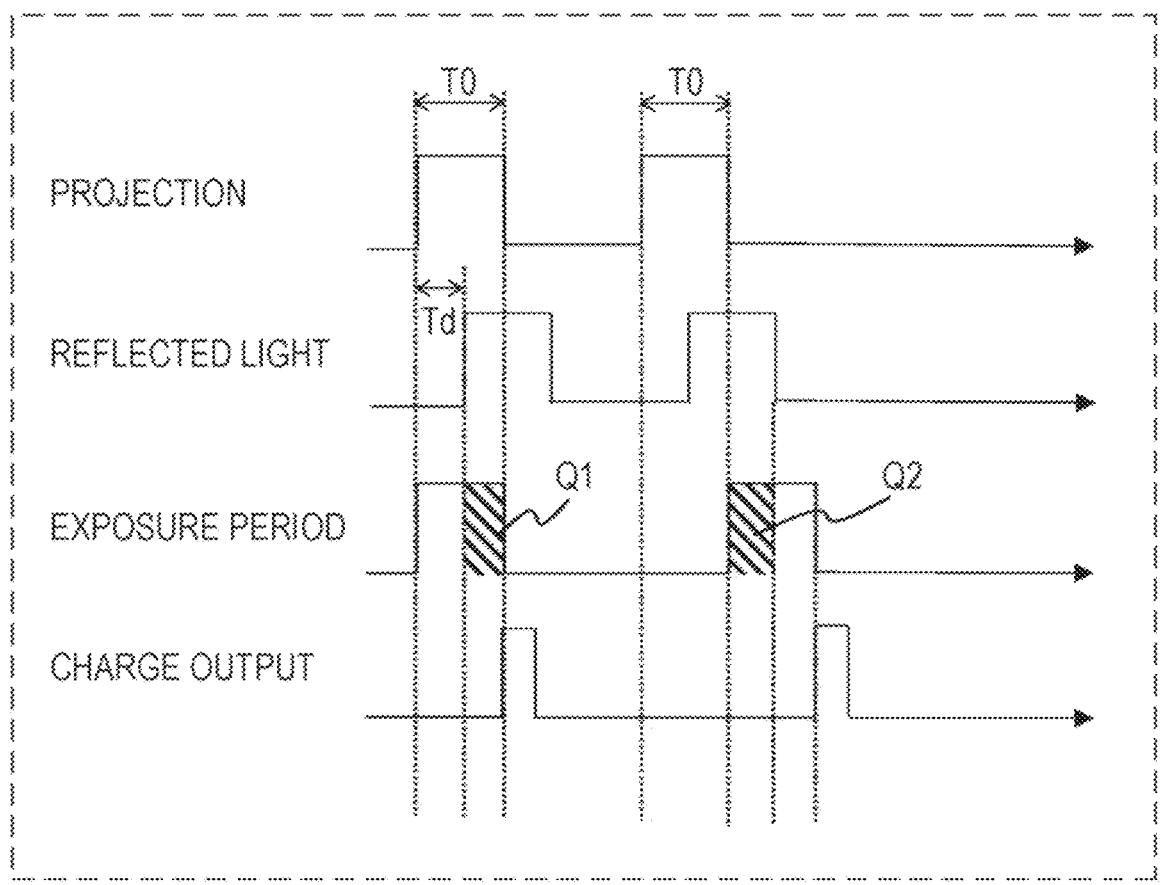
FIG. 17B is a second diagram for explaining a distance measurement method by indirect ToF.

FIG. 17B is a diagram schematically illustrating the timings of light projection, exposure, and charge output in the case where two consecutive exposure periods cannot be provided. In the example of FIG. 17B, first, the image sensor starts exposure at the same time as when the light source starts light projection, and the image sensor ends exposure at the same time as when the light source ends light projection. This exposure period corresponds to the exposure period 1 in FIG. 17A. The image sensor outputs the charge stored in the exposure period immediately after exposure. The quantity of charge corresponds to the energy Q1 of the received light. Next, the light source starts light projection again, and ends the light projection when the same time T0 as the first exposure elapses. The image sensor starts exposure at the same time as when the light source ends light projection, and ends the exposure when the same length of time as the first exposure period elapses. This exposure period corresponds to the exposure period 2 in FIG. 17A. The image sensor outputs the charge stored in the exposure period immediately after exposure. The quantity of charge corresponds to the energy Q2 of the received light.

In this way, in the example of FIG. 17B, to acquire the above signals for distance measurement, the light source projects light twice and the image sensor performs exposure at different timings with respect to each of the light projections. With this arrangement, a voltage can be acquired for each exposure period, even in the case where two exposure periods cannot be provided consecutively in time. In this way, with an image sensor that outputs the charge from each exposure period, light is projected under the same conditions a number of times equal to the number of preset exposure periods to acquire information about the charge stored in each of the plurality of set exposure periods.

Note that in actual distance measurement, the image sensor may receive not only light that is emitted from the light source and reflected by an object, but also background light, namely sunlight or light from an external source such as nearby lighting equipment. Accordingly, an exposure period for measuring the stored charge due to background light being incident on the image sensor in a state with no light beam being emitted is generally provided. By subtracting the quantity of charge measured in the background exposure period from the quantity of charge measured when the reflected light of a light beam is received, the quantity of charge in the case of receiving only the reflected light of a light beam can be calculated. In the present embodiment, a description of the operations related to background light is omitted for simplicity.

The above example focuses on only a single light beam for simplicity, but a plurality of light beams may also be emitted successively. Hereinafter, an example of light detection operations in the case where two light beams are emitted successively will be described.

Figure 18A:
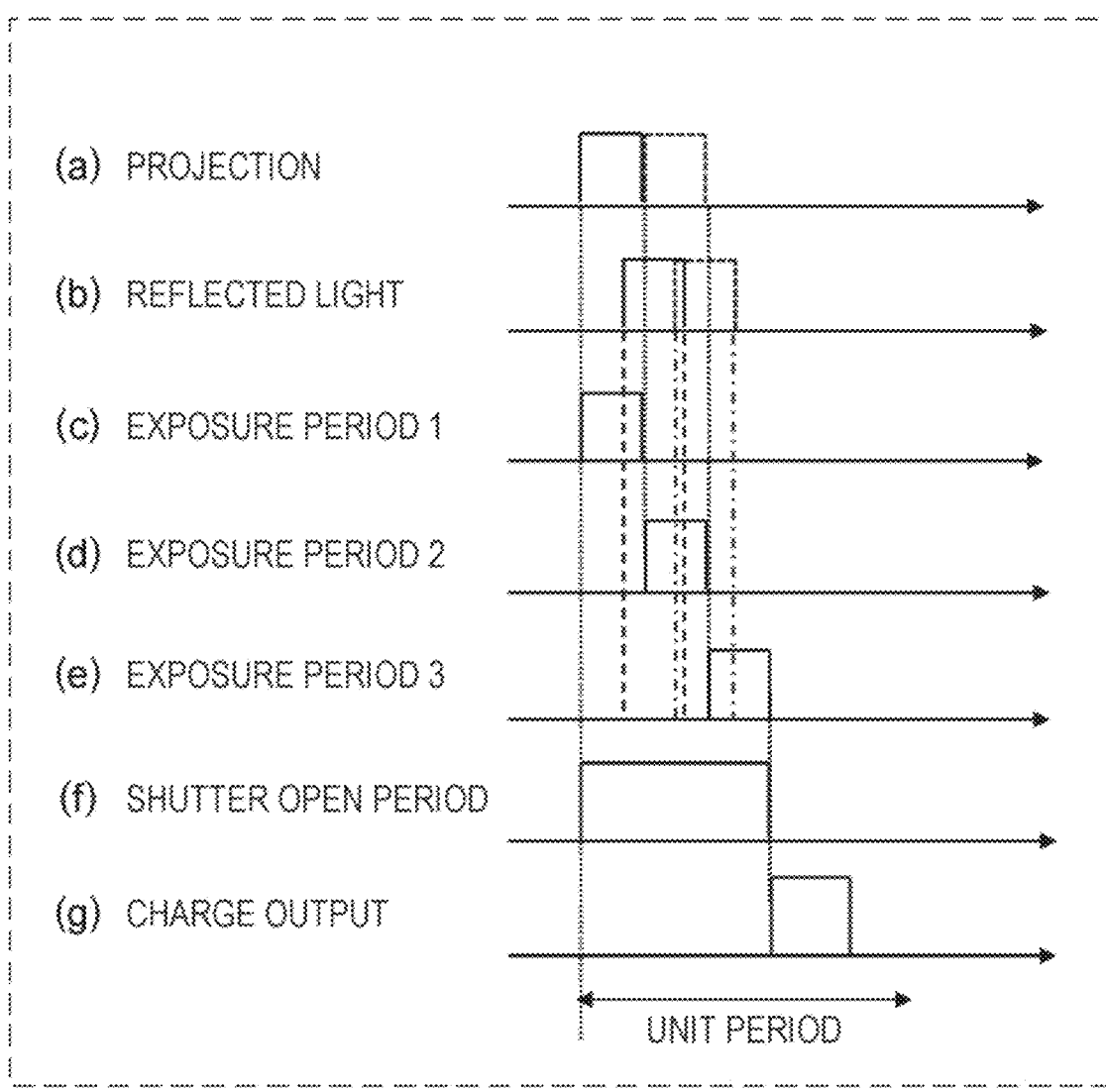
FIG. 18A is a third diagram for explaining a distance measurement method by indirect ToF.

FIG. 18A is a diagram illustrating a first example of light detection in the case where two light beams are emitted successively in different directions in each unit period. The horizontal axis represents time. In this example, exposure is performed three times successively within a unit period.

The portion (a) in FIG. 18A illustrates the timings at which the two light beams are emitted from a light source. The portion (b) in FIG. 18A illustrates the timings at which reflected light produced by the two light beams emitted from the light source being diffused by an object arrive at the image sensor in the light receiver. In this example, when the projection of the first light beam indicated by the solid line ends, the projection of the second light beam indicated by the dashed line is started immediately. The reflected light of these light beams arrives at the image sensor slightly later than the projection timing of each light beam. The first light beam and the second light beam have different emission directions, and the reflected light from these light beams is incident on two different light-receiving elements or two different light-receiving element groups in the image sensor. The portions (c) to (e) in FIG. 18A illustrate first to third exposure periods, respectively. In this example, the first exposure period is started at the same time as the start of projection of the first light beam, and is ended at the same time as the end of light projection. The second exposure period is started at the same time as the start of projection of the second light beam, and is ended at the same time as the end of light projection. The third exposure period is started at the same time as the end of projection of the second light beam, and is ended when the same time as the duration of the pulse of the second light beam elapses. The portion (f) in FIG. 18A illustrates the shutter open period of the image sensor. The portion (g) in FIG. 18A illustrates the period of charge output from each light-receiving element.

In this example, each light-receiving element of the image sensor independently stores charge generated by photoelectric conversion in the three exposure periods. The charges stored in each charge storage period are read out at the same time. To achieve the above operation, each light-receiving element is provided with three or more charge storage units. The storage of charge in these charge storage units is switched by a switch, for example. The length of each exposure period is set to a time shorter than the shutter open period. The image sensor starts exposure by opening the shutter at the start time point of the projection of the first light beam. The shutter remains open throughout a period in which there is a possibility of receiving reflected light. When the period in which reflected light produced by the last light beam may be received ends, that is, when the third exposure period ends, the image sensor closes the shutter and ends exposure. When the shutter open period ends, the image sensor performs signal readout. At this time, signals corresponding to the respective quantities of charge in the first to third charge storage periods are read out for each pixel. The read-out signals are sent to the signal processing circuit 160 as light reception data. On the basis of the light reception data, the signal processing circuit 160 can calculate the distance for light-receiving elements that have received reflected light according to the method described with reference to FIG. 17A.

According to the example in FIG. 18A, a plurality of charge storage units are necessary for each light-receiving element, but the charges stored in the plurality of charge storage units can be outputted all at once. Consequently, iterations of light projection and exposure can be performed in a short time.

FIG. 18B is a diagram illustrating a second example of light detection in the case where two light beams are emitted successively in different directions in each unit period. In the example of FIG. 18B, like the example of FIG. 17B, charge is outputted every time an exposure period ends. In a single unit period, the emission, exposure, and charge output with respect to a first light beam and a second light beam are repeated for three sets. In the first set, the exposure of each light-receiving element is started at the same time as the start of the projection of the first light beam, and the exposure is ended at the same time as the end of the projection of the first light beam. This exposure period P1 corresponds to the exposure period 1 illustrated in FIG. 18A. When the exposure period P1 ends, the charge stored in each light-receiving element is read out. In the second set, the exposure of each light-receiving element is started at the same time as the end of the projection of the first light beam, that is, at the same time as the start of the projection of the second light beam, and the exposure is ended at the same time as the end of the projection of the second light beam. This exposure period P2 corresponds to the exposure period 2 illustrated in FIG. 18A. When the exposure period P2 ends, the charge stored in each light-receiving element is read out. In the third set, the exposure of each light-receiving element is started at the same time as the end of the projection of the second light beam, and the exposure is ended when a length of time corresponding to the pulse width of each light beam elapses. This exposure period P3 corresponds to the exposure period 3 illustrated in FIG. 18A. When the exposure period P3 ends, the charge stored in each light-receiving element is read out. In this example, the series of operations including the successive projection of a plurality of light beams, the exposure, and the readout of light reception data is repeated three times in each unit period. With this arrangement, light reception data corresponding to the quantity of charge in each exposure period can be acquired for each light-receiving element, similarly to the example in FIG. 17B. With this arrangement, the distance can be calculated according to the computations described above.

According to the example in FIG. 18B, it is sufficient for each light-receiving element to include a single charge storage unit, and therefore the structure of the image sensor can be simplified.

Note that in the examples of FIGS. 18A and 18B, three exposure periods are set in each unit period, but the number of exposure periods per unit period may also be two or fewer, or four or more. For example, in the case of using a light source capable of emitting light beams in a plurality of directions simultaneously, there may be two exposure periods per unit period. In this case, the distance can be calculated according to the method described with reference to FIG. 17A or 17B. Alternatively, in the case of applying a distance calculation method using direct ToF described later, there may be one exposure period per unit period. Furthermore, the number of light beams emitted per unit period is not limited to two, and may also be three or more. The timings of light projection and light reception may be adjusted according to properties such as a setting related to the distance range of the plurality of light beams.

[1-1-5 Configuration of distance measurement unit 161]

Figure 19:
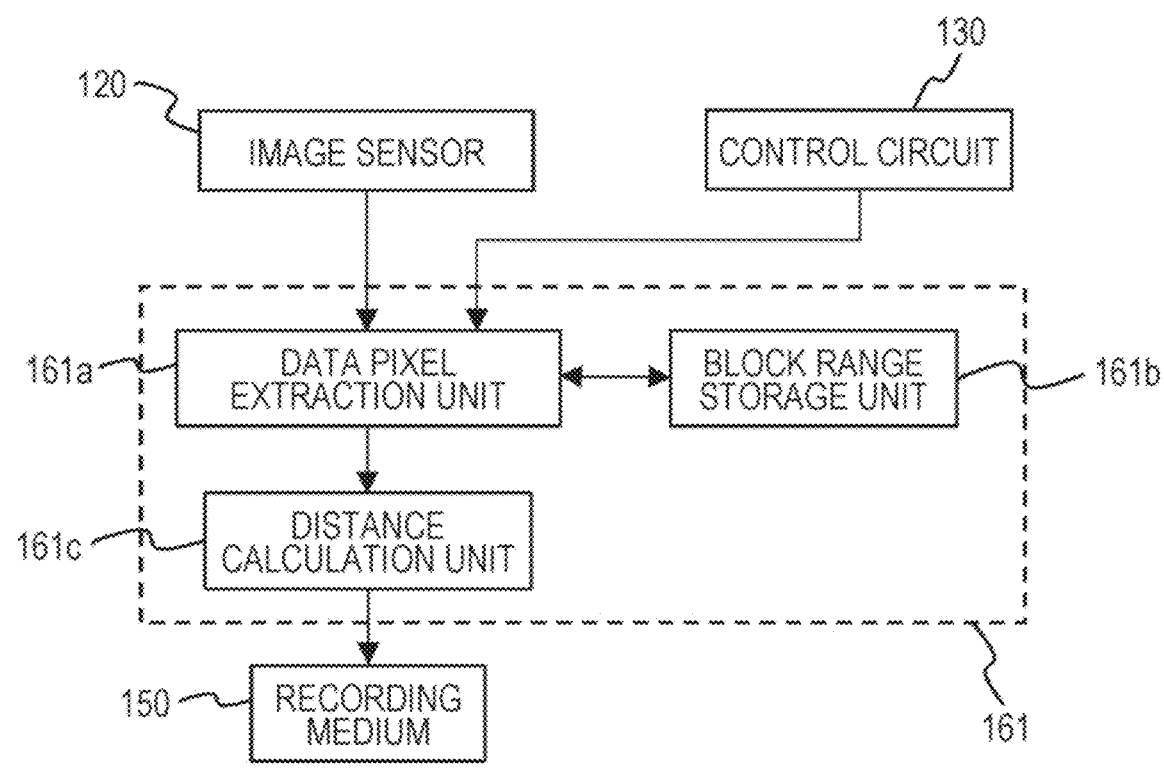
FIG. 19 is a block diagram illustrating a detailed functional configuration of a distance measurement unit.

The configuration of the distance measurement unit 161 will be described. FIG. 19 is a block diagram illustrating a detailed functional configuration of the distance measurement unit 161. The distance calculation unit 161 is provided with a data pixel extraction unit 161a, a block range storage unit 161b, and a distance calculation unit 161c. Note that the data pixel extraction unit 161a and the distance calculation unit 161c may be achieved by causing the signal processing circuit 160 to execute a computer program.

The data pixel extraction unit 161a acquires a signal corresponding to the quantity of charge stored in each pixel for each exposure period from the image sensor 120. The data pixel extraction unit 161a also acquires information indicating the direction of an emitted light beam from the control circuit 130. The data pixel extraction unit 161a references the block range storage unit 161b to extract a range of pixels where reflected light of the light beam in the indicated direction may be received. Furthermore, the data pixel extraction unit 161a extracts, from among the pixels of the image sensor 120, pixels which have a non-zero value in at least one of the two signals acquired for the two or more exposure periods, and which overlap with the above range of pixels. Pixels within the range of a predetermined number of pixels including the extracted pixels are determined as a block of pixels corresponding to the light beam. The predetermined number of pixels may be 100 included in a square region of 10 pixels in the x-axis direction and 10 pixels in the y-axis direction, for example.

The block range storage unit 161b is a recording medium such as memory. In the example of FIG. 19, the block range storage unit 161b is a separate element from the recording medium 150, but may also be included in the recording medium 150. In the block range storage unit 161b, each emission direction of a light beam is associated with a pixel range where reflected light of the light beam may be received. Furthermore, for each emission direction, a range of pixels that would receive reflected light from an object under the assumption that a sufficiently large object exists at a distance 100 m away for example is recorded as a "standard pixel range". The standard pixel range is included in the pixel range.

FIG. 20 illustrates an example of information recorded to the block range storage unit 161b. The direction of a light beam may be expressed by the components of a unit vector in the direction expressed in a predetermined three-dimensional coordinate system, for example. The three-dimensional coordinate system may take the center of the light-receiving surface as the origin, the direction corresponding to the horizontal direction of the image as the x axis, the direction corresponding to the vertical direction of the image as the y axis, and the direction perpendicular to the light-receiving surface and pointing toward the scene as the z axis, for example. The pixel range may be specified as a range of pixels included in a rectangular region from among the pixels of the image sensor 120. For example, the pixel range may be expressed by the upper-leftmost pixel position and the lower-rightmost pixel position in the outputted image. Similarly, the standard pixel range may also be specified by the upper-leftmost pixel position and the lower-rightmost pixel position in the image.

The distance calculation unit 161c calculates the distance only for the pixel range determined by the data pixel extraction unit 161a. The distance refers to the distance from the light-receiving surface of the image sensor 120 to an object. The distance is calculated according to the indirect ToF method described above, for example.

[1-2 Operations]

Next, operations by the distance measurement apparatus 100 will be described.

Figure 21:
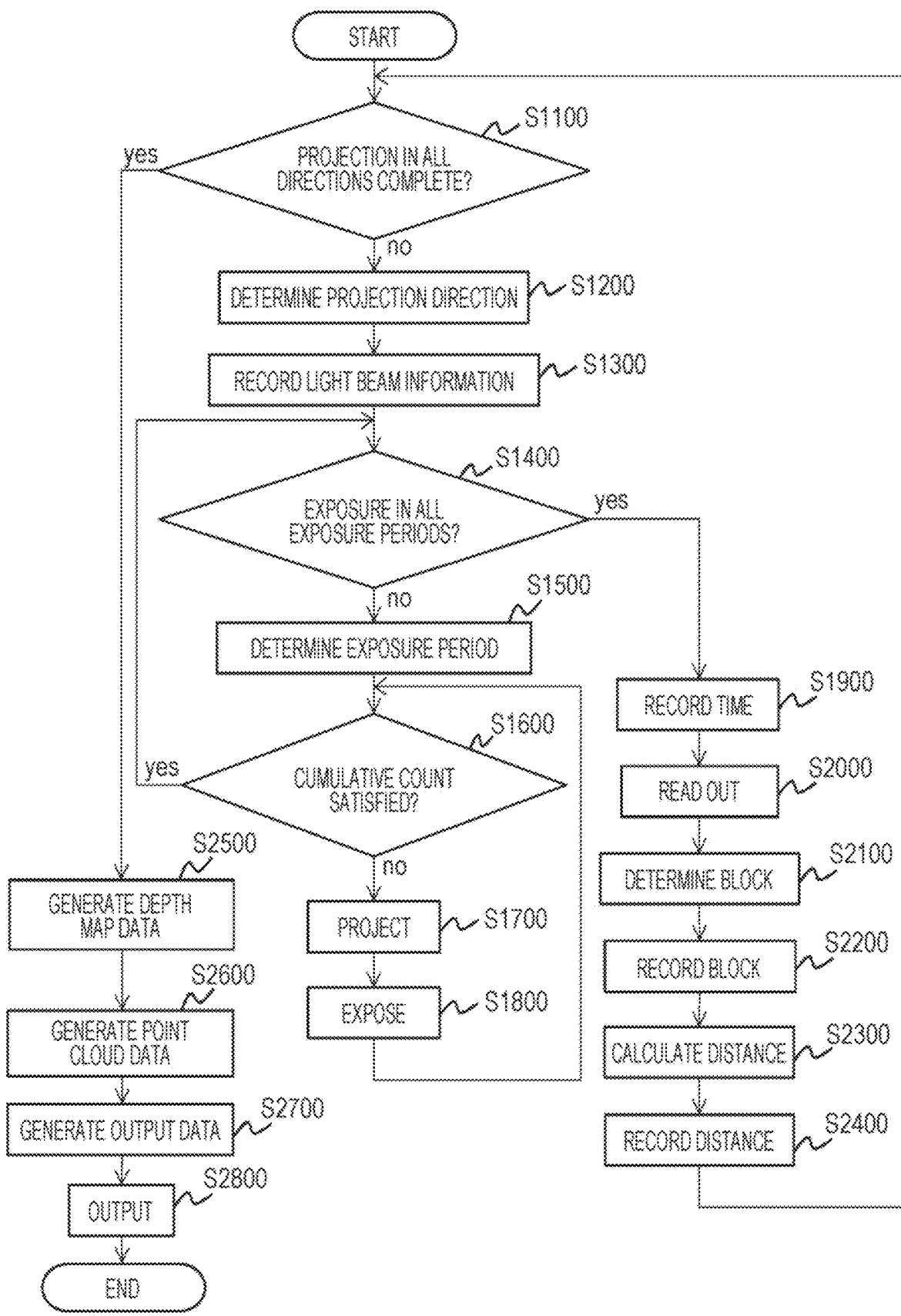
FIG. 21 is a flowchart illustrating an example of operations by a distance measurement apparatus.

FIG. 21 is a flowchart illustrating an example of operations by the distance measurement apparatus 100. The distance measurement apparatus 100 generates distance data and point cloud data for a single frame by executing the operations from step S1100 to step S2800 illustrated in FIG. 21. In the case of generating data for multiple frames successively, the distance measurement apparatus 100 repeats the operations from step S1100 to step S2800 illustrated in FIG. 21. Hereinafter, the operation in each step will be described.

(Step S1100)

First, the control circuit 130 determines whether or not a direction in which a light beam has not been projected exists among predetermined light beam directions. In the case where light projection has been completed for all of the predetermined directions, that is, in the case of "yes" in step S1100, the flow proceeds to step S2500. In the case where a direction in which a light beam has not been projected exists among the predetermined directions, that is, in the case of "no" in step S1100, the flow proceeds to step S1200.

(Step S1200)

The control circuit 130 determines the direction in which a light beam has not been projected from among the predetermined light beam directions.

(Step S1300)

The control circuit 130 records information indicating the light beam direction determined in step S1200 to the recording medium 150.

(Step S1400)

The control circuit 130 determines whether the exposure of the image sensor 120 has been completed for all of two or more predetermined exposure periods in the direction determined in step S1200. In the case of a "yes" determination, the flow proceeds to step S1900. In the case of a "no" determination, the flow proceeds to step S1500.

(Step S1500)

The control circuit 130 determines one of the exposure periods in which exposure has not been performed from among the two or more predetermined exposure periods. Each exposure period has the same duration as the duration of a light pulse emitted by the beam scanner 110, for example. A first exposure period is started at the same time as the start of light projection, and is ended at the same time as the end of light projection. A second exposure period is started at the same time as the end of light projection by the beam scanner 110, and is ended when the same time as the duration of the light pulse elapses. In the case where a third exposure period is set, the third exposure period is started at the timing of the end of the second exposure period, and is ended when the same time as the duration of the light pulse elapses.

(Step S1600)

The control circuit 130 determines whether or not the light projection by the beam scanner 110 in the light beam direction determined in step S1200 satisfies a predetermined count of the number of times light is to be projected in the same direction. In the case of a "yes" determination, the flow returns to step S1400. In the case of a "no" determination, the flow proceeds to step S1700.

(Step S1700)

The beam scanner 110 emits a light beam in the direction determined in step S1200. The emitted light beam may be a light having a square pulse, for example. The duration of the pulse may be approximately 100 ns, for example.

(Step S1800)

The image sensor 120 receives light in the exposure period determined in step S1500. The exposure period is one of the first to third exposure periods described above, for example.

(Step S1900)

When exposure is completed in all exposure periods, the control circuit 130 records the precise time (in units of microseconds, for example) when the light beam was emitted in association with the direction of the light beam. Because the beam scanner 110 in this example emits a light beam plurally in a single direction, a single time is determined as the emission time of the plurality of light beams. For example, the control circuit 130 records the start time of the first light projection in each direction as the precise time of measurement. The precise time of measurement may also be the start time or the end time of the last light projection in the relevant direction, or the start time or the end time of a light projection corresponding to the middle of the light projection order from among the light projections in the relevant direction. Alternatively, an average value of a plurality of light projection times may be recorded as the precise time of measurement.

Note that in the above example, the precise time of measurement is determined on the basis of the emission time of a plurality of light beams emitted in a single direction, but the precise time of measurement may also be determined according to another method. For example, a time other than the emission time, such as the light reception time of a plurality of light beams emitted in a single direction, may also be determined as the precise time of measurement.

(Step S2000)

The image sensor 120 outputs, for all pixels, a signal corresponding to the quantity of charge stored in each exposure period. The signal is sent to the distance measurement unit 161 of the signal processing circuit 160.

(Step S2100)

The distance measurement unit 161 of the signal processing circuit 160 determines a block of pixels that received reflected light of the light beam from among all pixels of the image sensor 120. Specifically, the data pixel extraction unit 161a of the distance measurement unit 161 references the block range storage unit 161b to determine a range of pixels where reflected light from an object may be received in correspondence with the direction of the light beam. Additionally, on the basis of quantities of charge stored in each exposure period, the data pixel extraction unit 161a detects pixels having a non-zero value in one of the exposure periods from among the range of pixels where reflected light from an object may be received. The detected pixels and surrounding pixels are determined as a block. The block may contain the pixels in a square region of 10 pixels in the x-axis direction and 10 pixels in the y-axis direction, for example. A range centered on one or more pixels having a non-zero value of the quantity of charge in one of the exposure periods is determined. In the case where the pixels having a non-zero value in one of the exposure periods are distributed over a plurality of regions, a range of predetermined size containing as many of the pixels as possible is determined. In the case where a pixel having a non-zero value in one of the exposure periods inside the range is not detected, a plurality of pixels included in a standard pixel range defined in advance for each emission direction is determined as the block. As described with reference to FIG. 20 for example, the standard pixel range may be the range of pixels where reflected light from an object is received in the case where a sufficiently large object exists at a position a specific distance away, such as a position 100 m away for example, from the light-receiving surface of the image sensor 120. Details of the operations in step S2100 will be described later.

(Step S2200)

The distance measurement unit 161 records data prescribing a correspondence relationship between the block corresponding to the light beam direction and the pixels included in the block to the recording medium 150. For example, a block ID and data indicating the range of pixels included in the block may be recorded.

(Step S2300)

The distance measurement unit 161 calculates the distance to an object for each pixel included in the block determined in step S2100. The method of calculating the distance may be any of the methods described with reference to FIGS. 17A to 18B, for example.

(Step S2400)

The distance measurement unit 161 records the distance calculated in step S2300 for each pixel included in the block to the recording medium 150. After step S2400, the flow returns to step S1100.

The above operations from step S1100 to step S2400 are repeated until light projection is completed in all preset directions. When light projection is completed in all directions, the flow proceeds to step S2500.

(Step S2500)

The depth map generation unit 162 generates depth map data expressing the distance information for all pixels in an image format on the basis of the distance for each pixel recorded to the recording medium 150.

(Step S2600)

The point cloud data generation unit 163 generates point cloud data in a predetermined three-dimensional coordinate system on the basis of the distance for each pixel recorded to the recording medium 150. For pixels having a value other than 0 or infinity, the point cloud data generation unit 163 converts the coordinates on the basis of information about the position of the image sensor 120 and the direction of the image sensor 120. With this arrangement, the depth map data is converted to point cloud data. Additionally, the point cloud data generation unit 163 converts the correspondence information between the block and the pixels recorded in step S2200 to correspondence information between the block and the point cloud.

(Step S2700)

The output unit 169 generates output data on the basis of the point cloud data converted from the depth map in step S2600 and the correspondence information between the block and the point cloud. For example, output data including information about corresponding points and the precise time for each block and information about the position of each point included in the point cloud in three-dimensional space as illustrated in FIG. 7A or 7B is generated.

(Step S2800)

The output unit 169 outputs the data for a single frame generated in step S2700. The data is recorded to the recording medium 150.

Through the operations from step S1100 to step S2800, the distance measurement apparatus 100 can generate and output point cloud data including precise time information in units of blocks for a single frame. The operations from step S1100 to step S2800 may be repeated at a predetermined frame rate (such as 30 fps) for example.

[Detailed Operations in Step S2100]

Figure 22:
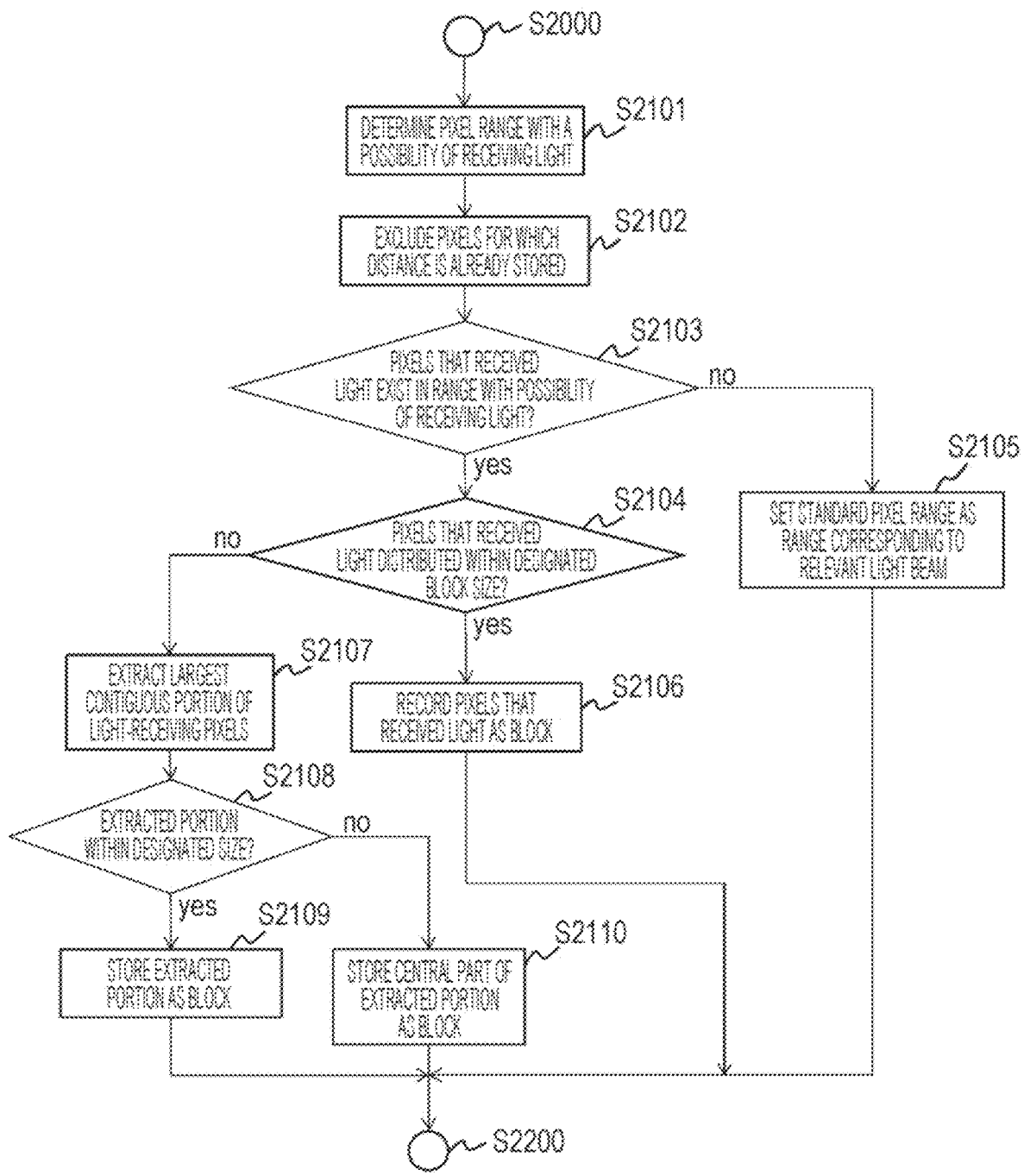
FIG. 22 is a flowchart illustrating details of the operations in step S2100.

Next, details of the operations in step S2100 will be described. FIG. 22 is a flowchart illustrating details of the operations in step S2100. Step S2100 includes steps S2101 to S2110 illustrated in FIG. 22. Hereinafter, the operation in each step will be described.

(Step S2101)

The data pixel extraction unit 161*a* of the distance measurement unit 161 references the block range storage unit 161*b* to determine a range of pixels where reflected light from an object may be received in correspondence with the direction of the light beam. For example, in the example of FIG. 20, a "pixel range" corresponding to the light beam direction determined in step S1200 is extracted. When a light beam is emitted and light diffused from an object is condensed by an optical lens with no distortion, the condensed light is detected at a specific position on the light-receiving surface of the image sensor 120. In the case where light is emitted in a direction other than the direction orthogonal to the light-receiving surface of the image sensor 120, the position where the light is detected lies on a straight line projection of the light beam direction onto the light-receiving surface, and the position on the straight line where the light is incident changes depending on the distance between the object and the image sensor 120.

Figure 23:
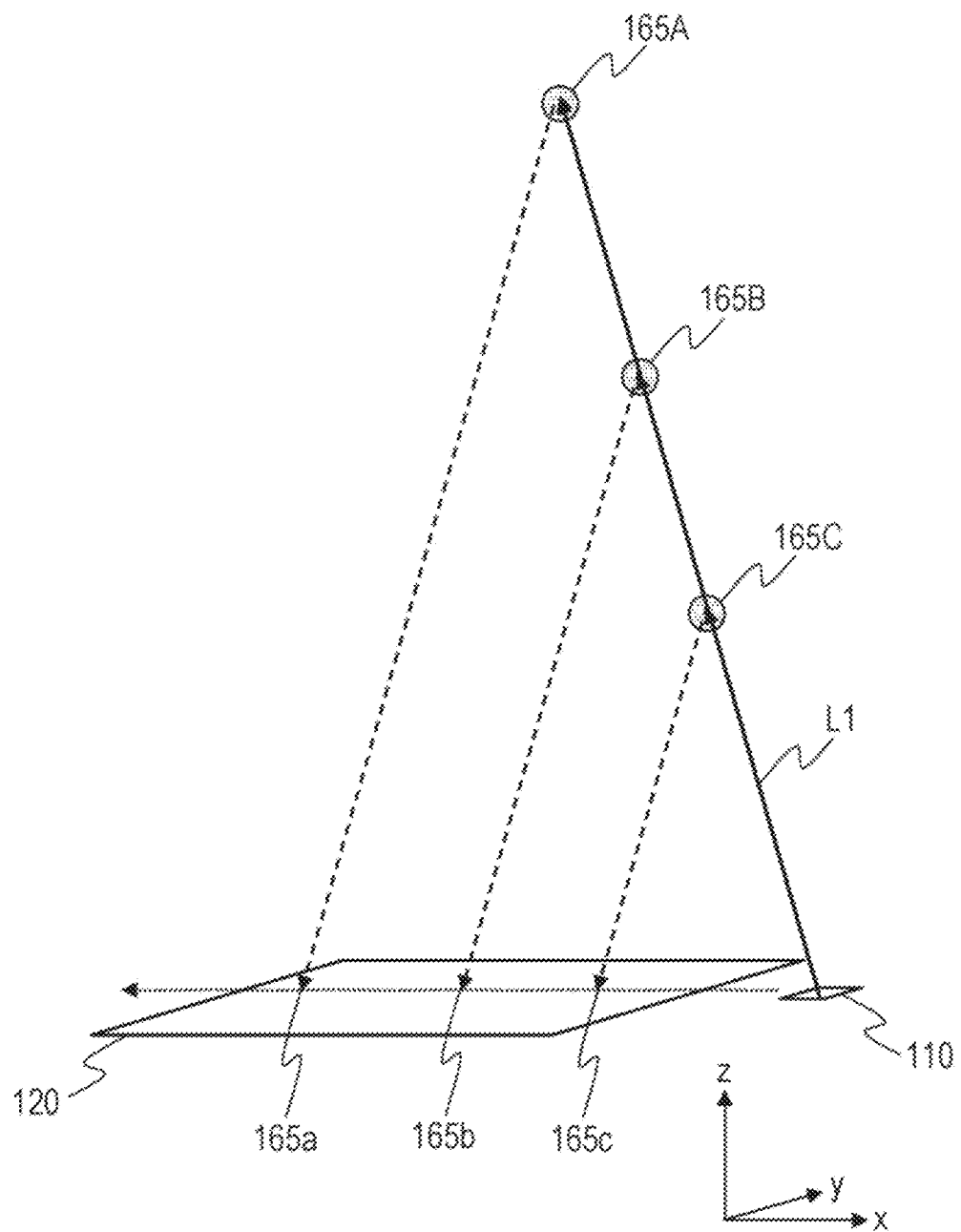
FIG. 23 is a schematic diagram illustrating the relationship between the direction of a light beam, the position of an object, and the incident position of reflected light on the light-receiving surface of an image sensor.

FIG. 23 is a schematic diagram illustrating the relationship between the direction of a light beam, the position of an object, and the incident position of reflected light from the object on the light-receiving surface of the image sensor 120. In FIG. 23, a light beam emitted from the beam scanner 110 is illustrated by a solid arrow L1. Reflected light produced in the case where an object exists at each of the positions 165A, 165B, and 165C is illustrated by dashed arrows. Reflected light from an object existing at the position 165A is incident on a position 165*a* on the light-receiving surface. Reflected light from an object existing at the position 165B is incident on a position 165*b* on the light-receiving surface. Reflected light from an object existing at the position 165C is incident on a position 165*c* on the light-receiving surface. The positions 165*a*, 165*b*, and 165*c* lie on a straight line obtained by projecting the path of the light beam L1 onto a plane including the light-receiving surface of the image sensor 120. The "pixel range" illustrated in FIG. 20 is set along this line, and is given a pixel width according to the spread of the light beam. The pixel range expresses the range where reflected light may be received on the image sensor 120. On the other hand, the "standard pixel range" illustrated in FIG. 20 expresses a range of pixels where reflected light may be received in the case of assuming that an object exists at a maximum distance (for example, 100 m) from which reflected light of the light beam may be detected.

(Step S2102)

In the case where a pixel for which a distance is already recorded in the recording medium 150 from among the pixels in the range where reflected light may be received that was determined in step S2101, the data pixel extraction unit 161*a* excludes the pixel from the range of pixels where reflected light may be received.

(Step S2103)

The data pixel extraction unit 161*a* determines whether or not pixels in the range determined in step S2101 and not excluded in step S2102 received light in one of the exposure periods. In the case of a "yes" determination, the flow proceeds to step S2104. In the case of a "no" determination, the flow proceeds to step S2105.

(Step S2104)

The data pixel extraction unit 161*a* determines whether or not the pixels that received light in one of the exposure periods that were specified in step S2103 are distributed in a range smaller than a predetermined block size. The predetermined block size may be 10 pixels each horizontally and vertically, for example. In the case of a "yes" determination in step S2104, the flow proceeds to step S2106. In the case of a "yes" determination in step S2104, the flow proceeds to step S2107.

Figure 24A:
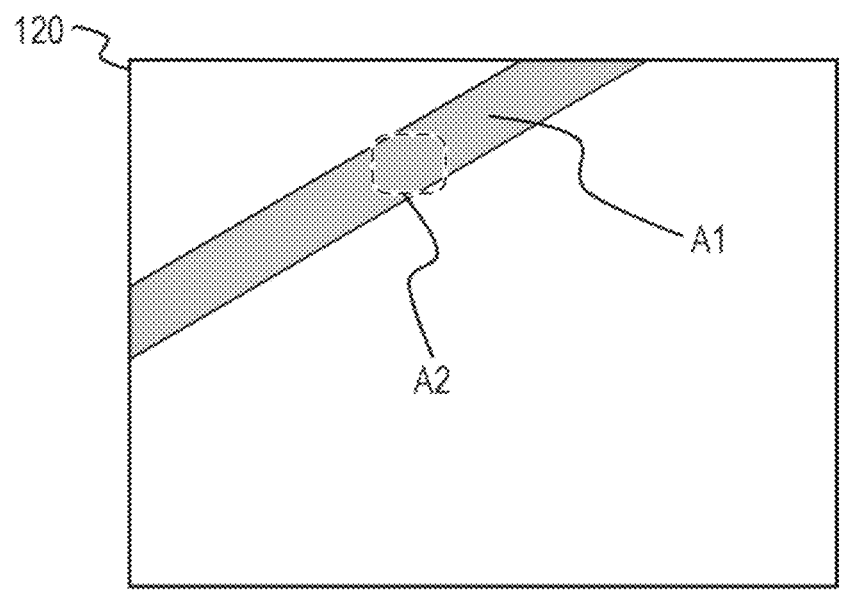
FIG. 24A is a first diagram for explaining a block determination method.
Figure 24B:
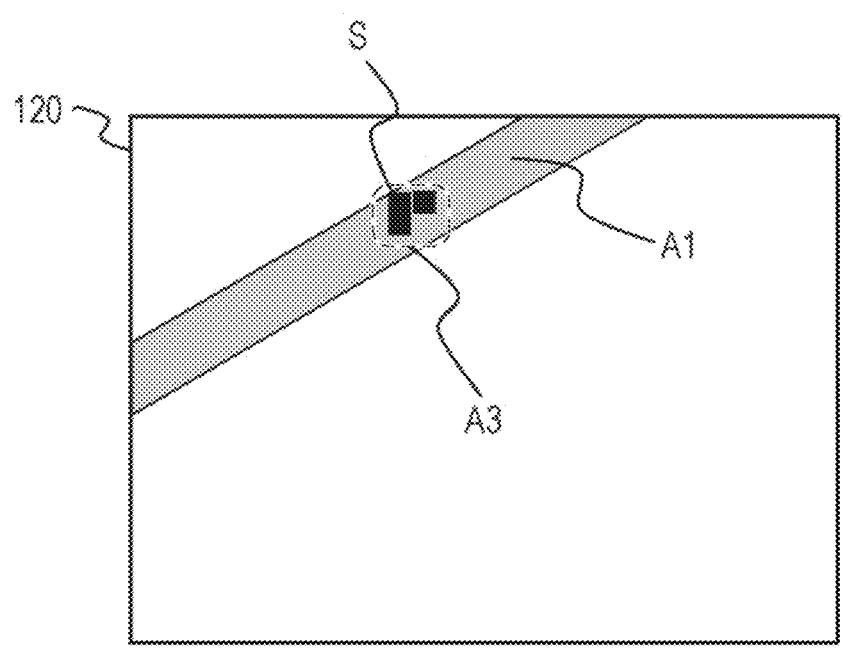
FIG. 24B is a second diagram for explaining a block determination method.
Figure 24C:
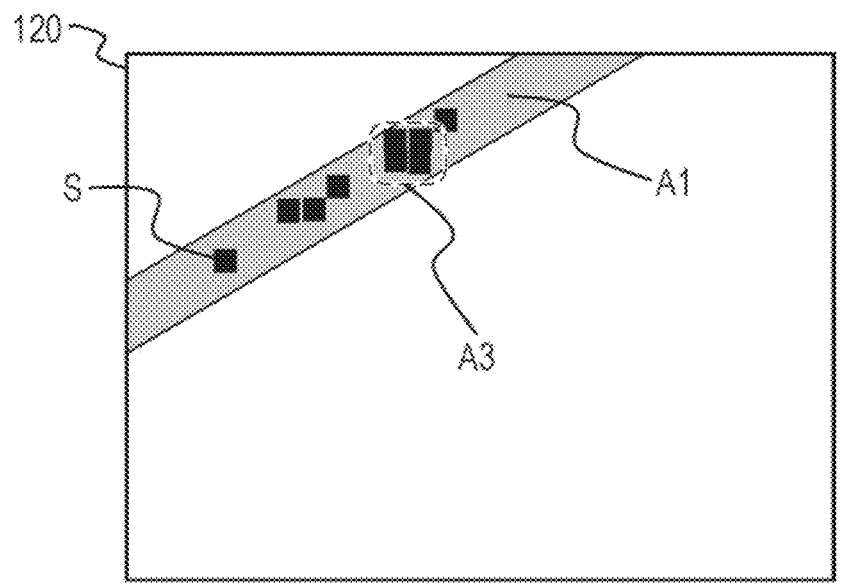
FIG. 24C is a third diagram for explaining a block determination method.
Figure 24D:
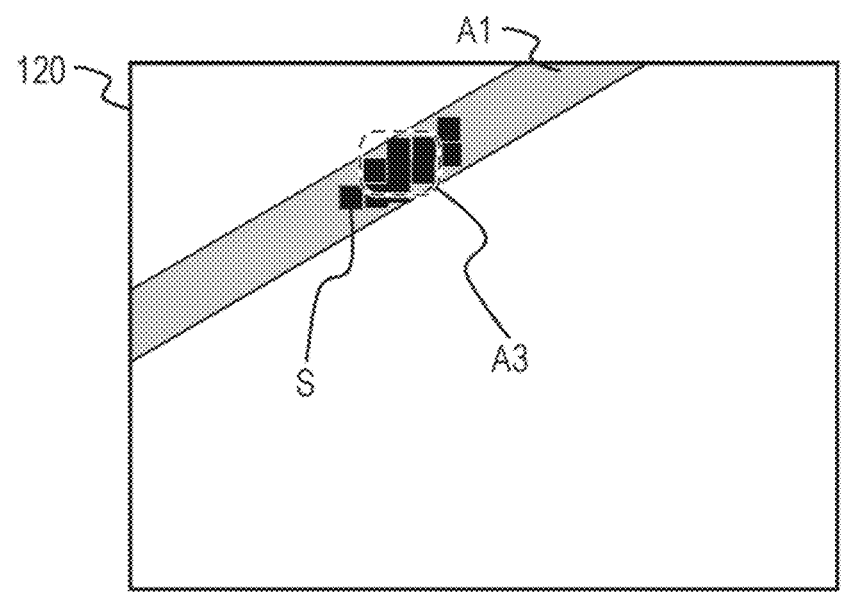
FIG. 24D is a fourth diagram for explaining a block determination method.

FIG. 24A is a diagram illustrating an example of a pixel range A1 where there is a possibility of receiving light and a standard pixel range A2 on the light-receiving surface of the image sensor 120. FIG. 24B is a diagram illustrating an example of a state in which pixels S that received light in one of the exposure periods are distributed inside a range A3 of predetermined size in the range where there is a possibility of receiving light. FIGS. 24C and 24D are diagrams illustrating examples of a state in which pixels S that received light in one of the exposure periods are distributed beyond the range A3 of predetermined size in the range where there is a possibility of receiving light. In cases like the example in FIG. 24B, a "yes" determination is made in step S2104. On the other hand, in cases like the example in FIG. 24C or 24D, a "no" determination is made in step S2104.

Figure 25A:
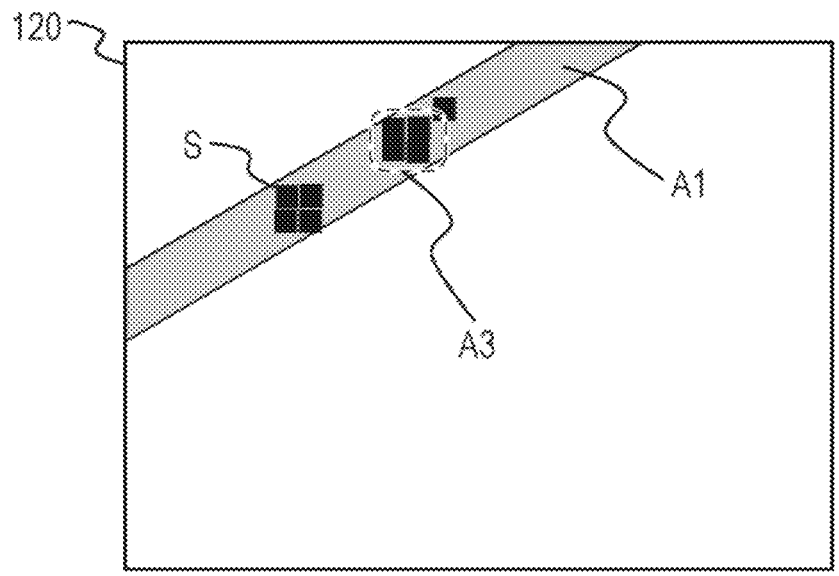
FIG. 25A is a fifth diagram for explaining a block determination method.
Figure 25B:
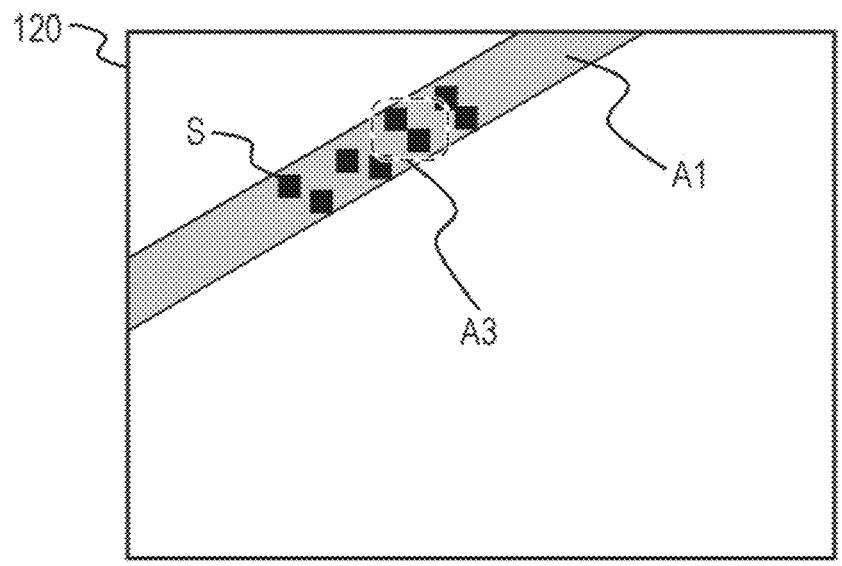
FIG. 25B is a sixth diagram for explaining a block determination method.

Note that as a special case, multiple ranges of contiguous light-receiving pixels S having the same size may be detected, like the example in FIG. 25A. Alternatively, the light-receiving pixels S may be distributed uniformly across the range A1 where there is a possibility of receiving light, like the example in FIG. 25B. To handle these exceptions, in the case of FIG. 25A, the range of contiguous light-receiving pixels S having more nearby pixels that received light, including pixels outside the range A1 where there is a possibility of receiving light, may be set as a block, for example. In the case of FIG. 25B, a region A3 with the block size positioned in the center of the range of the distribution of the light-receiving pixels S may be set as a block, for example.

(Step S2105)

The data pixel extraction unit 161a sets the standard pixel range stored in the block range storage unit 161b as a block. This step is executed in cases like the one illustrated in FIG. 24A, for example. After executing step S2105, the flow proceeds to step S2200.

(Step S2106)

The data pixel extraction unit 161a sets the contiguous pixels that received light inside the range where there is a possibility of receiving light that were extracted in step S2101 as a block. This step is executed in cases like the one illustrated in FIG. 24B, for example. After executing step S2106, the flow proceeds to step S2200.

(Step S2107)

The data pixel extraction unit 161a specifies regions of contiguous light-receiving pixels in which all adjacent pixels are light-receiving pixels. The largest of the specified regions of contiguous light-receiving pixels, that is, the region containing the greatest number of pixels, is extracted.

(Step S2108)

The data pixel extraction unit 161a determines whether or not the largest of the regions of contiguous light-receiving pixels that was extracted in step S2107 is a predetermined block size or less. In the case of a "yes" determination, the flow proceeds to step S2109. In the case of a "no" determination, the flow proceeds to step S2110.

(Step S2109)

The data pixel extraction unit 161a sets the region extracted in step S2107 as a block. This step is executed in cases like the one illustrated in FIG. 24C, for example. After executing step S2109, the flow proceeds to step S2200.

(Step S2110)

The data pixel extraction unit 161a sets a block centered on a central portion of the region extracted in step S2107, such as a center-of-gravity position of the coordinates of all light-receiving pixels included in the region, for example. The block may also be set such that a central position of the block overlaps the center of the region extracted in step S2107. This step is executed in cases like the one illustrated in FIG. 24D, for example. After executing step S2110, the flow proceeds to step S2200.

[1-3 Effects]

As above, the distance measurement apparatus 100 according to the present embodiment is provided with the beam scanner 110, the image sensor 120, and the signal processing circuit 160. The beam scanner 110 is a light emitter that emits a plurality of light beams in different directions at different timings. The image sensor 120 includes an array of a plurality of light-receiving elements, and detects reflected light from the scene produced by the emission of each light beam with the plurality of light-receiving elements. On the basis of a signal outputted from the image sensor 120, the signal processing circuit 160 generates and outputs output data including data indicating the positions or distances of a plurality of points in the scene that respectively correspond to light-receiving elements that detected reflected light from among the plurality of light-receiving elements. In the output data, the data for the plurality of points is categorized into a plurality of blocks, and individual time data is attached to each of the plurality of blocks. At a certain timing, a light beam is emitted only in a portion of the range prescribed by the angle of field of the image sensor 120. By successively changing the direction of the light beam and measuring the distance with each pixel, a depth map can be generated for the entire range of the scene in which light may be detected by the image sensor 120 as a whole. With respect to a single depth map, the measurement time is different for each beam. The signal processing circuit 160 divides the plurality of pixels in the depth map into blocks for each beam direction, and similarly divides a plurality of points in point cloud data converted from the depth map into blocks. By recording the measurement time for each block, precise time information can be outputted in association with the point cloud data outputted as a single frame.

According to the present embodiment, a precise measurement time (in units of microseconds, for example) corresponding to the irradiation timing of a light beam within a frame can be recorded for each block of pixels rather than a single measurement time (in units of milliseconds, for example) for a single frame of the depth map. Consequently, it is easy to integrate information from a plurality of equipment provided with the distance measurement apparatus 100 accurately, for example. According to the present embodiment, four-dimensional spatiotemporal information including precise time information in addition to three-dimensional position information about an object can be generated. By outputting precise time information corresponding to the three-dimensional position information, the position, movement direction, and speed of a moving object in particular can be configured more accurately. Specifically, it is possible to reproduce details about traffic conditions such as the positional relationships of a plurality of moving bodies at the moment when an accident occurred.

Embodiment 2

Next, a distance measurement apparatus according to a second embodiment will be described.

In the embodiment described above, the beam shape and the beam diameter of the light beam are fixed, but in the present embodiment, the beam shape and the beam diameter are adjustable for each frame. The beam shape and the beam diameter can be controlled to be different in each frame. By reducing the beam diameter, the light beam reaches farther with the same energy of light. In the case of adjusting the distance range for each frame while maintaining the same energy of emitted light, it is effective to adjust the beam shape and the beam diameter for each frame like in the present embodiment.

Figure 26A:
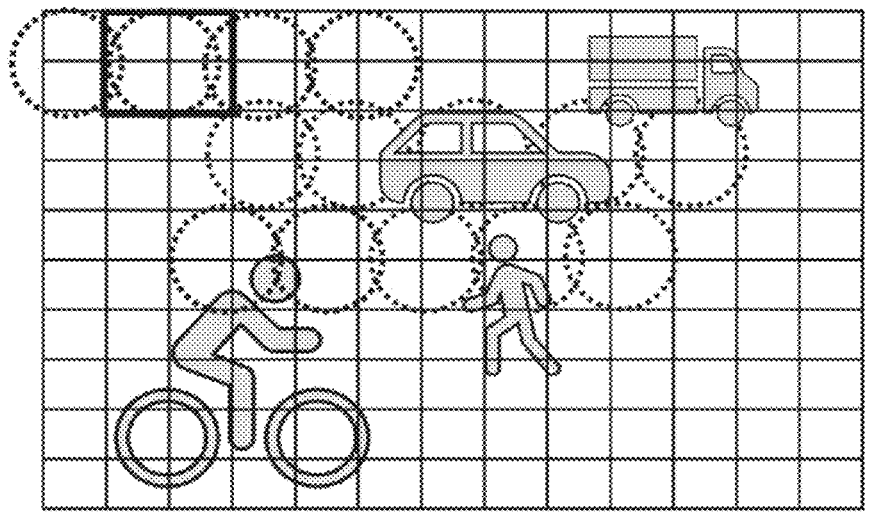
FIG. 26A is a first diagram schematically illustrating the state of light reception in response to the projection of light beams with different beam diameters.
Figure 26B:
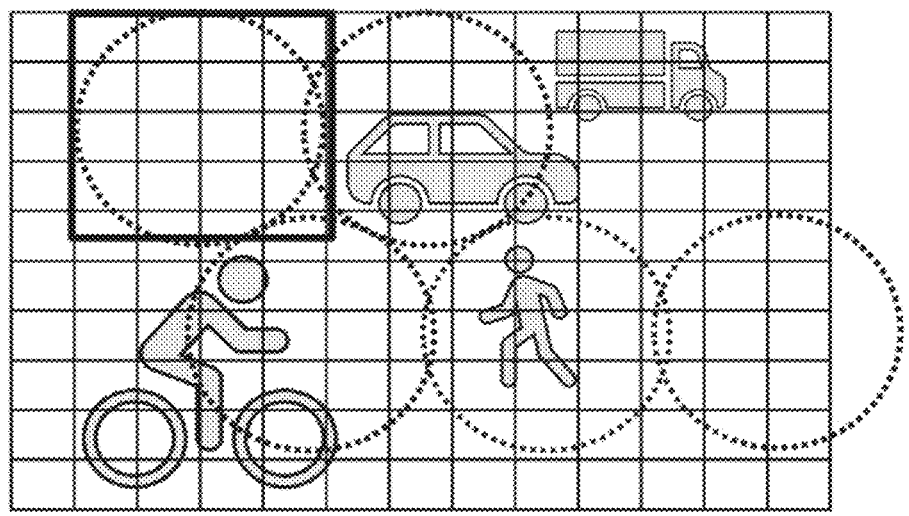
FIG. 26B is a second diagram schematically illustrating the state of light reception in response to the projection of light beams with different beam diameters.

FIGS. 26A and 26B are diagrams schematically illustrating the state of light reception in response to the projection of light beams with different beam diameters. FIG. 26A illustrates the state of light reception with a small beam diameter, while FIG. 26B illustrates the state of light reception with a large beam diameter. The dotted-line circles in the diagrams represent the beam spots, and the bold rectangular frame represents a block. If the beam diameter is small, the number of pixels included in the light reception range decreases, and if the beam diameter is large, the number of pixels included in the light reception range increases. In this way, the pixel range corresponding to the direction of a single light beam on the image sensor 120 changes depending on changes to the beam shape and the beam diameter.

The configuration of the distance measurement apparatus according to the present embodiment is the same as the configuration of the distance measurement apparatus 100 illustrated in FIG. 4. However, in the present embodiment, the control circuit 130 determines not only the light beam direction but also the beam shape and the beam diameter for each frame. Information about the beam shape and the beam diameter of the light beams is prerecorded in the recording medium 150 as information about each frame.

FIG. 27 illustrates an example of information recorded to the recording medium 150 in the present embodiment. In the present embodiment, the information illustrated in FIG. 27 is recorded to the recording medium 150 instead of the information illustrated in FIG. 6B. The information illustrated in FIGS. 6A and 6C is recorded similarly in the present embodiment, too. In the present embodiment, as illustrated in FIG. 27, a beam shape ID that specifies the beam shape and the beam diameter is recorded in association with the beam direction, the pixel range included in a block, and time information.

Figure 28:
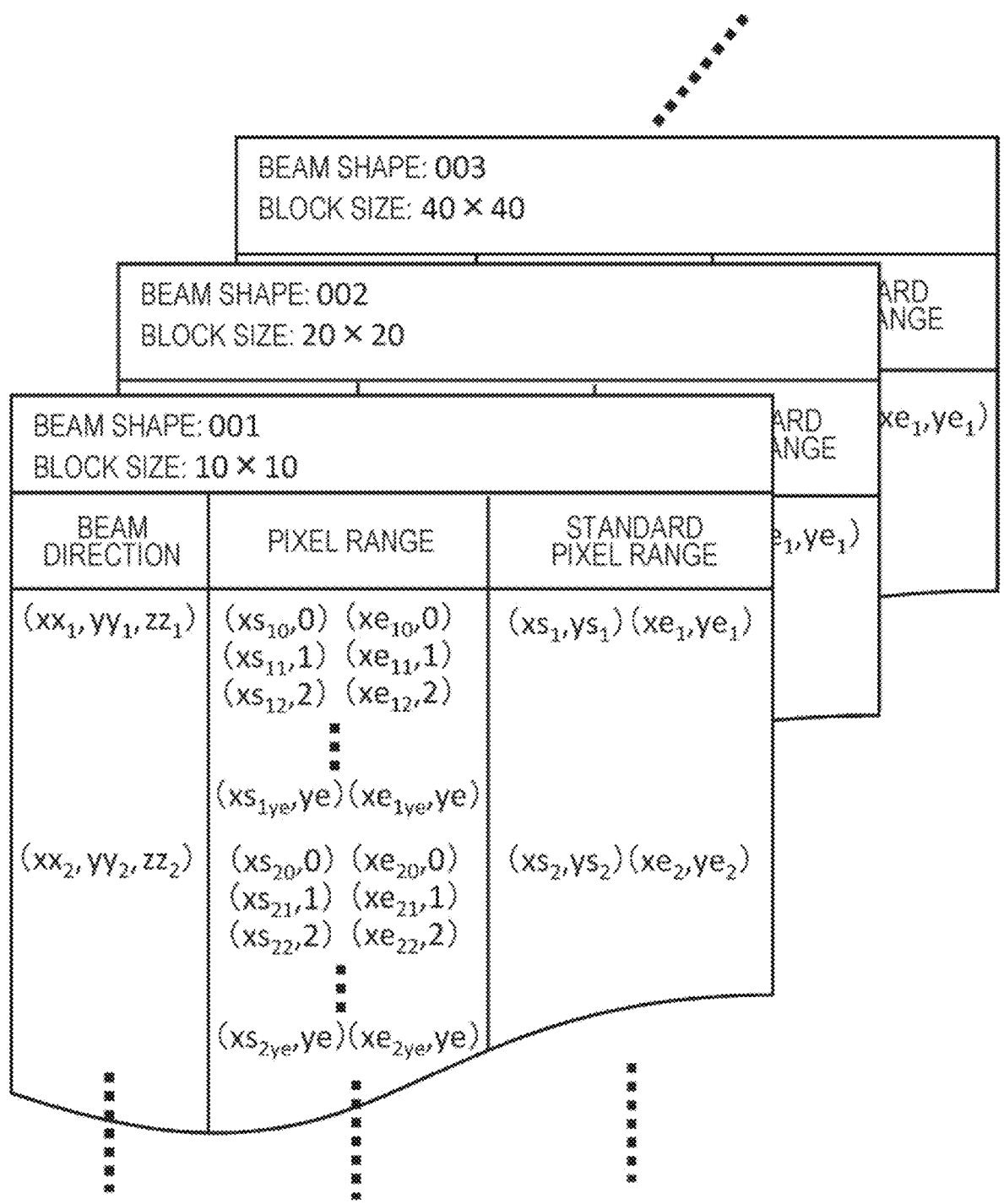
FIG. 28 is a diagram illustrating an example of information stored by a block range storage unit in Embodiment 2.

The block range storage unit 161b (see FIG. 19) in the present embodiment stores a number of correspondence tables associating the beam direction, pixel range, and standard pixel range equal to the number of beam shapes and beam diameters that may be adopted. FIG. 28 illustrates an example of the information stored by the block range storage unit 161b according to the present embodiment. In the example of FIG. 28, information about the pixel range where there is a possibility of receiving light and the standard pixel range corresponding to each light beam direction is prerecorded for each beam shape. Furthermore, a block size is recorded for each beam shape. The block size is a predetermined fixed value in Embodiment 1, but is set for each beam shape in the present embodiment.

The control circuit 130 in the present embodiment first determines the beam shape and the beam diameter of a light beam before determining whether or not a direction in which a light beam has not been projected exists in step S1100 illustrated in FIG. 21. List data expressing light beam directions covering the entire range detectable by the image sensor 120 for each beam shape and beam diameter is prerecorded in the recording medium 150. The control circuit 130 references the list to make the determination in step S1100.

The data pixel extraction unit 161a (see FIG. 19) in the present embodiment acquires information about the light beam emission time together with information about the beam shape and the beam diameter from the control circuit 130. The data pixel extraction unit 161a selects a correspondence table corresponding to the beam shape and the beam diameter of the light beam for the frame from among the plurality of correspondence tables stored in the block range storage unit 161b according to the information about the beam shape and the beam diameter. Thereafter, a block is determined on the basis of the information about the pixel range and the standard pixel range corresponding to the beam direction of interest in the selected correspondence table.

As above, in the present embodiment, the beam shape and the beam diameter of the light beam are determined for each frame. Pixels in the depth map can be grouped into blocks for each beam direction, and points in the point cloud data converted from the depth map can also be grouped into blocks. The measurement time is recorded for each block, and precise time information can be outputted in association with the point cloud corresponding to each frame. Moreover, even if the specifications of the distance range of the light beam are different for each frame, point cloud data can be grouped into blocks for each light beam in accordance with the specifications of the light beam for each frame, and a precise time can be outputted for each block in the point cloud.

It is also possible to adopt a configuration in which the beam scanner 110 is capable of emitting a light beam with a freely chosen beam shape and beam diameter, such that the control circuit 130 freely sets the beam shape and the beam diameter for each frame. In this case, the signal processing circuit 160 may calculate the pixel range and the standard pixel range corresponding to each beam direction every time. In this case, the signal processing circuit 160 computes the straight line obtained by projecting the line extending in the emission direction onto the light-receiving surface of the image sensor 120 on the basis of information about the emission direction of the light beam, and determines the center position of the pixel range. Additionally, the spread of the pixel range where there is a possibility of receiving light can be calculated on the basis of the information about the beam shape and the beam diameter.

Embodiment 3

Next, a distance measurement apparatus according to a third embodiment will be described.

In each embodiment described above, the beam diameter of the light beam is fixed during the distance calculation operations for a single frame. In contrast, in the present embodiment, the beam diameter is adjustable even during the distance calculation operations for a single frame. Light projection in the present embodiment also includes flash projection, which can be used to irradiate the range of the entire angle of field of the image sensor 120 with light all at once.

The configuration of the distance measurement apparatus 100 according to the present embodiment is the same as the configuration in Embodiment 1 (see FIG. 4). The control circuit 130 references the information recorded in the recording medium 150 to determine the diameter and direction of a light beam to be emitted by the beam scanner 110, and controls the timing of the light projection by the beam scanner 110 and the timing of the exposure by the image sensor 120.

Figure 29A:
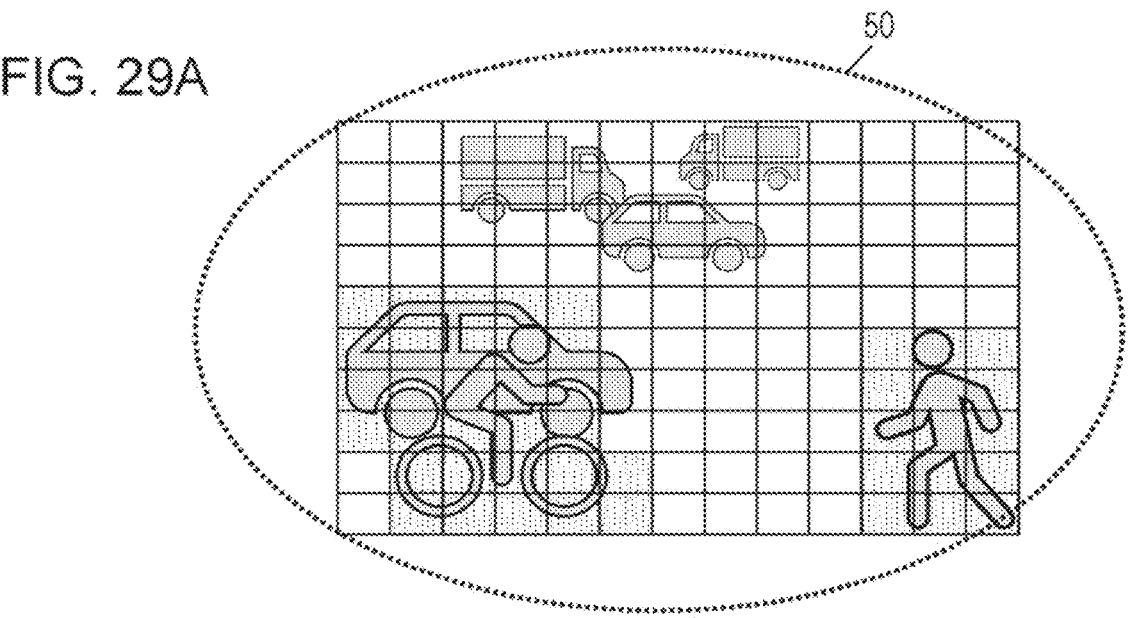
FIG. 29A is a diagram schematically illustrating how an image sensor receives reflected light from objects in the case where a flash is emitted.

FIG. 29A is a diagram schematically illustrating how the image sensor 120 receives reflected light from objects in the case where a flash of light having a wide spread angle from a single light source is projected from the beam scanner 110.

When projecting a flash of light, the beam scanner 110 spreads light 50 to cover the range of the angle of field of the image sensor 120. Because the light 50 is diffused widely, the light 50 only reaches a nearby area, such as the area within 30 m, for example. Accordingly, the image sensor 120 receives reflected light from nearby objects only. Consequently, reflected light is detected from the shaded objects near the image sensor 120 illustrated in FIG. 29A, such as the automobile and bicycle illustrated in the lower-left part and the person illustrated in the lower-right part of the diagram, and the distance can be measured.

Figure 29B:
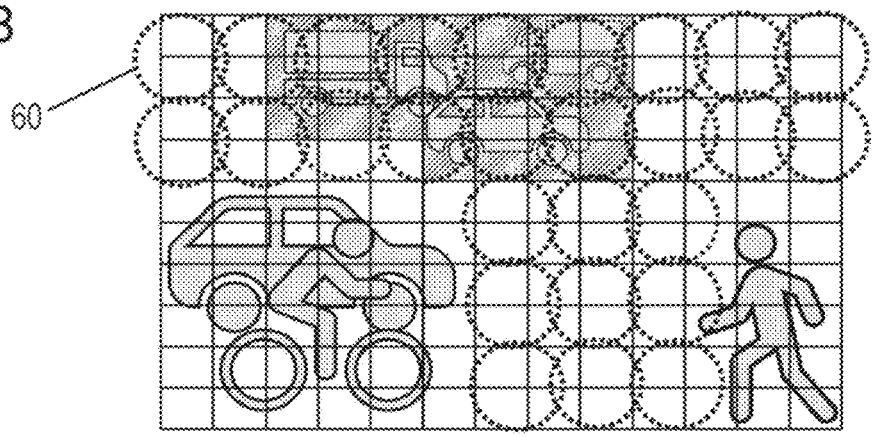
FIG. 29B is a diagram schematically illustrating how an image sensor receives reflected light from objects in the case where a light beam is emitted.

FIG. 29B is a diagram schematically illustrating how the image sensor 120 receives reflected light from objects in the case where a light beam having a tight spread and little attenuation of the energy density with respect to distance, or in other words a light beam that reaches far, is emitted by the beam scanner 110. Unlike the flash of light 50 illustrated in FIG. 29A, the light 60 has a small beam diameter but reaches a long distance such as 50 m or more for example, enabling the image sensor 120 to detect reflected light from distant objects. Consequently, it is also possible to detect reflected light from the shaded objects illustrated in FIG. 29B, such as the trucks and private car in the top-center part of the diagram. By emitting a narrow-diameter light beam in this way, the distance to distant objects can also be measured.

Figure 29C:
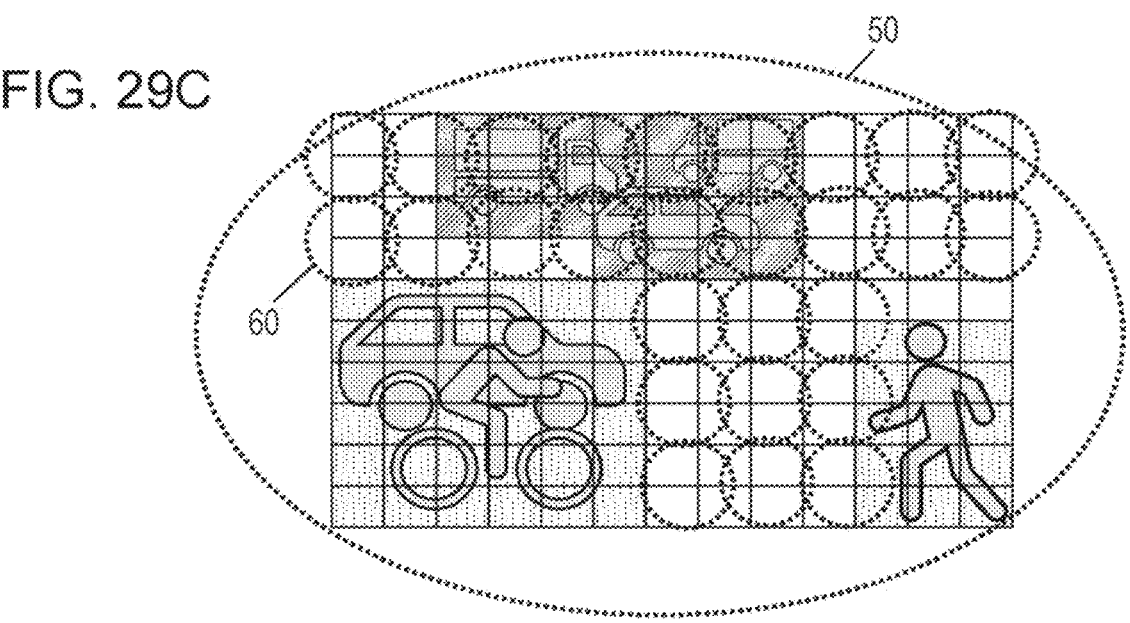
FIG. 29C is a diagram schematically illustrating how an image sensor receives reflected light from objects in the case where a flash and a light beam are emitted.

FIG. 29C is a schematic diagram illustrating how reflected light is received both from nearby objects by projecting the flash of light illustrated in FIG. 29A and also from distant objects by projecting the narrow-diameter light beam illustrated in FIG. 29B. For convenience, light beams with two beam shapes are assumed here, namely a flash that spreads over the entire range of the angle of field and a light beam with a narrow circular beam diameter that reaches 100 m away. The flash of light 50 and the long-distance light 60 may be emitted at different timings within the same frame. The beam shapes of the light beams are not limited to the above, and light beams with other shapes may also be emitted. In the example of FIG. 29C the image sensor 120 can detect reflected light of the flash from the nearby bicycle, automobile, and person. However, the image sensor 120 cannot detect reflected light of the flash from the distant automobile and trucks, which are only detectable with the reflected light of the light beam with a narrow spread angle.

FIG. 30 illustrates an example of information recorded to the recording medium 150 in the present embodiment. Compared to Embodiment 1, the information illustrated in FIG. 30 is recorded instead of the information illustrated in FIG. 6B. The information illustrated in FIGS. 6A and 6C is recorded similarly in the present embodiment, too. In the present embodiment, the type of light beam, namely a flash or a long-distance light beam, is recorded as information for each frame. Information about the beam direction is not recorded for the flash, because the light spreads in all directions. For the pixel range, all pixels that receive the reflected light of the flash may be treated as the "pixel range". Because the shape of the pixel range is indefinite, the range may be recorded by a method of describing the coordinate of a start pixel and the coordinate of an end pixel in the x-axis direction for pixels having the same y coordinate, for example. In the example of FIG. 29C, a single grid square corresponds to a single pixel, with the top left set to (0, 0). In this case, the pixel range where reflected light is received from the automobile and the bicycle in the lower-left part is expressed as (5, 1) (5, 6), (6, 1), (6, 6) . . . (10, 1) (10, 6). The pixel range where reflected light is received from the person in the lower-right part is expressed as (6, 11) (6, 13), (7, 11) (7, 13) . . . (10, 11) (10, 13). Note that in actuality, the pixels of the image sensor 120 are much smaller than the grid squares illustrated in FIG. 29C, but the grid square are drawn very largely in FIG. 29C to facilitate comprehension.

Figure 31:
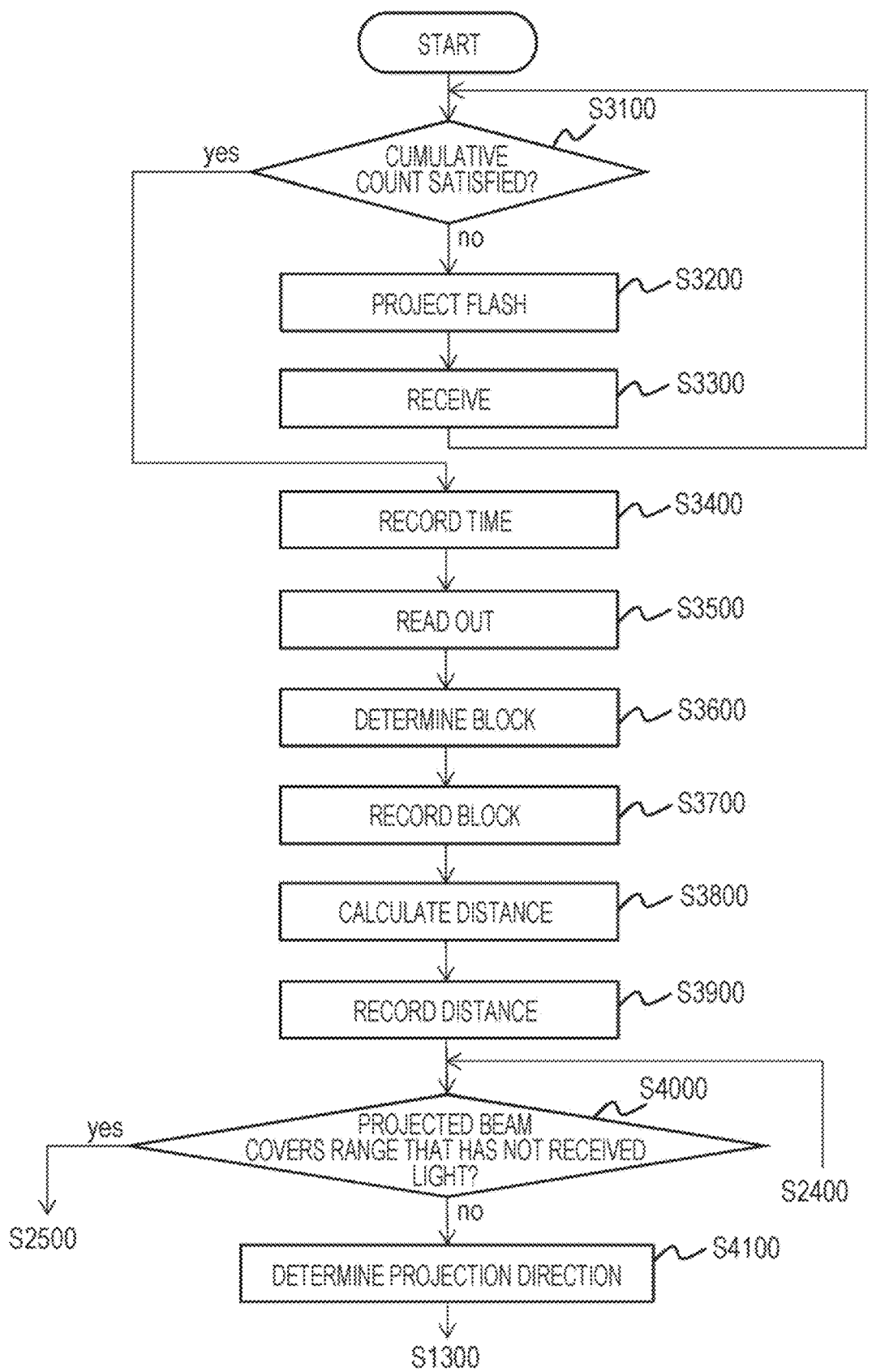
FIG. 31 is a flowchart illustrating a portion of operations by a distance measurement apparatus in Embodiment 3.

FIG. 31 is a flowchart illustrating a portion of operations by the distance measurement apparatus 100 in the present embodiment. In the present embodiment, the operations from step S3100 to step S3900 illustrated in FIG. 31 are added before step S1100 of the flowchart illustrated in FIG. 21. Additionally, steps S4000 and S4100 are executed instead of steps S1100 and S1200, respectively. Otherwise, the operations in the present embodiment are the same as the operations in Embodiment 1. FIG. 31 will be referenced to describe the operations by the distance measurement apparatus 100 of the present embodiment.

(Step S3100)

First, the control circuit 130 determines whether or not the projection of a flash of light by the beam scanner 110 satisfies a predetermined light projection count. In the case of a "yes" determination, the flow proceeds to step S3400. In the case of a "no" determination, the flow proceeds to step S3200.

(Step S3200)

The beam scanner 110 projects a flash of light. The projected flash may be pulse light exhibiting a square-shaped variation in intensity over time, for example. The duration of the pulse may be 100 ns, for example.

(Step S3300)

The image sensor 120 receives light in exposure periods preset in accordance with the flash. The first to third exposure periods as described above may be set as the exposure periods, for example. After exposure, the flow returns to step S3100.

(Step S3400)

The control circuit 130 records information about the precise time (in units of microseconds, for example) when the beam scanner 110 projected the flash to the recording medium 150. The beam scanner 110 projects the flash multiple times, and therefore a single time is determined with respect to the plurality of projection times. For example, the control circuit 130 stores the start time of the first projection of the flash as the precise time of measurement. Alternatively, the precise time of measurement may be the start time or the end time of the last projection of the flash, or the start time or the end time of a projection corresponding to the middle of the light projection order from among the projections of the flash. An average value of the plurality of light projection times may also be treated as the precise time of measurement.

(Step S3500)

The image sensor 120 outputs the charge stored in each exposure period for all pixels.

(Step S3600)

The distance measurement unit 161 extracts pixels that received reflected light from an object due to the projection of the flash in one of the exposure periods, and treats the extracted pixels as a pixel range corresponding to the flash.

(Step S3700)

The distance measurement unit 161 records the pixel range of the flash determined in step S3600 to the recording medium 150 as a pixel range corresponding to a block. The pixel range may be recorded in the notation format illustrated in FIG. 30 described above, for example.

(Step S3800)

The distance measurement unit 161 calculates the distance for each pixel included in the block of the flash determined in step S3700. The method of calculating the distance may be any of the methods described with reference to FIGS. 17A to 18B, for example.

(Step S3900)

The distance calculation unit 161c records the distance calculated in step S3800 for each pixel included in the block to the recording medium 150.

(Step S4000)

The control circuit 130 determines, for all pixels other than the pixels corresponding to the block of the flash recorded to the recording medium 150, whether or not a light beam has been projected in a projection direction such that the pixels may receive reflected light. In the case of a "yes" determination, the flow proceeds to step S2500. In the case of a "no" determination, the flow proceeds to step S4100.

(Step S4100)

The control circuit 130 determines the projection direction of a light beam such that reflected light may be incident on the pixels that have not yet received reflected light of a light beam from among all pixels other than the pixels corresponding to the block of the flash. After step S4100, the flow proceeds to step S1300.

The projection direction of a light beam such that reflected light may be received by specific pixels of the image sensor 120 can be determined according to the following principles, for example. If a light beam is radiated onto an object lying on a straight line joining specific pixels of the image sensor 120 to a position corresponding to the lens center of an optical system that condenses light onto the light-receiving surface of the image sensor 120, the pixels may receive reflected light of the light beam. The position of the emission point of the light beam and the position of the pixels are not exactly the same, and therefore the direction of the light beam for which the pixels will receive reflected light is different depending on the distance to the object. As one example of a method of determining the direction of the light beam, an object may be assumed to exist at the maximum distance, such as 100 m for example, from which the pixels may detect the reflected light of the light beam, and the direction of the light beam for which the pixels may receive reflected light under this assumption can be obtained by calculation. The pixel range where there is a possibility of receiving light for a specific light beam direction is determined according to the method described in relation to the operations in step S2100 of Embodiment 1, for example. With such a method, a light beam direction for which there is a possibility of the pixel receiving light can be determined successively for the pixels that have not yet received the reflected light of a light beam, and the number of pixels not included in the pixel range where there is a possibility of receiving light can be reduced. In the case where there are pixels that have not been included in a pixel range where reflected light may be received for the direction of a light beam at the maximum distance, a pixel range can be set under the assumption that the light beam will be reflected by an object at closer range, and the direction of the light beam can be determined. For example, the direction of the light beam may be determined by setting a pixel range where there is a possibility of receiving light at half the maximum distance. For the pixels that did not receive the reflected light of the flash, the direction of the light beam may be determined successively by setting a range where there is a possibility of receiving light under the assumption that an object exists 100 m and 50 m away, for example. In the case where there are pixels that still did not receive light, it may be assumed that an object does not exist, and the distance may be set to infinity for the pixels.

In the present embodiment, by determining a pixel range where there is a possibility of receiving light at the maximum distance and at half the maximum distance at which measurement is possible with a light beam, distance measurement is performed comprehensively for the pixels that did not receive the reflected light of the flash. The number of pixels included in the determined pixel range or the size of the determined pixel range where there is a possibility of receiving light is different depending on the beam shape and the beam diameter of the light beam. Moreover, the magnitude of the parallax is different depending on the different between the position of the pixels in the image sensor 120 and the position of the light emission point of the beam scanner 110. Consequently, the procedure for comprehensive distance measurement for the pixels that did not receive the reflected light of the flash may be changed in accordance with the beam shape, the beam diameter, and the magnitude of the parallax. For smaller beam diameters and smaller pixel ranges where the reflected light of a single light beam may be received, the anticipated distance may be set more finely to set the direction of the light beam. Meanwhile, for greater parallax caused by a greater difference between the position of the pixels in the image sensor 120 and the position of the light source in the beam scanner 110, the anticipated distance may be set more finely to set the direction of the light beam.

By repeating the operations from step S3100 to step S2400, distance information can be acquired for each pixel for which the distance is measurable through a combination of set light beams. In steps S2500 and S2600, the signal processing circuit 160 generates depth map data and point cloud data, respectively. Finally, the point cloud for a single frame is outputted in step S2800.

As above, according to the present embodiment, light projection including a flash is performed repeatedly within a single frame. By making the beam shape and the beam diameter of the light beam variable, high-precision distance measurement can be achieved with fewer projections of light. Pixels in the depth map can be grouped into blocks for each beam type or direction, and points in the point cloud data converted from the depth map can also be grouped into blocks. With such a configuration, the measurement time can be recorded for each block, and precise time information can be outputted in association with the point cloud data outputted as a single frame. Furthermore, even if the specifications of the distance range of the light beam are different for each frame, point cloud data can be grouped into blocks for each light beam in accordance with the specifications of the light beam for each frame, and precise time information can be attached to each block in the point cloud.

Embodiment 4

Next, a distance measurement apparatus according to a fourth embodiment will be described.

The distance measurement apparatus 100 according to the present embodiment differs from the embodiments described above in that the beam scanner 110 emits a plurality of light beams at the same time. The control circuit 130 in the present embodiment adjusts the direction of each light beam emitted from the beam scanner 110 such that the reflected light of the light beams is not received by the same pixels.

The control circuit 130 in the present embodiment determines a combination of multiple light beams to be emitted, as well as the emission timing of each light beam and the emission order. The control circuit 130 references information recorded in the recording medium 150 to determine a combination of multiple light beams to be emitted at the same time from among the light beams that have not been projected yet.

FIG. 32 is a diagram illustrating an example of information recorded to the recording medium 150 in the distance measurement apparatus 100 of the present embodiment. In the present embodiment, the information illustrated in FIG. 32 is recorded instead of the information illustrated in FIG. 6B. The information illustrated in FIGS. 6A and 6C is recorded similarly in the present embodiment, too. The beam direction for each block and the pixel range included in each block are recorded as information for each frame. In Embodiment 1, the time information is different for each block, but in the present embodiment, a plurality of blocks respectively corresponding to a plurality of light beams emitted at the same time have the same time information.

The operations by the distance measurement apparatus 100 according to the present embodiment are basically the same as the operations in Embodiment 1 illustrated in FIG. 21. However, the operations are different in that a plurality of light projection directions are determined in step S1200. The plurality of light beams to be emitted at the same time may be determined such that the plurality of straight lines obtained by projecting the plurality of lines along the paths of the light beams onto the light-receiving surface of the image sensor 120 do not overlap or intersect each other. In step S1300, the control circuit 130 records information about the plurality of light beams to be emitted at the same time to the recording medium 150. Also, in step S1900, the control circuit 130 records a shared time value to the recording medium 150 as the emission time of the plurality of light beams. In step S2000, the image sensor 120 outputs the light reception data from pixels in a plurality of blocks for the same exposure period. In step S2100, the signal processing circuit 160 determines whether or not light was received by the pixels included in the corresponding pixel range for each of the plurality of light beam directions, and determines the range of pixels, that is, the block, for which the distance should be calculated. In step S2200, the signal processing circuit 160 records the time recorded in step S1900 and the plurality of pixel ranges respectively corresponding to the plurality of blocks determined in step S2200 to the recording medium 150 in association with the light beam directions.

Figure 33:
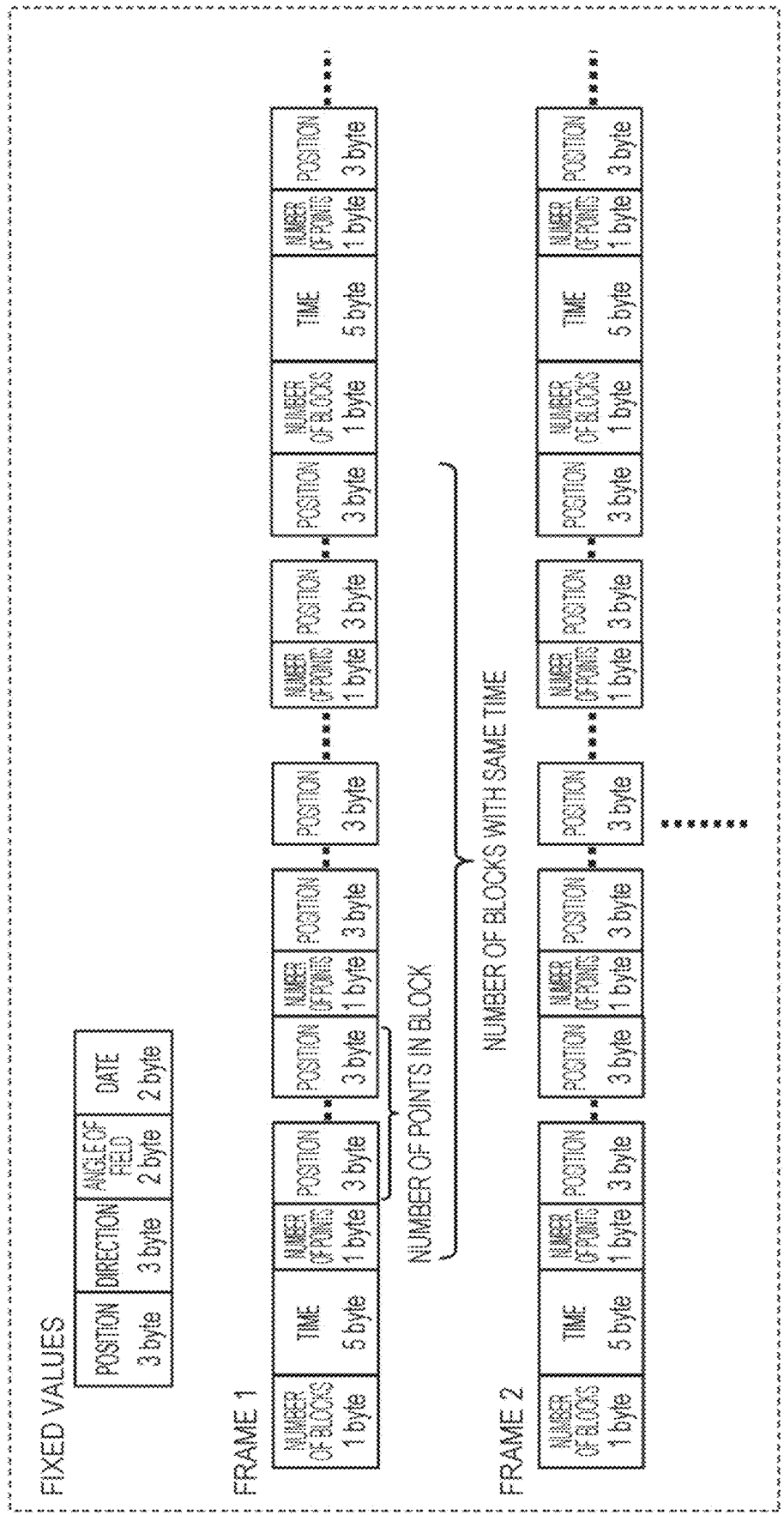
FIG. 33 is a diagram illustrating an example of output data that a distance measurement apparatus outputs in step S2800 in Embodiment 4.

FIG. 33 illustrates an example of output data that the distance measurement apparatus 100 outputs in step S2800 in the present embodiment. In this example, like the example described above, as fixed values shared among the frames, the positional coordinates of the image sensor 120 in a three-dimensional coordinate system centered on a vehicle are outputted in 3 bytes, the normal vector of the light-receiving surface of the image sensor 120 in the three-dimensional coordinate system is outputted in 3 bytes, the angle of field of the image sensor 120 is outputted in 2 bytes, and the date is outputted in 2 bytes. After the fixed values, information for each frame is outputted. In the example of FIG. 33, a time for each block and the positions of the points in the point cloud included in the block are outputted collectively as information for each frame. Specifically, for each frame, the number of blocks sharing the time is outputted in 1 byte, and thereafter, the precise time shared among the plurality of blocks is outputted in 5 bytes. After the time, for a single block for which the distance was measured at the indicated time, the number of points in the point cloud included in the block is outputted in 1 byte, and then the three-dimensional position of each point is outputted in 3 bytes each. After the position information for the points in a block are outputted consecutively, information is similarly outputted for another block measured at the same time, in which the number of points in the point cloud included in the block is outputted in 1 byte, and the three-dimensional positions of the points are outputted consecutively in 3 bytes each. Sequences of a number of points and position information are iterated a number of times equal to the number of blocks sharing the same time information. When the information for all blocks having the same time is outputted, information about a number of blocks sharing the same time and the time are outputted again, followed by the position data for each point in the point cloud included in each block.

As above, according to the distance measurement apparatus 100 of the present embodiment, a plurality of light beams are emitted at the same time, and data about a plurality of pixel blocks having the same time information is outputted. By emitting the plurality of light beams at the same time in different directions, and scanning a target scene while varying the combination of directions, the time taken to scan the entire scene can be shortened. Furthermore, by outputting a single piece of time information in association with a plurality of blocks, the size of the output data can be reduced.

According to the present embodiment, pixels in the depth map are grouped into blocks for each light beam direction, and points in the point cloud data converted from the depth map are also grouped into blocks. With this arrangement, the measurement time can be recorded for each block, and precise time information can be outputted in association with each block of the point cloud data outputted as a single frame. Moreover, even if the specifications of the distance range of the light beam are different for each frame, point cloud data can be grouped into blocks for each light beam in accordance with the specifications of the light beam for each frame, and a precise time can be outputted for each block in the point cloud.

Embodiment 5

Next, a distance measurement apparatus according to a fifth embodiment will be described.

In each embodiment described above, the time of the emission of a light beam is recorded as the precise time when distance measurement is performed. In contrast, in the present embodiment, a time associated with exposure period in which the image sensor 120 receives reflected light is recorded as the precise time of distance measurement.

The configuration of the distance measurement apparatus according to the present embodiment is the same as the configuration of the distance measurement apparatus 100 of Embodiment 1 illustrated in FIG. 4. In the present embodiment, the signal processing circuit 160 compares the timing when reflected light is detected by each pixel of the image sensor 120 to a time generated by the clock 140, and generates precise time information about the timing of the reception of reflected light. The signal processing circuit 160 records the generated precise time information to the recording medium 150 in association with a pixel range of a block.

FIGS. 34A and 34B are diagrams illustrating an example of information recorded to the recording medium 150 in the present embodiment. In the present embodiment, the information illustrated in FIGS. 34A and 34B is recorded instead of the information illustrated in FIG. 6B. The information illustrated in FIGS. 6A and 6C is recorded similarly in the present embodiment, too.

As illustrated in FIG. 34A, the signal processing circuit 160 records the precise time of the exposure timing to the recording medium 150 for each exposure period of the image sensor 120. Because distance is measured according to indirect ToF in the present embodiment, two or more exposure periods are set with respect to a single light projection timing. Consequently, as illustrated in FIG. 34A, information indicating which of the plurality of exposure periods set for each light projection is recorded together with the exposure time. The recorded time may be the exposure start time or the exposure end time, for example. The time may be stored in units of microseconds or in units of nanoseconds, for example.

After the pixel range of each block is determined, as illustrated in FIG. 34B, the pixel range of each block and the measurement time for each block are recorded in association with each other. The measurement time is determined by the signal processing circuit 160 on the basis of the exposure time illustrated in FIG. 34A.

Figure 35A:
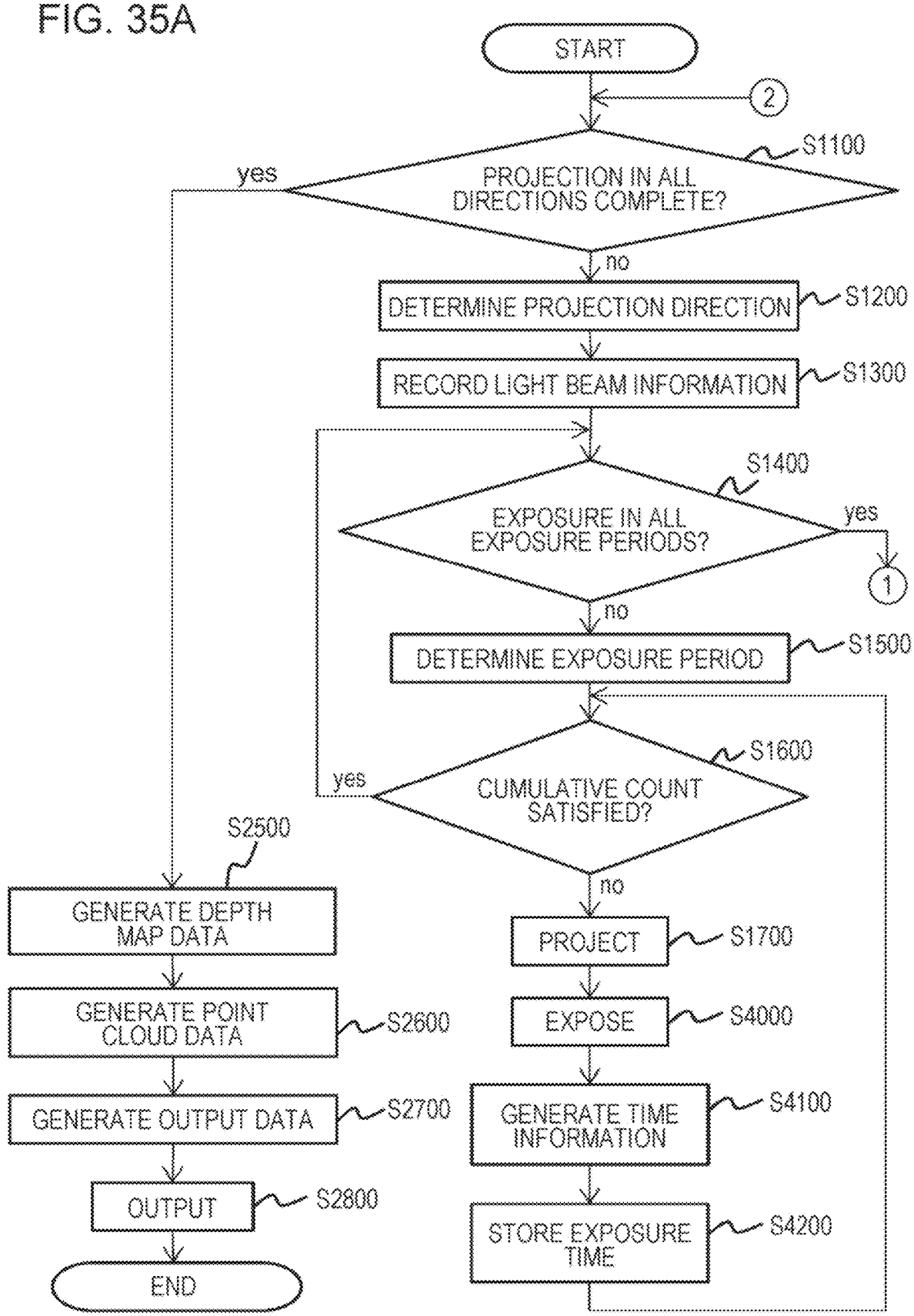
FIG. 35A is a flowchart illustrating an example of operations by a distance measurement apparatus in Embodiment 5.
Figure 35B:
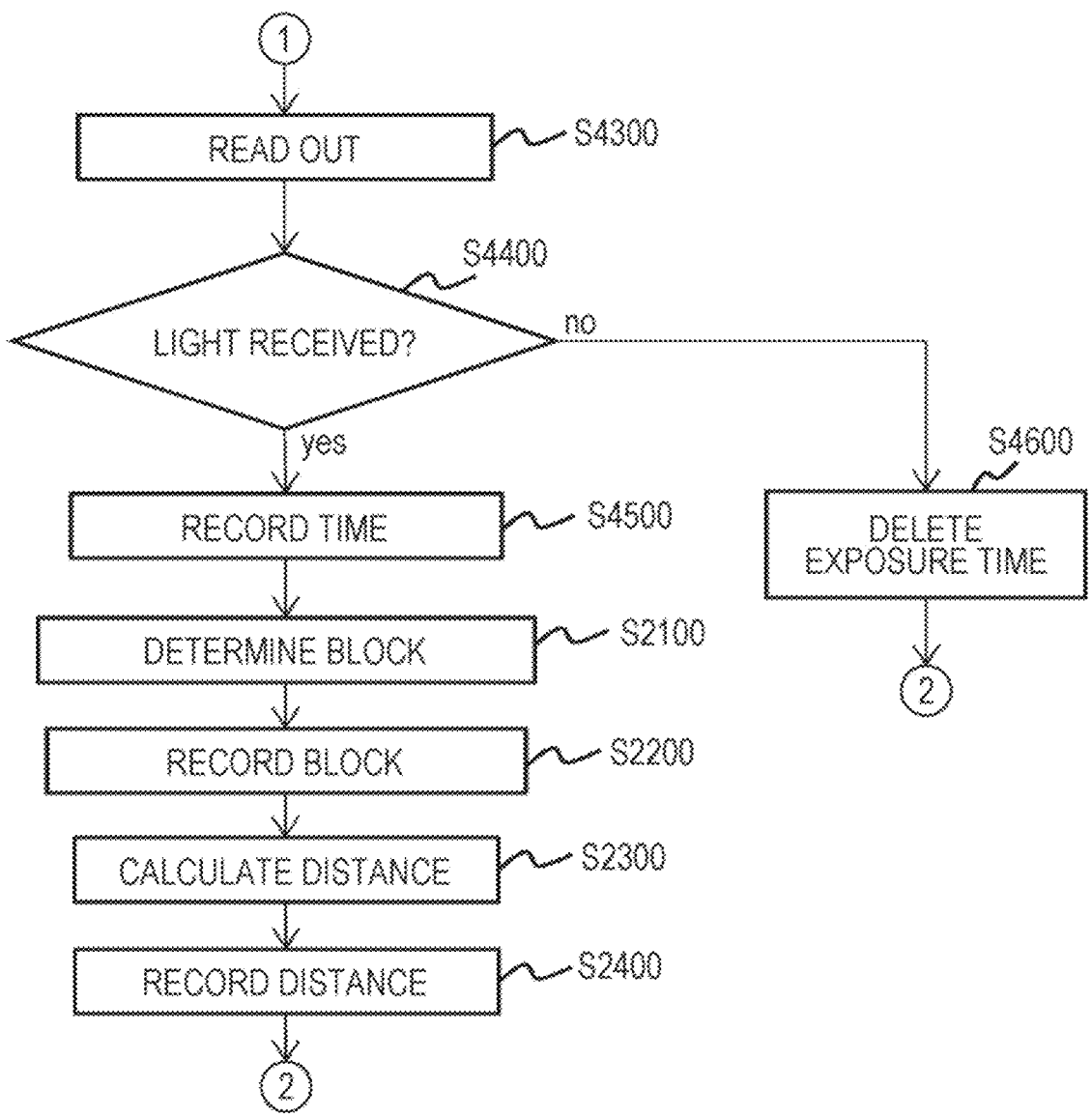
FIG. 35B is a flowchart illustrating an example of operations by a distance measurement apparatus in Embodiment 5.

FIGS. 35A and 35B are flowcharts illustrating an example of operations by the distance measurement apparatus in the present embodiment. Operations which are the same as the operations in Embodiment 1 (see FIG. 21) are denoted with the same reference signs. The operations from step S1100 to step S1700 and from step S2100 to step S2800 are the same as the operations illustrated in FIG. 21. In the present embodiment, steps S4000, S4100, and S4200 are added after step S1700, and steps S4300, S4400, S4500, and S4600 are added instead of steps S1900 and S2000. Hereinafter, each of the above steps will be described.

(Step S4000)

The image sensor 120 receives light in the exposure period determined in step S1500, and outputs a light reception signal indicating that light has been received to the signal processing circuit 160. The light reception signal may be outputted when the exposure starts or when the exposure ends.

(Step S4100)

The signal processing circuit 160 acquires the timing at which the light reception signal was acquired from the image sensor 120 in step S4000, that is, the precise time of the start or the end of the exposure, from the clock 140, and outputs the acquired time to the recording medium 150 as the exposure time.

(Step S4200)

The recording medium 150 stores the exposure time generated in step S4100. After step S4200, the flow returns to step S1600.

(Step S4300)

When exposure is completed in all exposure periods for a single light beam, the image sensor 120 outputs a signal indicating the quantity of charge stored in each exposure period for all pixels.

(Step S4400)

On the basis of the signal outputted in step S4300, the signal processing circuit 160 determines whether or not pixels having a non-zero value exist in one of the exposure periods. In the case of a "yes" determination, the flow proceeds to step S4500. In the case of a "no" determination, the flow proceeds to step S4600.

(Step S4500)

The signal processing circuit 160 references the exposure time stored in the recording medium 150 and determines the precise time when the distance was measured. The signal processing circuit 160 outputs the determined precise time of distance measurement to the recording medium 150. The recording medium 150 records the time as a time corresponding to the blocks illustrated in FIG. 34B. Furthermore, the recording medium 150 deletes the information about the time of each exposure in FIG. 34A. In the determination of the precise time of distance measurement, the exposure time is recorded multiple times, and therefore the first exposure time of an exposure period in which pixels that received light exist for example may be adopted. Alternatively, the last exposure time of an exposure period in which pixels that received light exist or a median exposure time of a plurality of exposure periods may also be adopted. The average time of the exposure periods in which pixels that received light exist may also be adopted.

(Step S4600)

The recording medium 150 deletes the information about the time of each exposure in FIG. 34A. After step S4600, the flow returns to step S1100.

According to the present embodiment, effects similar to the first embodiment likewise can be obtained Note that the configuration related to light beam emission is not limited to a configuration similar to Embodiment 1, and the configuration of any of Embodiments 2 to 4 may also be adopted.

Embodiment 6

Next, a vehicle control system according to a sixth embodiment will be described.

Figure 36:
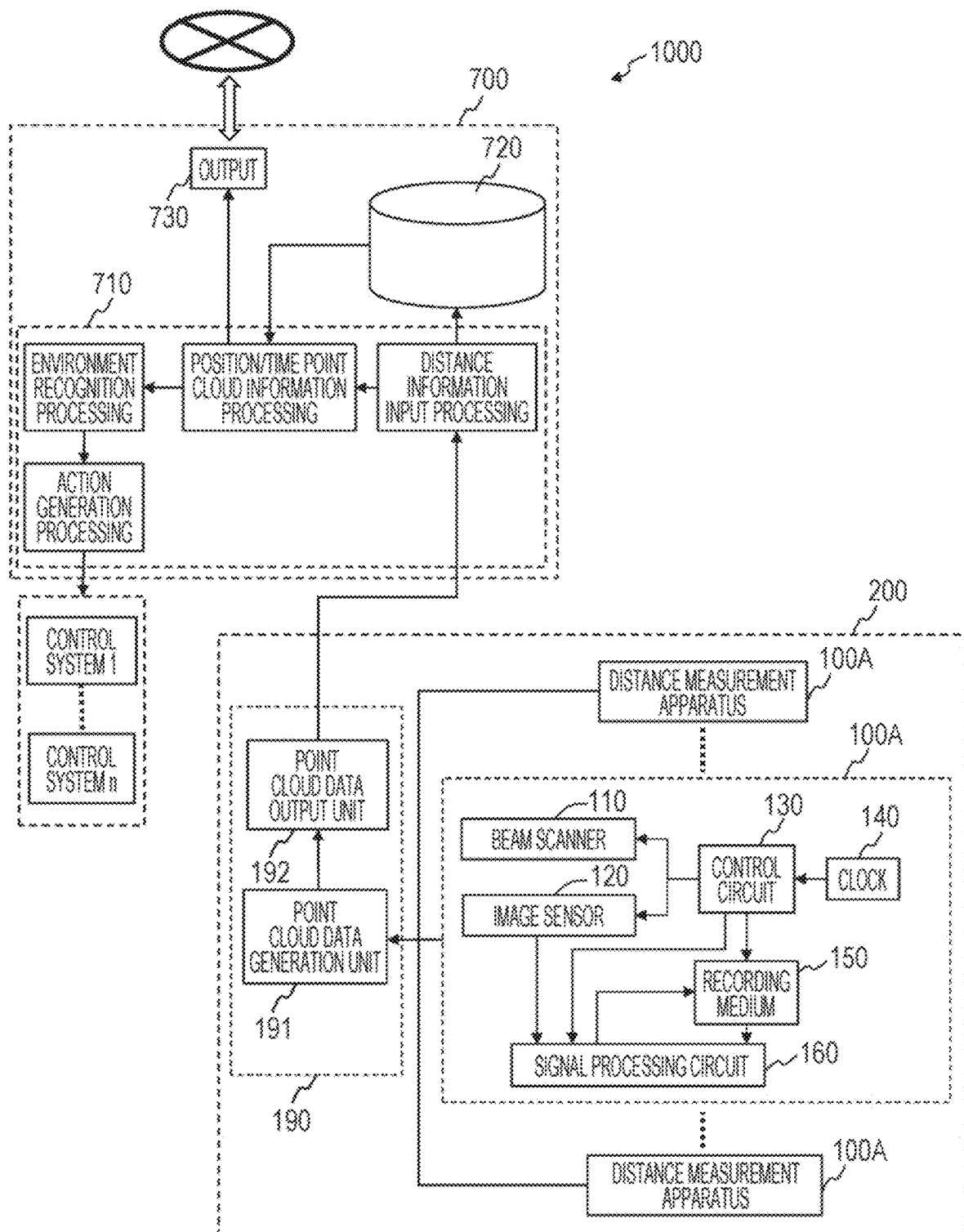
FIG. 36 is a block diagram illustrating a configuration of a vehicle control system according to Embodiment 6.

FIG. 36 is a block diagram illustrating a configuration of a vehicle control system 1000 according to the sixth embodiment of the present disclosure. The vehicle control system 1000 includes a point cloud data acquisition system 200 and a self-driving control system 700. The point cloud data acquisition system 200 is provided with a plurality of distance measurement apparatuses 100A and a processor 190. The self-driving control system 700 is provided with a processor 710, a recording medium 720, and an output interface 730.

Each distance measurement apparatus 100A has a configuration similar to the distance measurement apparatus 100 in any of Embodiments 1 to 5. In FIG. 36, the configuration of only a single distance measurement apparatus 100A is illustrated. The plurality of distance measurement apparatuses 100A all include the same functions and are installed in different locations in the vehicle. Each distance measurement apparatus 100A is different from the distance measurement apparatus 100 in the embodiments described above in that the signal processing circuit 160 outputs depth map data rather than point cloud data. In the present embodiment, point cloud data is generated by a processing device, namely the processor 190, disposed outside the distance measurement apparatuses 100A. The processor 190 combines a plurality of depth map data respectively outputted from the plurality of distance measurement apparatuses 100A, and outputs a single set of point cloud data. The processor 190 is provided with a point cloud data generation unit 191 and a point cloud data output unit 192. The point cloud data generation unit 191 and the point cloud data output unit 192 each may be achieved as a special-purpose circuit. Alternatively, the processor 190 may function as the point cloud data generation unit 191 and the point cloud data output unit 192 by executing a computer program.

Each distance measurement apparatus 100A generates depth map data with time information attached to each block by executing operations similar to the operations in Embodiment 1. The data includes time information for each block and information indicating correspondence relationships between blocks and pixels. The data is sent to the point cloud data generation unit 191. The operations by each distance measurement apparatus 100A are the same as the operations illustrated in FIG. 21 up to step S2500. Hereinafter, FIG. 37 will be referenced to describe the operations after step S2500.

FIG. 37 illustrates the portions of the operations by the distance measurement apparatus 100A in the present embodiment that are different from the operations illustrated in FIG. 21. Through the operations from step S1100 to step S2400 illustrated in FIG. 21, data like the examples illustrated in FIGS. 6A to 6C is recorded to the recording medium 150. In other words, information shared among a plurality of frames like the example illustrated in FIG. 6A, information about each frame like the example illustrated in FIG. 6B, and distance information for each pixel in at least one frame like the example illustrated in FIG. 6C are recorded. Thereafter, the signal processing circuit 160 executes the operations from step S2500 to step S2750 illustrated in FIG. 37. The operations in each step are as follows.

(Step S2500)

The signal processing circuit 160 generates a depth map expressing the distance information for all pixels in an image format on the basis of the distance for each pixel recorded to the recording medium 150.

(Step S2710)

The signal processing circuit 160 generates output data on the basis of the depth map generated in step S2500 and the information shared among a plurality of frames, the correspondence information between blocks and pixels, and the time information recorded to the recording medium 150. The data includes time information for each block and information indicating correspondence relationships between blocks and pixels. The data is sent to the point cloud data generation unit 191.

Figure 38A:
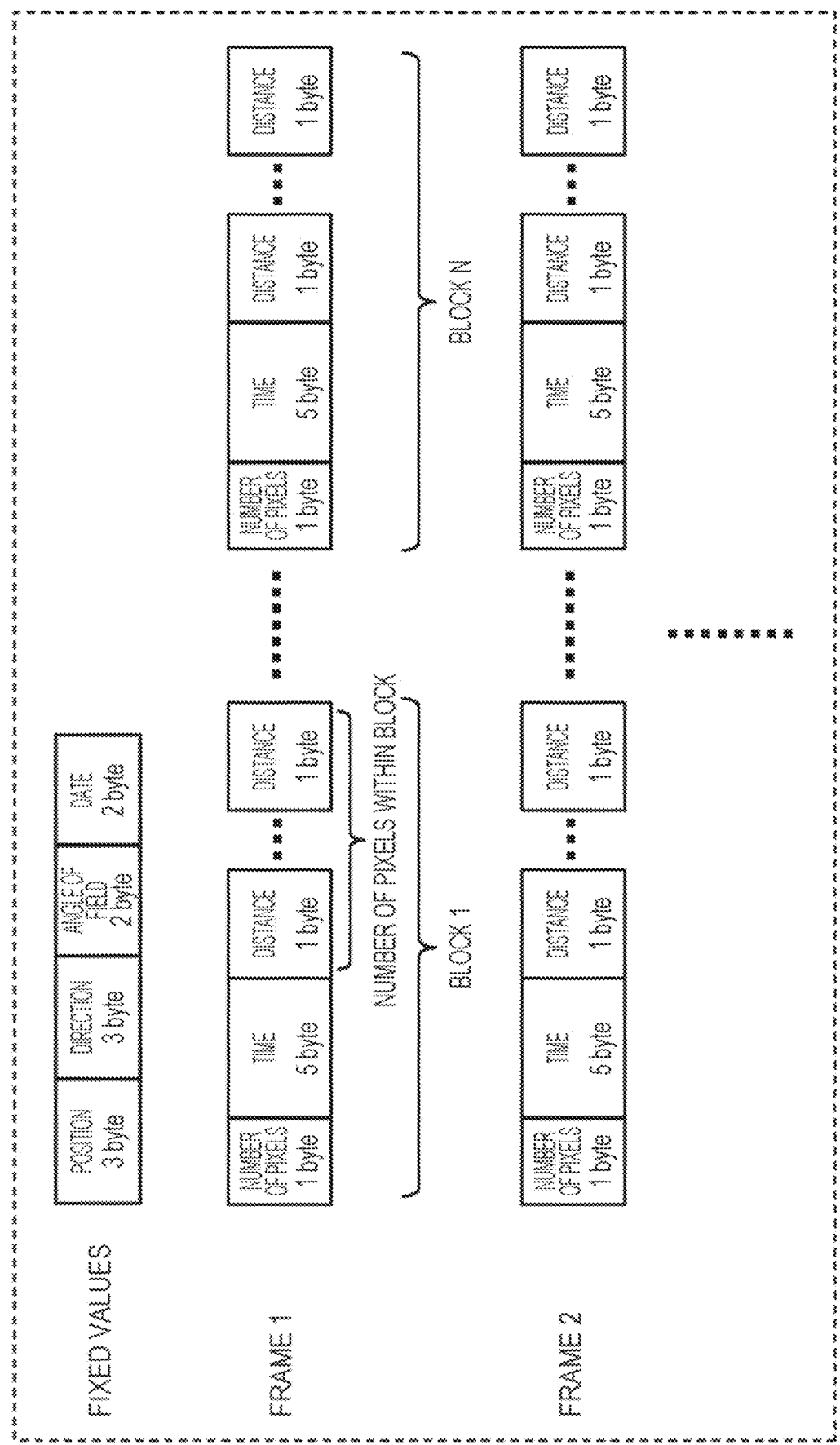
FIG. 38A is a diagram illustrating an example of a format of data outputted in Embodiment 6.

FIG. 38A is a diagram illustrating an example of the format of the data outputted from the signal processing circuit 160 in the distance measurement apparatus 100A. Like the example in FIG. 7A, fixed values which are data shared among a plurality of frames and data that is different for each frame are outputted. The fixed values may include values indicating the position of the image sensor 120 inside a vehicle, the normal direction of the light-receiving surface of the image sensor 120, the angle of field of the image sensor 120, and the date. The position of the image sensor 120 may be expressed by a 3-byte value, for example. The normal direction of the light-receiving surface may be expressed by a 3-byte value, for example. The angle of field may be expressed by a 2-byte value, for example. The date may be expressed by a 2-byte value, for example. In the example of FIG. 38A, the output data for each frame includes, as the data for each block, information about the number of pixels included in the block, the measurement time of the block, and information about the distance calculated for each of the plurality of pixels included in the block. The number of pixels included in the block may be expressed in 1 byte, for example. The measurement time may be expressed in 5 bytes in units of microseconds, for example. The distance for each pixel in the block may be expressed in 1 byte, for example. By iterating data sets of the number of pixels in each block, the time, and the distance for each pixel a number of iterations equal to the number of blocks, the outputting of the data for a single frame is completed. Note that in the example of FIG. 38A, the number of blocks is a known fixed value.

Figure 38B:
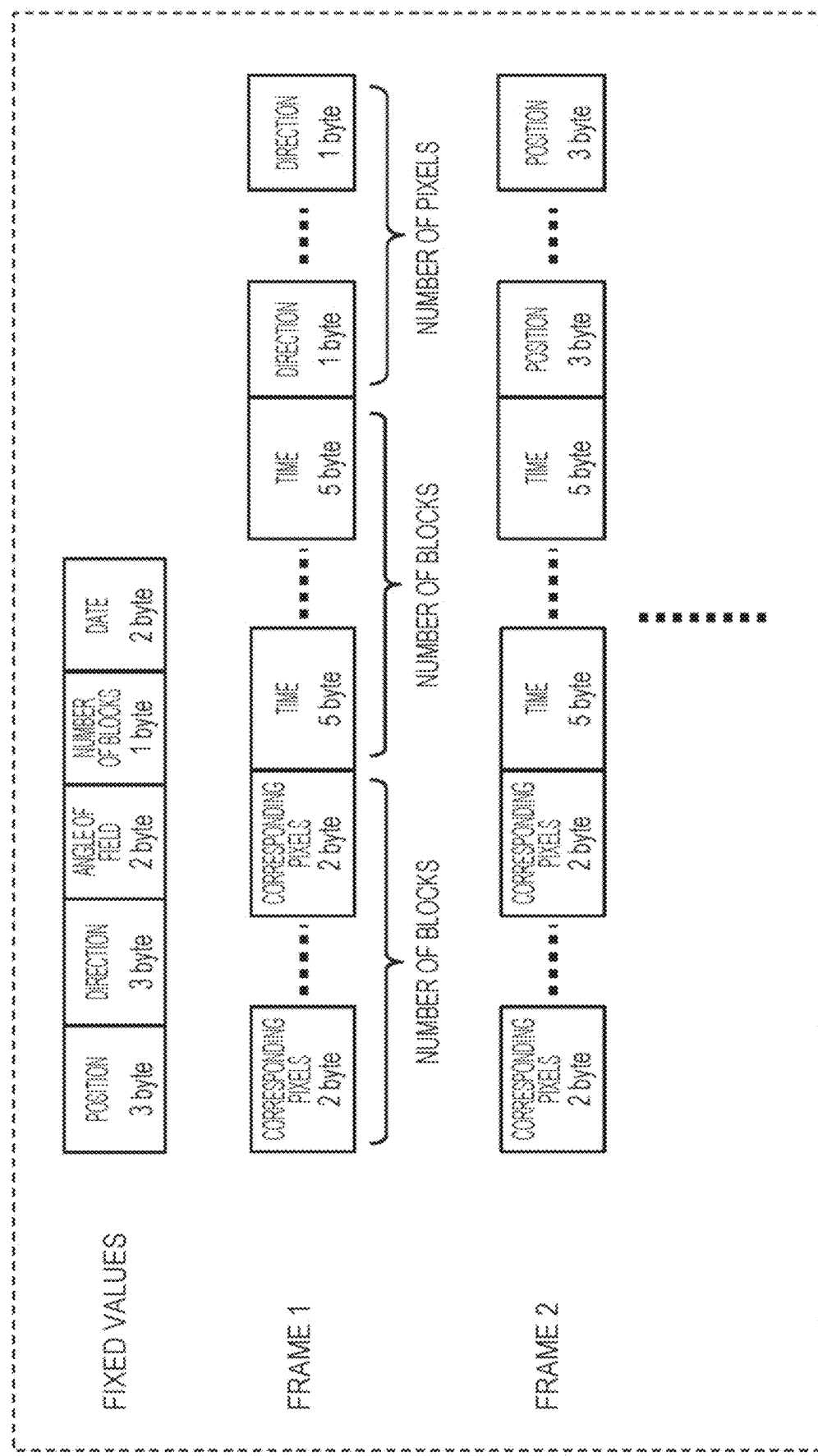
FIG. 38B is a diagram illustrating another example of a format of data outputted in Embodiment 6.

FIG. 38B illustrates another example of the output data format. In this example, like the example of FIG. 7B, information about the number of blocks is included among the fixed values. Also, an ID is assigned to each pixel. The number of blocks may be expressed in 1 byte, for example. For each frame, the range of the plurality of pixels included in each of the blocks, that is, the IDs of the pixels at the start point and the end point, may be expressed in 2 bytes, for example. Next, the measurement time corresponding to each block may be expressed in 5 bytes, for example. Finally, the distance measured for each pixel may be expressed in 1 byte.

Note that ID information that identifies each of the plurality of distance measurement apparatuses 100A may also be included in the information shared among the plurality of frames.

(Step S2720)

The signal processing circuit 160 outputs data including the depth map data generated in step S2710 and the measurement time for each block to the point cloud data generation unit 191.

(Step S2730)

The point cloud data generation unit 191 generates point cloud data by combining the plurality of depth maps acquired from the plurality of distance measurement apparatuses 100A. Specifically, the point cloud data generation unit 191 successively acquires the depth map data and the measurement time for each block from the plurality of distance measurement apparatuses 100A. In one example, the depth maps for which the measurement time for each block is within a fixed time range from among the acquired depth maps for a plurality of frames are combined as a single "frame" in the point cloud data. In another example, the blocks for which the measurement time for each block is within a fixed time range in the depth map for a single frame are combined as a single "frame" in the point cloud data. In the latter example, the data in one depth map may be divided into a plurality of "frames" in the point cloud data. The fixed time range may be approximately 30 milliseconds, for example. For pixels having a value other than 0 or infinity from among the pixels in the acquired depth maps, the distance information for each pixel in the depth map data is converted into point cloud data in the three-dimensional coordinate system of the vehicle control system 1000 on the basis of information about the position and direction of the image sensor 120 acquired from each distance measurement apparatus 100A. The three-dimensional coordinate system may take the center of the vehicle as the origin, for example. Furthermore, the correspondences between pixels and blocks in the depth maps from which the point cloud data is converted is generated as correspondence information between points in the point cloud data and blocks, and correspondence information between the measurement time of each block and the point cloud data is generated.

(Step S2740)

The point cloud data output unit 192 generates the point cloud data generated in step S2730, the correspondence information between data points and blocks, and the measurement time information for each block as an output data sequence. The output data sequence is sent to the processor 710 in the self-driving control system 700.

Figure 39A:
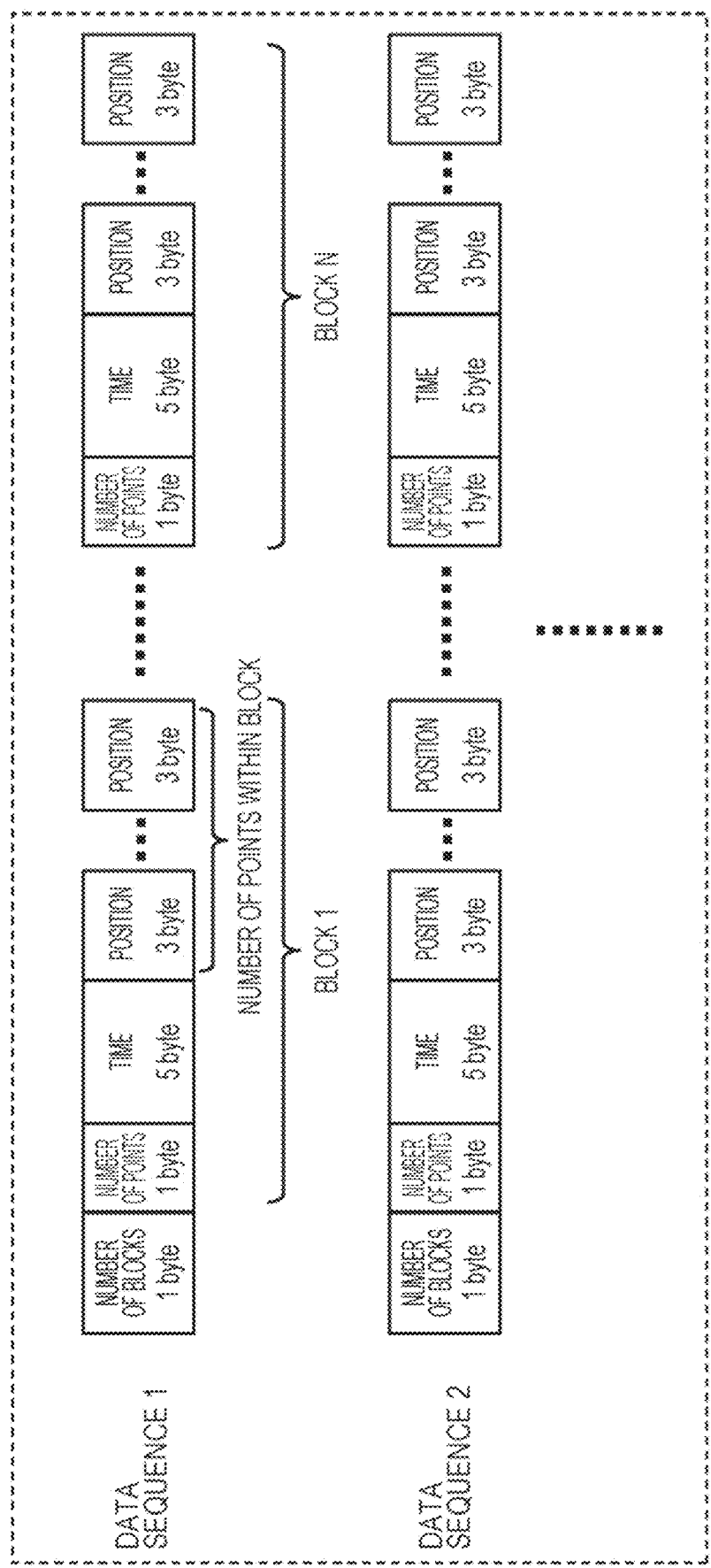
FIG. 39A is a diagram illustrating another example of an output data format.

FIG. 39A illustrates an example of the data format of the output data sequence. In this example, for each data sequence, the number of blocks is outputted in 1 byte, and thereafter for each block, the number of points included in the block is outputted in 1 byte, the time is outputted in 5 bytes, and the three-dimensional position information for each point is outputted in 3 bytes.

Figure 39B:
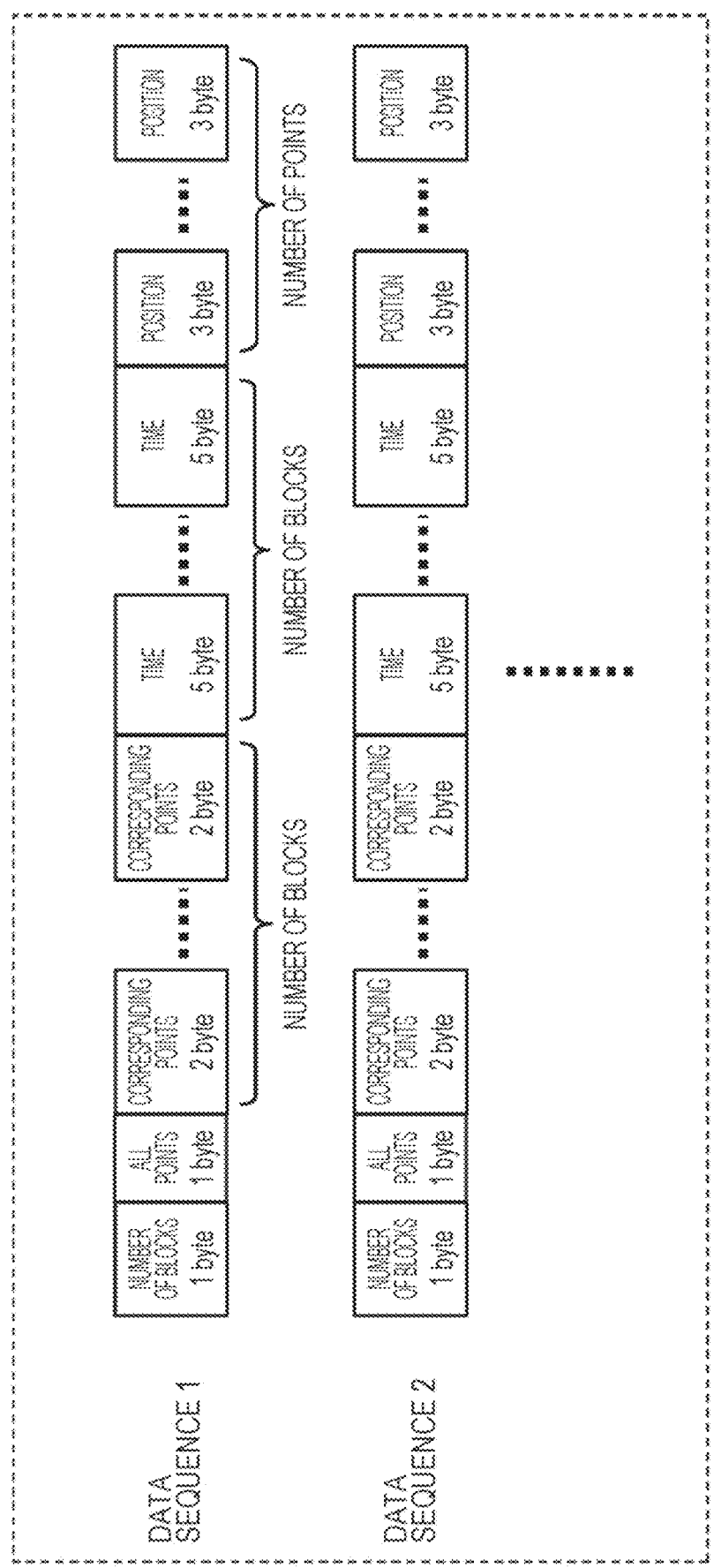
FIG. 39B is a diagram illustrating yet another example of an output data format.

FIG. 39B illustrates another example of the data format of the output data sequence. In this example, for each data sequence, the number of blocks is outputted in 1 byte and the total number of bytes is outputted in 1 byte first, and thereafter, corresponding points of the blocks equal to the number of blocks are outputted in 2 bytes each, times equal to the number of blocks are outputted in 5 bytes each, and the three-dimensional position information for each point is outputted in 3 bytes each for all points.

Note that in FIGS. 39A and 39B, an identifier (ID) may also be assigned to each data sequence. The identifier may be incremented by 1 for each data sequence, and may also be reset to 0 at a predetermined number. Additionally, acquired sensor information may also be included in the data sequences. For example, the number of sensor groups including an image sensor and fixed values for each sensor (such as the position, direction, and angle of field) may also be included in the data sequences. A sensor ID may also be assigned to each block as information indicating which of the plurality of sensors acquired each block.

The self-driving control system 700 controls the self-driving of the vehicle on the basis of the point cloud data successively acquired from the point cloud data acquisition system 200. Various data such as map data is recorded in the recording medium 720 of the self-driving control system 700. Various data may also be acquired and updated as needed through communication. The processor 710 transmits appropriate instructions to a plurality of control systems on the basis of the map data and the point cloud data successively acquired from the point cloud data acquisition system 200. The control systems include mechanisms such as an accelerator, brakes, and steering, for example. According to the present embodiment, because appropriately time-adjusted point cloud data is sent from the point cloud data acquisition system 200, the possibility of misrecognition caused by time errors can be reduced.

The foregoing embodiments illustrate examples of the data format, but another data format may also be used. For example, the numbers of bytes in each type of data are not limited to the values described above and may be other fixed values, or may be variable. In the case of variable numbers of bytes, the byte lengths may be included in the data separately. Additionally, synchronization information or delimiters in a predetermined data format may also be used as information indicating the boundaries between blocks, frames, or the data from each of the sensors. When analyzing data, the analysis of the data is possible after acquiring the synchronization information. The boundaries between data may also be indicated by including information about data lengths or data counts in the data, or the boundaries between data may be indicated by a combination of synchronization information and data lengths or data counts. Each piece of data may also be handled in a packet format. A packet may indicate the type and length of the packet, the data, and the like, and shared information about the data may be indicated in a packet header, for example.

Note that auxiliary time information necessary to combine point clouds, such as a protocol used for time synchronization or information about a server used as a reference, may also be added to the output file.

In the foregoing embodiments, indirect ToF is used as the method of measuring distance, but direct ToF may also be used. In this case, the image sensor 120 is replaced by a sensor provided with a two-dimensional array of light-receiving elements including a timer/counter. In distance measurement by direct ToF, the exposure of the image sensor 120 is started at the same time as the emission of a light beam, and furthermore the operation of the timer/counter is also started at the same time. The operation of the timer/counter is stopped at the point in time when the light-receiving elements of the image sensor 120 receive a single photon. The exposure time is taken to be a duration equal to or greater than the duration corresponding to the maximum distance at which a light beam can reach and reflected light can be received, and in the case where light is not received within the exposure time, the distance is set to infinity. With direct ToF, because the time is measured by capturing a tiny amount of light, for actual distance measurement, a measurement value is determined according to a method of measuring the distance multiple times and taking a value such as the average of the obtained durations. The projection time of a light beam may be set as the measurement time of each block, similarly to the above embodiments. In the case of measuring distance with a plurality of light projections, the projection time of the first light beam, the projection time of the last light beam, a median value of the projection time of all light beams in the same direction, or the like may be set as the measurement time.

Figure 40B:
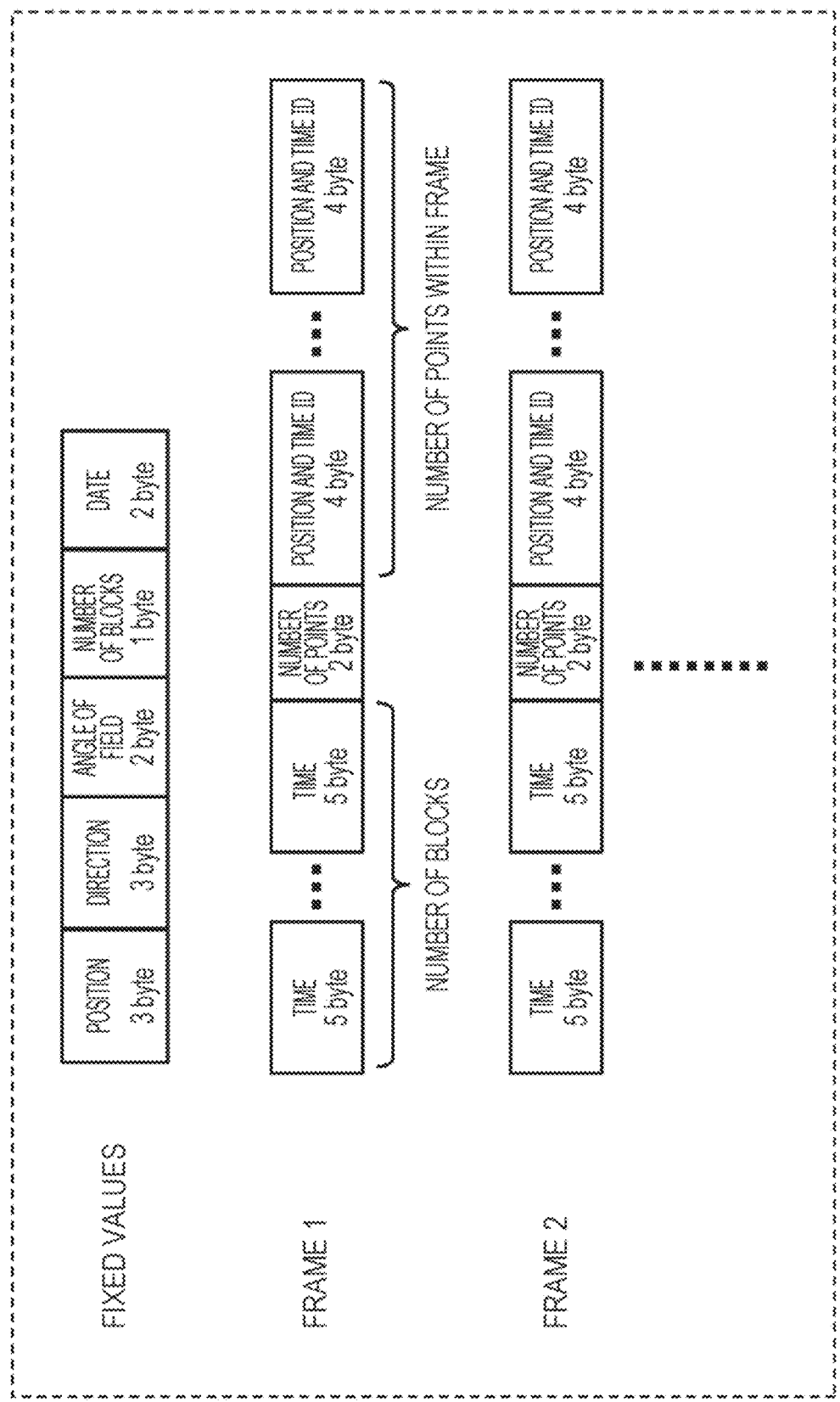
FIG. 40B is a diagram illustrating an example of a data format of encoded point cloud data.

The point cloud data may also be outputted in an encoded or compressed form. In the case of encoding, a file format as illustrated in FIGS. 40A and 40B may be used, for example. In the example of FIGS. 40A and 40B, a time ID rather than the time information itself is added to the position information of the points, and the actual time for each time ID is written in a separate region (for example, the upper part of a header). The total number of times matches the number of blocks in a frame. In other words, the time ID ranges from 0 to (number of blocks-1). With this arrangement, by adding the time as attribute information about each point, processing is easier from an encoding standpoint and the coding efficiency is raised easily. In other words, using the time ID reduces the amount of data during compression, including redundant portions created by the addition of the ID. For example, in the case of microsecond precision, the time information takes a 26-bit value ranging from 0 to 59999999, which is extremely large. If the same time is added to a plurality of points, the amount of data can be reduced by attaching the time ID to each point instead of the value of the time itself. The number of bits needed for the time ID depends on the number of blocks in a frame, but in the case of 256 blocks for example, an 8-bit time ID is sufficient, which is less than 26 bits.

In this way, using the time ID makes it possible to achieve a file format suitable for encoding while also keeping the data size small. Note that because points assigned the same time ID belong to the same block, the time ID may be considered to be data indicating the correspondence relationships between blocks and the points belonging to each block.

Embodiment 7

Next, a system according to a seventh embodiment will be described. The system of the present embodiment acquires output data from a plurality of distance measurement apparatuses, and combines the plurality of output data to generate new point cloud data. Unlike the system in Embodiment 6, in the present embodiment, each distance measurement apparatus does not necessarily have to be configured to output data with a time attached to each block. For example, each distance measurement apparatus may generate output data with a precise time attached to each of a plurality of points. The system that combines the output data from a plurality of distance measurement apparatuses may be like the following three examples.

In the first example, the system acquires data indicating the positions or distances of a plurality of points expressed in a three-dimensional coordinate system set for each distance measurement apparatus from the plurality of distance measurement apparatuses, and combines the plurality of data into point cloud data expressed in a single three-dimensional coordinate system. Each distance measurement apparatus outputs data that includes information about position or distance as well as information about the precise time when the distance was measured. The system generates and outputs four-dimensional point cloud data by combining the precise time information with the three-dimensional position information transmitted from the plurality of distance measurement apparatuses. Such a system may be a control system of a self-driving vehicle like in Embodiment 6 for example, or a monitoring system that monitors a surrounding environment with a plurality of fixed sensors.

The system in the second example is a relatively small-scale server system. For example, the server system may be provided with the information processing apparatus installed in the stationary system 400 illustrated in FIG. 2 as a server. Such a server system may be further provided with a plurality of terminal systems positioned around the stationary system 400. Each terminal system may be a system like the first example, for instance. In such an example, each terminal system is configured to output point cloud data expressed in a coordinate system specific to each terminal system. The server combines the plurality of point cloud data to generate new point cloud data. At this time, the server generates four-dimensional data including a precise time attached to each point in addition to the positions of the points in the point cloud. In the case where each terminal system is included in a moving body, the server acquires data indicating the position and attitude of each terminal system. For example, the server acquires data indicating the position of the origin of the coordinate system of each terminal system in the coordinate system of the server, and data indicating a rotation angle of the coordinate system of each terminal system with respect to the coordinate system of the server. The position of each terminal system may also be generated from point cloud data obtained by a group of distance measurement apparatuses included in the server itself or nearby stationary systems. There is a possibility that some of the four-dimensional point cloud data outputted by the plurality of systems may overlap. In the case where the positional misalignment between point clouds is large despite having identical distance measurement times or only a slight difference in distance measurement times (such as 10 μs or less) between the point clouds, the reliability of the data for one of the point clouds is considered to be low. Accordingly, a confidence level may be calculated for each point cloud in units of systems or for each data point on the basis of the state of each system, and the point clouds may be combined according to the confidence level. For example, low-confidence data points may be merged with high-confidence data points. In this way, the combination of first measurement data and second measurement data may include data from the first measurement data and the second measurement data that overlap each other in a spatiotemporal region, and such data may be merged on the basis of the confidence level of the first measurement data and the confidence level of the second measurement data. In this example, the confidence level may be determined on the basis of at least one of the following (a) to (c), for instance.

(a) At least one of the movement speed of a first measurement apparatus that generated the first measurement data or the movement speed of a second measurement apparatus that generated the second measurement data.

(b) The relationship between the position and attitude of at least one of the first measurement apparatus or the second measurement apparatus, and the direction of the sun.

(c) At least one of the spatial density of the plurality of points expressed by the first measurement data or the spatial density of the other plurality of points expressed by the second measurement data.

The server in the second example may be a local server for monitoring traffic conditions, installed in a stationary object such as a traffic signal or a streetlight for instance. Alternatively, the server may also be a server in a security system including a plurality of security robots. Such a security system may be used for the purpose of monitoring a building, for instance. The server may also generate point cloud data by combining data transmitted from cameras installed in the plurality of security robots.

The system in the third example includes a server that performs relatively large-scale calculations, like the server 500 illustrated in FIGS. 1 and 2, for instance. The server in this example (hereinafter referred to as the "large-scale server") acquires data outputted from terminal systems like in the first example and data outputted from small-scale servers like in the second example. The large-scale server stores map data for a wide region. The large-scale server combines point cloud data acquired from each terminal system and each small-scale server on the basis of the map data and data indicating the position and attitude of each of the individual terminal systems and small-scale servers. For example, the large-scale server combines the data by converting the position of each point in the acquired plurality of point cloud data to a position in a three-dimensional coordinate system shared with the map data. When combining point cloud data, the arrangement of structures such as buildings indicated in the map data may conflict with the data points acquired from the terminal systems or small-scale servers in some cases. To resolve such conflicts, data points that conflict with the positions of structures indicated in the map data may be removed, and the confidence level of the point cloud data containing the removed data points may be lowered. In the case where the positional misalignment between point clouds is large despite having identical distance measurement times or only a slight difference in distance measurement times (such as 10 μs or less) between the point clouds, the reliability of the data for one of the point clouds is considered to be low. Accordingly, a confidence level of the position data for each point may be calculated as a function of the spatial density of the data points, and the confidence level may be recorded as additional information about the point cloud data, for instance. Alternatively, data points may be merged on the basis of the confidence level as in the second example. Besides the example illustrated in the second example, the confidence level may be determined on the basis of the relationship between the positions of a plurality of points indicated by the measurement data and the positions of one or more structures indicated in the map data, for instance. As an example, if points that conflict with the map data exist among the point cloud data outputted from a terminal system or a small-scale server, the confidence level may be determined according to the ratio of conflicting points.

A specific example of the large-scale server may be a server that monitors and records the dynamic state of a plurality of moving bodies, such as a server installed in a traffic information center, for instance. Alternatively, the large-scale server may be a server installed in a security center of a building or the like.

In all of the first to third examples above, each distance measurement apparatus outputs measurement data with precise time data added thereto. With this arrangement, a server that acquires the data can acquire the measurement time of the data points in units of time (such as in units of microseconds) with higher precision than the frame intervals (such as intervals of 33 milliseconds), which are the units of time of the output from each distance measurement apparatus. The server combines the three-dimensional position data acquired from a plurality of distance measurement apparatuses as four-dimensional data with added time data. Because information about the precise time is obtained for each point or each block, it is not necessary to synchronize frame operations among the plurality of distance measurement apparatuses or a plurality of systems including the distance measurement apparatuses. Consequently, data can be combined without being restricted to the units of time of the outputted frames. Moreover, any region can be extracted and processed from the spatiotemporal coordinate data generated by the combining. This arrangement makes it possible to recreate or analyze the state of an environment in detail. For example, the moving state of an object of interest can be extracted in units of microseconds.

Hereinafter, the systems according to the first to third examples above will be described more specifically.

First Example

Figure 41:
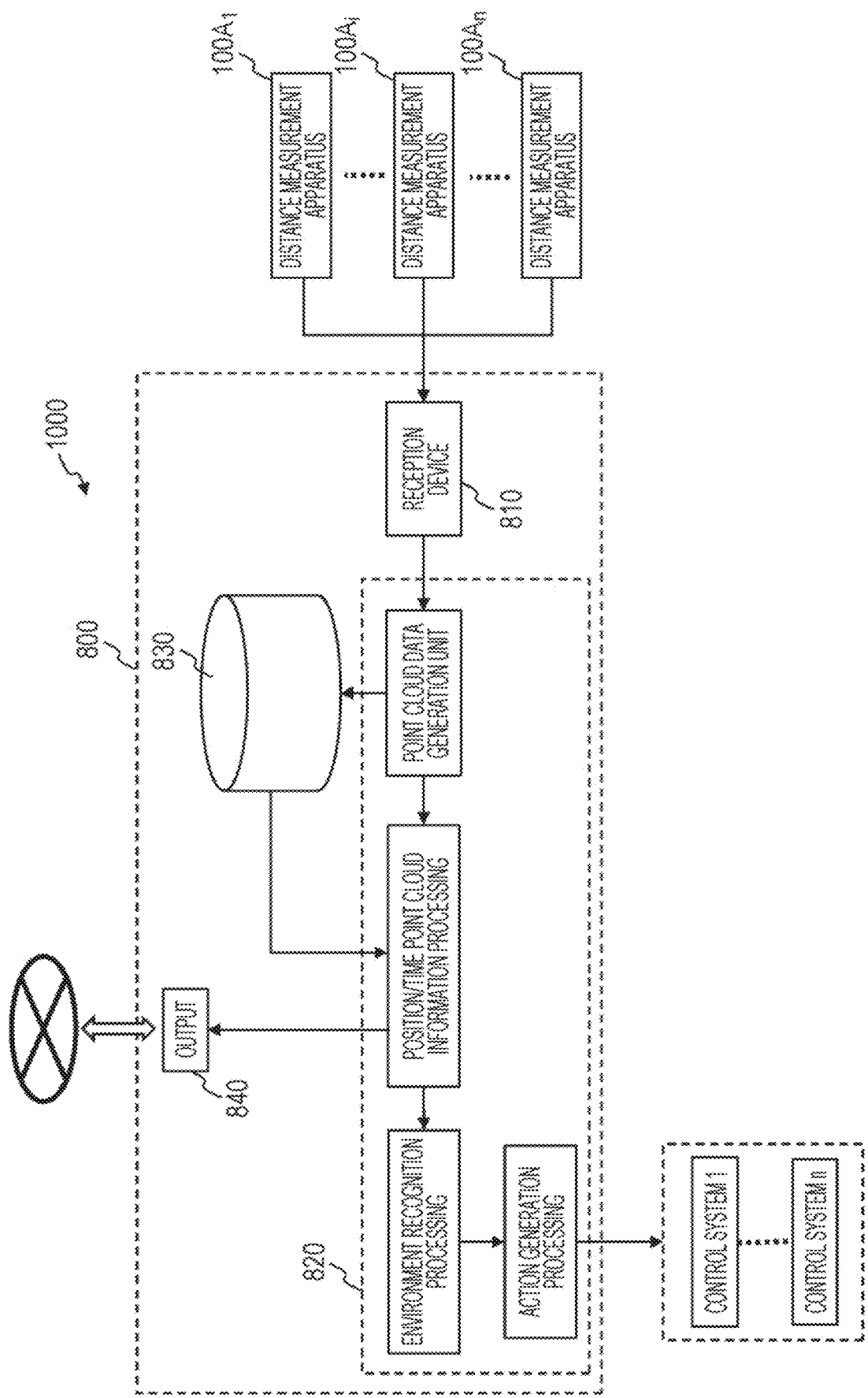
FIG. 41 is a block diagram illustrating an example configuration of a vehicle control system.

FIG. 41 is a block diagram illustrating a configuration of the vehicle control system 1000 according to the first example. The vehicle control system 1000 includes a plurality of (n) distance measurement apparatuses 100Ai (where i=1, 2, . . . , n) and a self-driving control system 800. The self-driving control system 800 is provided with a reception device 810, a processor 820, a recording medium 830, and an output interface 840.

The distance measurement apparatuses 100Ai have a configuration similar to the distance measurement apparatus 100 in any of Embodiments 1 to 5. However, the distance measurement apparatuses 100Ai in the present embodiment output depth map data and precise time data for each pixel. The plurality of distance measurement apparatuses 100Ai all include the same functions and are installed in different locations in the vehicle. Each distance measurement apparatus 100Ai is connected to the reception device 810 in a wired or wireless manner.

The reception device 810 acquires data outputted by the plurality of distance measurement apparatuses 100Ai. The reception device 810 acquires data shared among frames and data different for each frame from each distance measurement apparatus 100Ai. The data shared among frames includes data indicating the position and the attitude of the distance measurement apparatus 100Ai, for example. The data different for each frame includes depth map data and data indicating the precise time of distance measurement for each pixel.

The processor 820 converts the output data from the distance measurement apparatuses 100Ai successively acquired by the reception device 810 into point cloud data expressed in a single unified coordinate system by executing a program stored in the recording medium 830. Specifically, the processor 820 converts the depth map data into point cloud data expressed in the unified coordinate system of the vehicle on the basis of the information about the position and the direction of each distance measurement apparatus 100Ai outputted from each distance measurement apparatus 100Ai. A coordinate system taking the center of gravity of the vehicle as the origin, in which a plane containing the x-axis and a d-axis in the depth direction is parallel to the horizontal plane, may be used as the unified coordinate system. Furthermore, the processor 820 performs a process of recognizing the surrounding environment on the basis of the generated point cloud data and map data stored in the recording medium 830. Thereafter, the processor 820 determines vehicle operation on the basis of a recognition result, and outputs a control signal to control systems such as steering, engine, and braking systems.

The recording medium 830 stores the four-dimensional data, generated by the processor 820, in which the positions of the points in the point cloud expressed in the unified coordinate system are associated with the precise measurement time of each point. FIG. 42 illustrates an example of the content stored in the recording medium 830. In the example of FIG. 42, information indicating which distance measurement apparatus acquired each point is recorded in association with the four-dimensional information of each point.

The operations in the present embodiment are similar to the operations in Embodiment 6 described with reference to FIG. 37. However, in the present embodiment, the following point is different from Embodiment 6. In Embodiment 6, the processor 190 provided separately from the vehicle control system 1000 combines the plurality of depth map data outputted from the plurality of distance measurement apparatuses 100A into a single set of point cloud data. In contrast, in the present embodiment, the processor 820 executes the above combining process in the self-driving control system 800. The reception device 810 in the self-driving control system 800 acquires the depth map data with precise time data attached that was outputted in step S2720 from the plurality of distance measurement apparatuses 100Ai. The processor 820 combines the plurality of data into a single set of point cloud data.

Second Example

Figure 43:
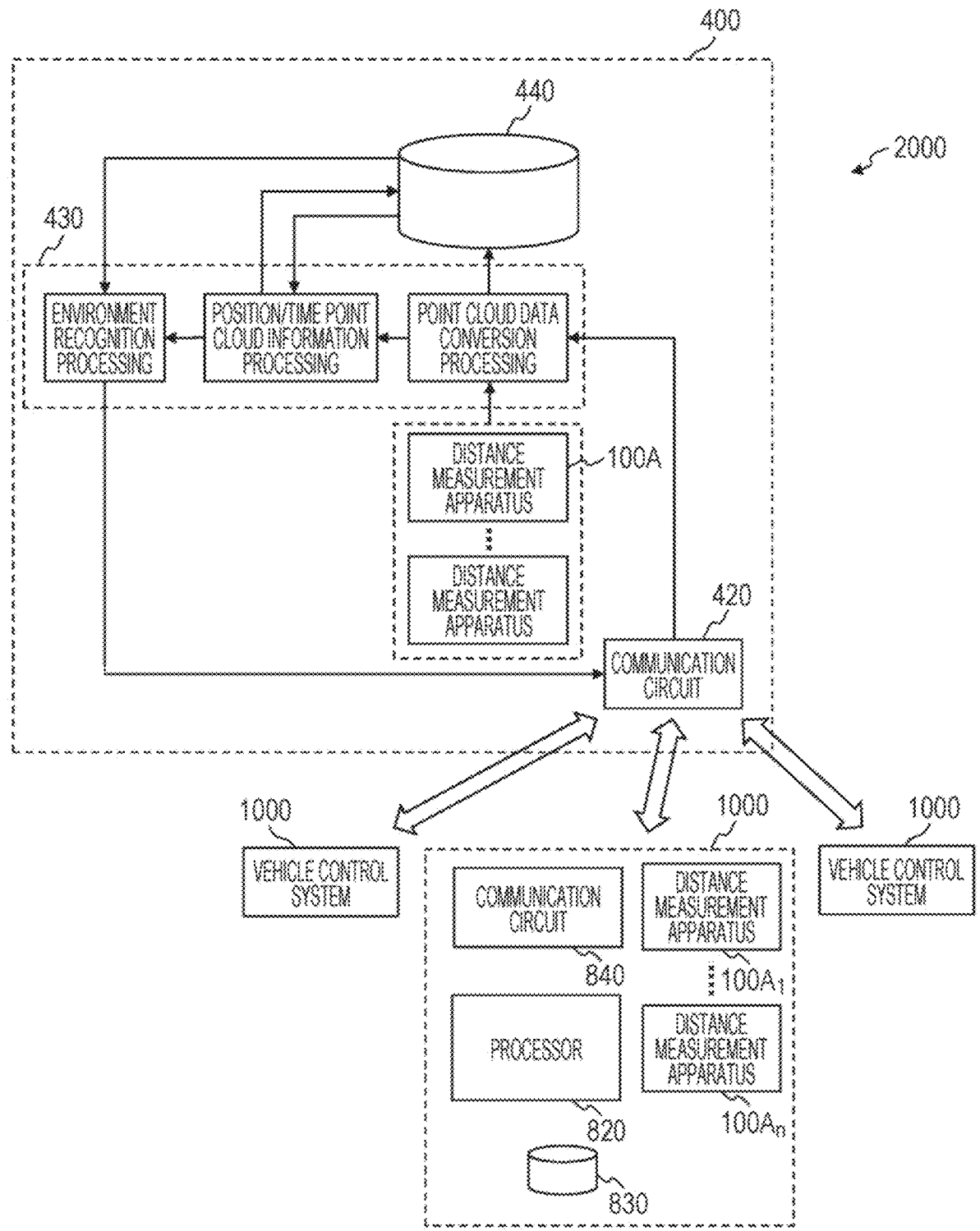
FIG. 43 is a block diagram illustrating an example configuration of a traffic information system.

FIG. 43 is a block diagram illustrating a configuration of a traffic information system 2000 according to the second example. The traffic information system 2000 includes a plurality of vehicle control systems 1000 and a stationary system 400. The stationary system 400 is provided with a plurality of distance measurement apparatuses 100A, a communication circuit 420, a processor 430, and a recording medium 440.

Each vehicle control system 1000 corresponds to the vehicle control system 1000 in the first example. In FIG. 43, structural elements are illustrated only for one of the plurality of vehicle control systems 1000 for simplicity. Each vehicle control system 1000 is provided with a communication circuit 840 in addition to the plurality of distance measurement apparatuses 100Ai, the processor 820, and the recording medium 830 described above. The communication circuit 840 is capable of communicating wirelessly with the communication circuit 420 in the stationary system 400. Each vehicle control system 1000 outputs four-dimensional point cloud data recorded in the recording medium 830. The outputted data may include data indicating the position of the vehicle, the travel speed, and the travel direction in addition to the four-dimensional point cloud data. The data is outputted periodically, for example. As an example, the point cloud data may be outputted once every 33 ms. The timing of the outputting of the point cloud data may be different for each vehicle control system 1000. The outputted point cloud data is sent to the stationary system 400.

The traffic information system 2000 is configured using only equipment positioned within a limited spatial range near the stationary system 400. For example, the stationary system 400 may be installed in a traffic signal installed at an intersection. The traffic information system 2000 may include one or more vehicle control systems 1000 located within a 50 m radius from the stationary system 400, for example. In the case where no vehicle control system 1000 exists within range, the traffic information system 2000 includes the stationary system 400 only.

Each distance measurement apparatus 100A in the stationary system 400 is provided with a configuration similar to the distance measurement apparatus 100Ai in the vehicle control system 1000.

The communication circuit 420 receives point cloud data transmitted from the vehicle control systems 1000. The communication circuit 420 also transmits data generated by processing executed by the processor 430 described later to the vehicle control systems 1000.

The processor 430 acquires the point cloud data from the vehicle control systems 1000 and the depth map data or the point cloud data outputted from the distance measurement apparatuses 100A, and combines the plurality of data into point cloud data expressed in a fixed three-dimensional coordinate system. The processor 430 also generates four-dimensional data with data about the precise measurement time added to each point in the point cloud data. Furthermore, the processor 430 may also perform a process of recognizing or analyzing the surrounding environment at each time on the basis of the four-dimensional data, and generate data indicating the processing result.

The recording medium 440 stores the point cloud data acquired by the communication circuit 420 and the depth map data acquired by each distance measurement apparatus 100A. Additionally, the recording medium 440 stores the four-dimensional data generated by the processor 430.

Figure 44:
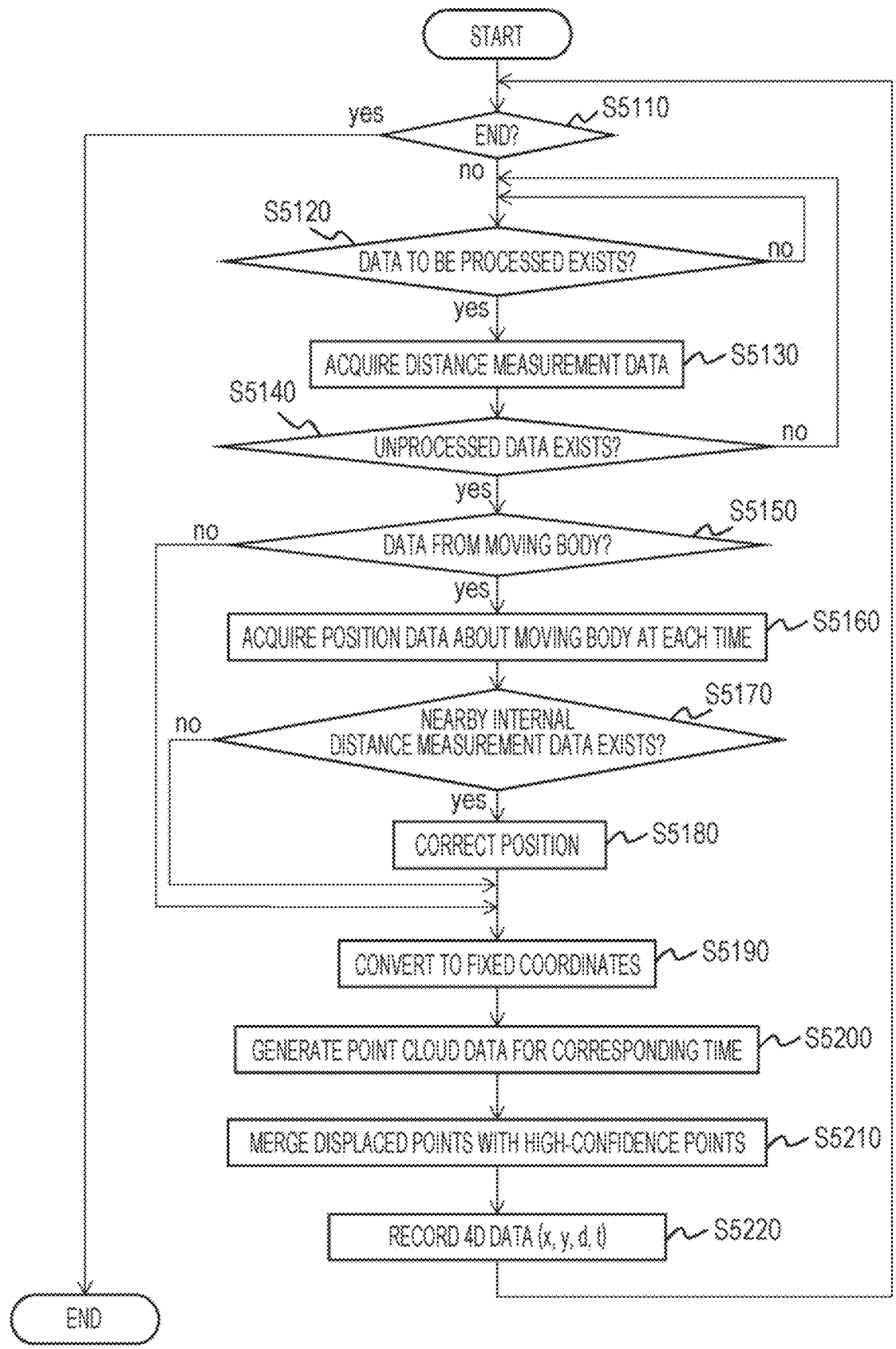
FIG. 44 is a flowchart illustrating an example of operations executed by a processor in a stationary system.

FIG. 44 is a flowchart illustrating an example of operations executed by the processor 430 in the stationary system 400. The processor 430 combines the data successively acquired from the plurality of vehicle control systems 1000 and the plurality of distance measurement apparatuses 100A to generate data expressed in a four-dimensional coordinate system by executing the operations from step S5110 to step S5220 illustrated in FIG. 44. Hereinafter, the operation in each step will be described.

(Step S5110)

First, the processor 430 determines whether or not an end signal is present or absent, the end signal containing an instruction to end operations and inputted from an input means not illustrated. In the case where the end signal has been inputted in step S5110, that is, in the case of a yes determination in step S5110, the flow of operations ends. In the case where the end signal has not been inputted in step S5110, that is, in the case of a no determination in step S5110, the flow proceeds to step S5120.

(Step S5120)

The processor 430 determines whether or not data to be processed exists. Specifically, the communication circuit 420 determines whether or not the communication circuit 420 has received output data from the vehicle control systems 1000, or whether or not the distance measurement apparatuses 100A have outputted data. In the case where the communication circuit 420 has received data or the distance measurement apparatuses 100A have outputted data in step S5120, the flow proceeds to step S5130. In the case where the communication circuit 420 has not received data or the distance measurement apparatuses 100A have not outputted data in step S5120, the operation in step S5120 is repeated.

(Step S5130)

The processor 430 acquires the data received by the communication circuit 420 or the data outputted by the distance measurement apparatuses 100A. The acquired data is point cloud data or depth map data, for example. Hereinafter, the acquired data will be referred to as "distance measurement data".

(Step S5140)

The processor 430 determines whether or not unprocessed data remains from among the distance measurement data acquired in step S5130. In the case where unprocessed data remains in step S5140, the flow proceeds to step S5150. In the case where unprocessed data does not remain in step S5140, the flow returns to step S5120.

(Step S5150)

The processor 430 determines whether the data to be processed is data from a moving body, namely the vehicle control system(s) 1000, or data from a stationary object, namely the distance measurement apparatus(es) 100A. In the case where the data to be processed is data from a moving body in step S5150, the flow proceeds to step S5160. In the case where the data to be processed is data generated by a stationary object in step S5150, the flow proceeds to step S5190.

(Step S5160)

The processor 430 extracts the precise time corresponding to each data point in the distance measurement data to be processed. Furthermore, the processor 430 acquires position data at the extracted precise time for the vehicle control system 1000 that outputted the distance measurement data to be processed. Position data acquired from GPS for example may be used as the position data of the vehicle control system 1000. In this case, the vehicle control system 1000 outputs the position data acquired from GPS as a fixed value for each frame, for example. The processor 430 may also calculate the position of the vehicle control system 1000 at each precise time by linearly interpolating the movement of the position between two consecutive frames on the basis of the duration of the frame interval.

(Step S5170)

The processor 430 determines whether or not distance measurement data acquired at a time near the precise time exists among the distance measurement data from the distance measurement apparatuses 100A in the stationary system 400. The nearby time may be approximately 500 µs before or after the precise time, for example. In the case where distance measurement data from the distance measurement apparatus(es) 100A exists in step S5170, the flow proceeds to step S5180. In the case where distance measurement data from the distance measurement apparatuses 100A does not exist in step S5170, the flow proceeds to step S5190.

(Step S5180)

The processor 430 generates point cloud data on the basis of the distance measurement data from the distance measurement apparatus(es) 100A specified in step S5170. The processor 430 clusters the data points and extracts a cluster corresponding to the vehicle closest to the position of the vehicle control system 1000 specified in step S5160. Additionally, the processor 430 changes the position of the vehicle control system 1000 to the coordinates at the center of gravity of the extracted cluster.

(Step S5190)

The processor 430 converts the coordinate values of each data point to coordinate values in the fixed coordinate system of the stationary system 400. For the data points acquired from the vehicle control system 1000, the coordinates of the vehicle control system 1000 are set with reference to the position of the vehicle control system 1000 determines by the operations from step S5160 to step S5180. The processor 430 converts the position coordinates of each data point expressed in the coordinate system of the vehicle control system 1000 to position coordinates expressed in the fixed coordinate system of the stationary system 400.

(Step S5200)

The processor 430 generates point cloud data as four-dimensional data by adding the precise time corresponding to each data point to the point cloud data combined in the fixed coordinate system in step S5190. Additionally, the processor 430 extracts the point cloud data at the time corresponding to the data to be processed and nearby times (for example, approximately 500 μs before and after) from the four-dimensional data.

(Step S5210)

The processor 430 clusters the point cloud data extracted in step S5200. A region where the density of data points around clusters is low and points not included in any cluster are distributed is considered to be a region of displaced data points. For data points included in clusters and displaced data points, the processor 430 determines which vehicle control system 1000 or distance measurement apparatus 100A the data points come from, and extracts the confidence level of the data points. The processor 430 recreates clusters using only data points with a high confidence level. For data points with a low confidence level included in the displaced data points from the original clusters, the processor 430 sets a movement vector so as to maximize the number of data points that overlap with the recreated clusters, and moves the three-dimensional positions to merge the point cloud with the clusters.

(Step S5220)

The processor 430 records four-dimensional point cloud data including the data points moved in step S5220 to the recording medium 440.

By repeating steps S5120 to S5220, the successively inputted point cloud data from the plurality of vehicle control systems 1000 and the successively generated distance data from the distance measurement apparatuses 100A can be used to generate four-dimensional point cloud data including precise time information in the environment surrounding the stationary system 400.

The generated four-dimensional point cloud data may be transmitted to each vehicle control system 1000 positioned near the stationary system 400, such as within the range of a 50 meter radius, for example. In addition to the point cloud data, the processor 430 may also output a processing result based on the point cloud data, such as data indicating a moving body recognition result, for example. Such data indicating a recognition result may include a label identifying a moving body such as a vehicle, a person, or a bicycle, position information about the moving body, and movement vector information. By acquiring the unified point cloud data in the fixed coordinate system of the stationary system 400 and data indicating a recognition result based on the point cloud data, each vehicle control system 1000 can travel more safely. For example, each vehicle control system 1000 can detect obstacles or the like that could not be detected with a sensor such as a distance measurement apparatus in its own vehicle due to occlusion or the like, and thereby create a movement plan for traveling more safely.

Note that confidence level in step S5210 may be determined according to factors like the following. For example, a lower confidence level may be set if the system in which the distance measurement apparatus is installed is moving at faster speeds. Also, whether or not the distance was measured under conditions with sunlight incident on the sensor of the distance measurement apparatus may be determined on the basis of the angle of the sun in the fixed coordinate system, the date, and the time, and a lower confidence level may be set for a point cloud in which there is a possibility that the distance was measured under such conditions.

Third Example

Next, the traffic information system according to the third example will be described. The traffic information system is provided with a configuration similar to the system described with reference to FIGS. 1 and 2, for example. The traffic information system includes a plurality of moving bodies 300, a plurality of stationary systems 400, and a server 500. There may be any number of moving bodies 300 and any number of stationary systems 400.

Figure 45:
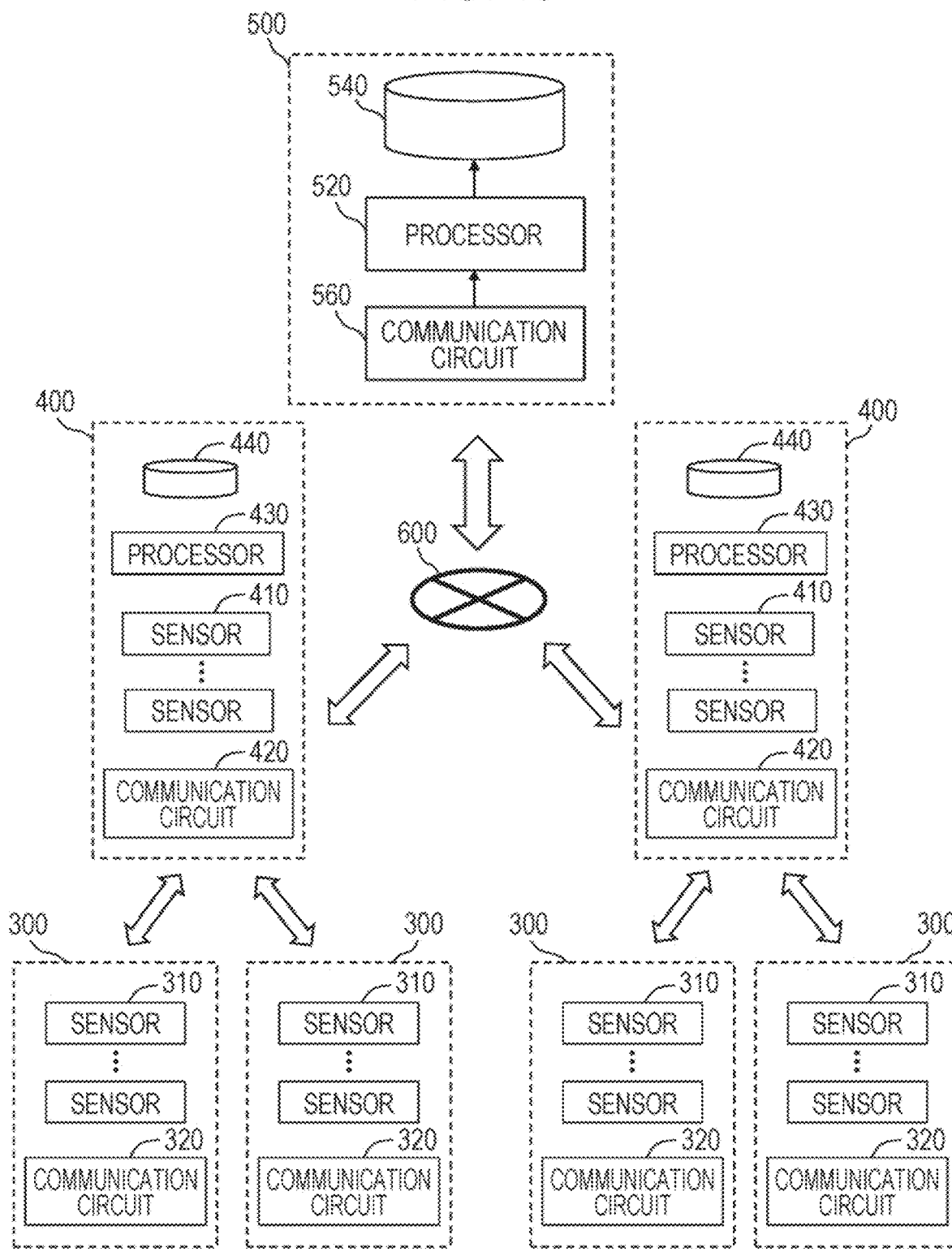
FIG. 45 is a block diagram illustrating another example configuration of a traffic information system.

Each moving body 300 is provided with a plurality of distance measurement sensors 310 disposed at different positions and attitudes, and a communication circuit 320. Similarly, each stationary system 400 is provided with a plurality of distance measurement sensors 410 disposed at different positions and attitudes, and a communication circuit 420. Each of the distance measurement sensors 310 and 410 measures distance according to a method similar to the distance measurement apparatus in any of the embodiments described above, and generates data expressing a depth map or a three-dimensional point cloud. The generated data is transmitted to the server 500 through the communication circuit 320 and 420. Instead of having each moving body 300 transmit data to the server 500 directly, the stationary systems 400 may also transmit distance measurement data collected from nearby moving bodies 300 to the server 500. FIG. 45 illustrates an example of the configuration of such a traffic information system. In the example of FIG. 45, each stationary system 400 acquires data from one or more moving bodies 300 located nearby, combines the acquired data with data outputted from one or more distance measurement sensors 410 provided in each stationary system 400 itself to generate and transmit a single set of point cloud data to the server 500. When a moving body 300 is located within a predetermined distance range from a stationary system 400, the stationary system 400 acquires data from each sensor 310 of the moving body 300. The data combining process by each stationary system 400 is executed by the processor 430 in each stationary system 400. The processor 430 performs the data combining process by executing a program stored in the recording medium 440. The data combining process by the processor 430 is similar to the process in the second example.

The server 500 is provided with a processor 520, a recording medium 540, and a communication circuit 560. The processor 520 successively acquires data through the communication circuit 560, and records the data to the recording medium 540. By performing appropriate processing such as time adjustment and coordinate conversion on the acquired data, the processor 520 generates combined point cloud data for a specific time and a specific place.

Figure 46:
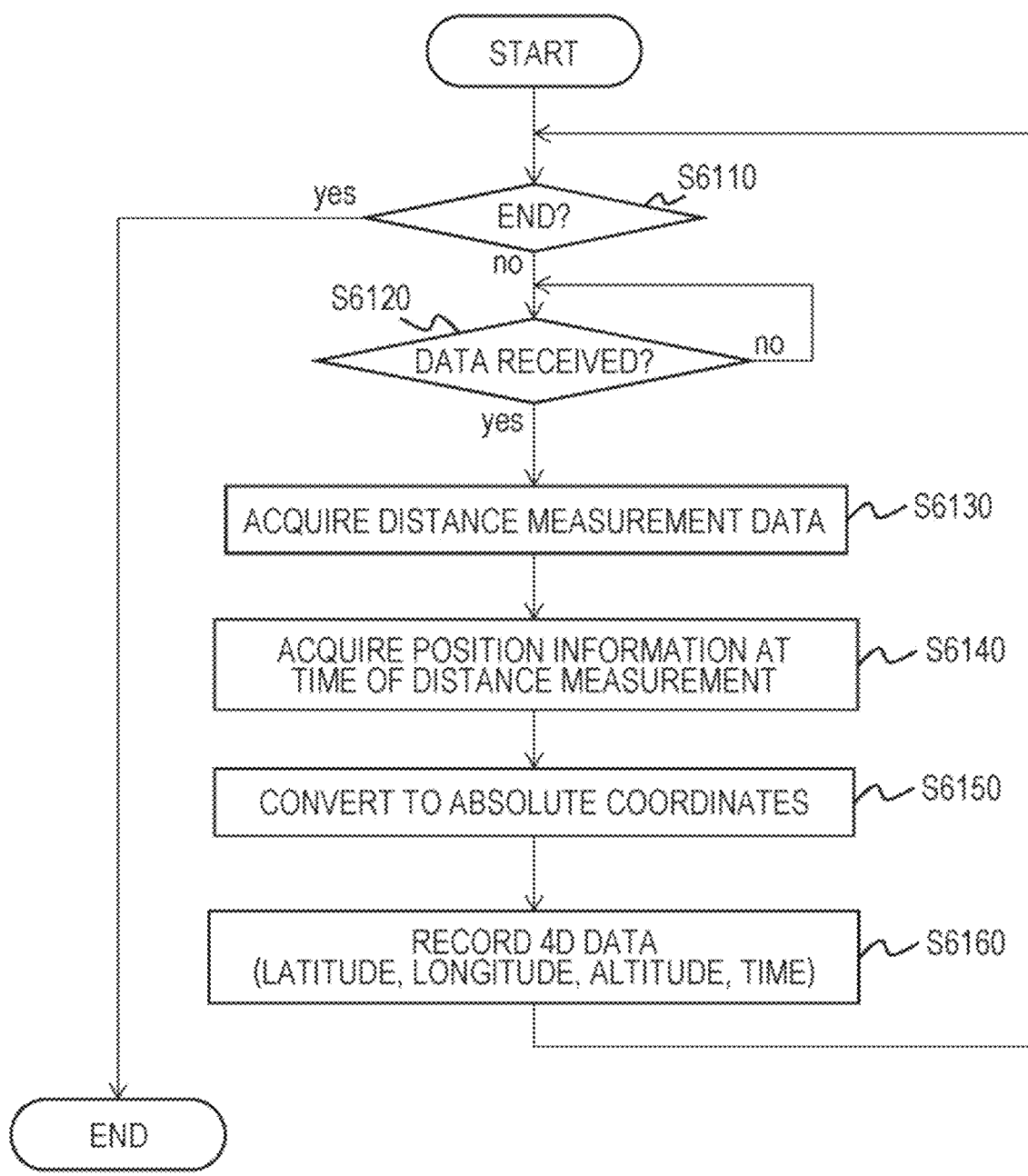
FIG. 46 is a flowchart illustrating an example of operations by a server in the traffic information system.

FIG. 46 is a flowchart illustrating an example of operations by the server 500. The processor 520 of the server 500 executes the operations from step S6110 to step S6160 illustrated in FIG. 46. With this arrangement, the processor 520 generates point cloud data expressed in one four-dimensional coordinate system, namely a coordinate system obtained by adding time to three-dimensional positional coordinates, on the basis of successively acquired point cloud data or depth map data and time data for each point. Hereinafter, the operation in each step will be described.

(Step S6110)

First, the server 500 determines whether or not an end signal is present or absent, the end signal containing an instruction to end operations and inputted from an input device not illustrated. In the case where the end signal has been inputted in step S6110, the flow of operations ends. In the case where the end signal has not been inputted in step S6110, the flow proceeds to step S6120.

(Step S6120)

The processor 520 determines whether the communication circuit 560 has received output from a moving body 300 or received output from a stationary system 400. In the case where output has been received from a moving body 300 or a stationary system 400 in step S6120, the flow proceeds to step S6130. In the case where output has not been received from a moving body 300 or a stationary system 400 in step S6120, step S6120 is repeated.

(Step S6130)

The processor 520 acquires the output data from the moving body 300 or the stationary system 400 received by the communication circuit 560 in step S6120.

(Step S6140)

The processor 520 extracts information about the position and direction of the moving body 300 or the stationary system 400 at the time when the distance was measured from the data acquired in step S6130. The information about the position and direction may be GPS information, for example. Additionally, the processor 520 acquires precise time data indicating when the distance was measured. In the case where the data acquired in step S6130 is depth map data, the processor 520 converts the depth map data into point cloud data. For pixels having a valid distance value among the pixels of the depth map, the processor 520 converts the distance value to position coordinates expressed in a coordinate system specific to the moving body 300 or the stationary system 400. The conversion is performed on the basis of the information about the position and direction of the moving body 300 or the stationary system 400.

(Step S6150)

The processor 520 converts the point cloud data expressed in the coordinate system specific to the moving body 300 or the stationary system 400 that was acquired or generated in step S6140 to point cloud data expressed in an absolute coordinate system specific to the server 500. The absolute coordinate system is a three-dimensional coordinate system expressed by latitude, longitude, and altitude, for example. The altitude indicates the height from ground level or sea level. The processor 520 performs the coordinate conversion of the point cloud data on the basis of the position of the moving body 300 or the stationary system 400 in the absolute coordinate system acquired in step S6140. The position of the moving body 300 or the stationary system 400 may be expressed as a latitude, a longitude, and an altitude from ground level, for example. The coordinate system specific to the moving body 300 or the stationary system 400 may include an x-axis parallel to the ground plane, a y-axis parallel to the vertical direction, and a d-axis parallel to the ground plane and perpendicular to the x-axis. The processor 520 converts the coordinates such that the origin of the y-axis matches the height of the moving body 300 or the stationary system 400 and the direction of the d-axis matches the direction of the moving body 300 or the stationary system 400, for example.

(Step S6160)

The processor 520 records, to the recording medium 540, four-dimensional data (latitude, longitude, altitude, time) obtained by adding the data about the precise time of the distance measurement at each point to the three-dimensional data (latitude, longitude, altitude) expressed in the absolute coordinate system generated in step S6160. After step S6160, the flow returns to step S6110.

By repeating steps S6110 to S6160, the server 500 accumulates point cloud data containing information about the precise time expressed as four-dimensional coordinates (latitude, longitude, altitude, time).

The server 500 may receive, from an external device, an instruction requesting the analysis of accident conditions at a specific date and time and a specific place. In this case, the processor 520 acquires data for the specific date, time, and place from the recording medium 540, and generates and outputs data according to the request.

Figure 47:
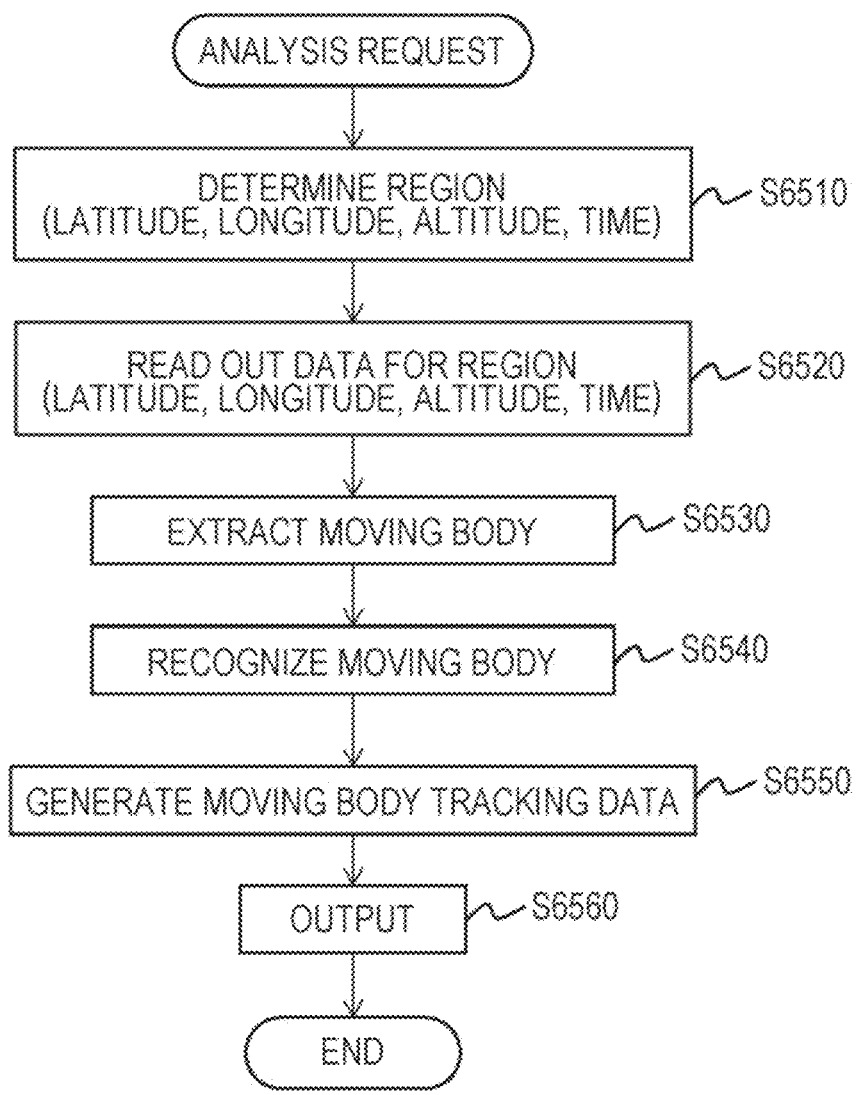
FIG. 47 is a flowchart illustrating an example of operations in the case where a server receives a request to analyze accident conditions in the traffic information system.

FIG. 47 is a flowchart illustrating an example of operations in the case where the server 500 receives a request to analyze accident conditions. The processor 520 in the server 500 outputs data indicating traffic conditions in the requested spatiotemporal region by executing the operations from step S6510 to step S6560 illustrated in FIG. 47. More specifically, the processor 520 extracts the relevant region from the four-dimensional data (latitude, longitude, altitude, time) of the plurality of points stored in the recording medium 540, tracks objects on the basis of the information about positions and precise times within the region, and thereby generates and outputs data indicating the traffic conditions in the spatiotemporal region. Hereinafter, the operation in each step will be described.

(Step S6510)

First, in response to an analysis request signal inputted from an external device, the processor 520 determines a spatiotemporal region to be extracted from the four-dimensional data (latitude, longitude, altitude, time) stored in the recording medium 540. The analysis request signal includes information for narrowing down space and time. For example, the analysis request signal may include information specifying a spatial range, such as information designating a character string indicating an address or a point on a map. The analysis request signal may also include rough time information, such as time information in units of hours or in units of minutes for example, specified by a character string or an input means such as a clock display. The processor 520 specifies a road or facilities similar to a road closest to the inputted position. The processor 520 sets a predetermined range from the specified position, such as the range within a 50 m radius for example, as the spatial region. Additionally, the processor 520 sets a predetermined time range centered on the inputted time, such as the range extending 30 minutes before and after the inputted time for example, as the temporal region.

(Step S6520)

The processor 520 reads out the data of points included in the spatiotemporal region determined in step S6510 from the recording medium 540.

(Step S6530)

The processor 520 extracts a point cloud indicating a moving body from the point cloud expressed by the four-dimensional data (latitude, longitude, altitude, time) read out in step S6520. For example, four-dimensional voxels may be set, and data points inside a voxel for which the number of points inside the voxel varies greatly over time may be treated as the data points of a moving body. As an example of a specific method, first, the space expressed by three dimensions of the four-dimensional spatiotemporal region read out in step S6520 is divided into a plurality of regions. Each region is a voxel 30 cm long on each side, for example. Voxels may be set only in a region excluding a range where buildings are known to exist from map data. Each set voxel is segmented every 500 ms on the time axis for example, and the number of data points existing inside the voxel every 500 ms is acquired. A voxel for which the number of data points varies for each 500 ms time segment is extracted as a voxel containing a moving body. At this point, in the case where the variation in the number of data points is greater than the variation in the number of data points due to noise, the voxel is extracted as a voxel containing a moving body. For example, in the case where the number of data points inside a voxel expressing a specific spatial region is counted every 500 ms, and the minimum value of the number of data points is 30% or less of the maximum value of the number of data points, the voxel may be determined to be a voxel containing a moving body. In the case where a moving body passes through a specific spatial region, the number of data points representing the moving body inside the region gradually increases from 0, reaches a maximum value, and then decreases back to 0. Even in the case where a moving body does not exist, a point cloud may exist due to a still object or noise. For this reason, the presence or absence of a moving body can be determined on the basis of the change over time in the number of data points inside a voxel expressing a specific region.

(Step S6540)

For the regions of all spatial voxels extracted as voxels containing a moving body in step S6530, the processor 520 generates a distribution of data points acquired in a 30 ms span every 30 ms, for example. The data distribution is clustered every 30 ms, and a recognition process is performed on each cluster. On the basis of properties such as the position, size, and movement speed of a cluster, each cluster is recognized as corresponding to one of an automobile, a bicycle, or a person, for example.

(Step S6550)

The processor 520 generates tracking data for each cluster recognized as an automobile, a bicycle, or a person from among the clusters of moving bodies recognized in step S6540. The tracking data may be four-dimensional point cloud data combining information about a region that the point cloud of the cluster occupies in three-dimensional space with the information about the precise time read out in step S6520.

(Step S6560)

The processor 520 outputs the tracking data generated in step S6550. The tracking data may be transmitted to a display device used by the user who inputted the analysis request signal, or to the external system that inputted the analysis request signal.

As above, the processor 520 extracts partial point cloud data corresponding to the spatiotemporal region specified by the analysis request signal from the combined point cloud data. The processor 520 also extracts point cloud data corresponding to one or more moving bodies from the combined point cloud data. In addition, the processor 520 generates tracking data expressing the temporal change in the position of each moving body. The processor 520 may configure the extracted point cloud data as the data of a plurality of frames sampled at a predetermined period.

Through the above operations, the position of a moving body such as an automobile, a bicycle, or a person can be specified with precise time resolution in units of microseconds, for example. With this arrangement, in the case where a collision accident between moving bodies occurs, for example, information such as the accurate position, movement direction, and movement speed of each moving body at the time of collision can be verified after the fact. Through such verification of the precise movements of the moving bodies, it is possible to identify the cause of the accident and improve compliance with regard to decisions such as the proportion of responsibility by the persons involved, for example.

[Supplement]

(1) The above embodiments describe the case of generating point cloud data by using distance data measured by a plurality of distance measurement apparatuses and time information attached to the distance data as an example of a process for combining the distance data measured by the distance measurement apparatuses. However, the signal processing using output data is not limited to a process for combining the above distance data. The signal processing using output data may be performed by the server 500 in FIG. 2 or by a signal processing circuit provided in the moving body 300 or the stationary system 400. The signal processing using output data may also be processed by the signal processing circuit 160 provided in the distance measurement apparatus 100 or 100A.

(2) The above embodiments give an example of the case where measurement time information is attached to distance data or three-dimensional point cloud data measured by emitting a light beam. However, the distance data or three-dimensional point cloud data to which the measurement time information is attached may also be data measured by a distance measurement apparatus having a different configuration from the distance measurement apparatus described in the above embodiments. For example, the data may also be data measured by a distance measurement apparatus that measures distance by using radio waves such as millimeter waves, or data measured by a distance measurement apparatus that measures distance by using a two-dimensional image acquired by one or multiple cameras.

Also, with regard to data measured by a distance measurement apparatus that measures distance by using radio waves such as millimeter waves, a plurality of distance measurement data or three-dimensional point cloud data generated from a signal received by one or a plurality of receiving antennas on the basis of a radio-wave beam emitted from one or a plurality of transmitting antennas at the same time may be stored as a single block. In this case, measurement time information such as the emission time of the radio-wave beam or the reception time of a reflected beam may be attached to the data for each block.

In this way, the method and device for generating distance measurement data described in the embodiments of the present disclosure are applicable to any active distance measurement system that measures distance by emitting electromagnetic waves, such as light or radio waves for example. According to the present configuration, time information in smaller units of data is attached to the output data compared to the case of attaching singular measurement time information to distance measurement data or point cloud data for the entire region targeted for distance measurement. Consequently, in the case of using the output data to execute signal processing such as combining the output data with other data, effects such as simplifying the processing and improving the quality or reliability of the processing result can be obtained. Furthermore, the distance data or three-dimensional point cloud data for a plurality of points acquired by emitting one or a plurality of beams may be treated as blocks, and measurement time information may be attached to each block. With this arrangement, the output data can be reduced in size compared to the case of attaching measurement time information in finer units of data, such as in units of pixels for example.

The technology according to the present disclosure is broadly usable in apparatuses and systems that measure distance. For example, the technology according to the present disclosure may be used as a component of a light detection and ranging (LiDAR) system.

What is claimed is:

1. A distance measurement apparatus comprising:
a light emitter that emits a plurality of light beams toward a scene in different directions and at different timings;
a light receiver that includes an array of a plurality of light-receiving elements, and detects reflected light from the scene produced by the emission of each light beam with the plurality of light-receiving elements; and
a signal processing circuit that generates and outputs output data including measurement data indicating positions or distances of a plurality of points in the scene on a basis of a signal outputted by the light receiver, wherein
the output data includes a plurality of data sets, and individual time data is attached to each of the plurality of data sets, and
each of the plurality of data sets includes a plurality of data points representing the measurement data of each of the plurality of points in the scene, measured using the same light beam from among the plurality of light beams.

2. The distance measurement apparatus according to claim 1, wherein
the time data attached to each of the plurality of data sets indicates a time at which the light beam for a corresponding one of the plurality of data sets from among the plurality of light beams was emitted.

3. The distance measurement apparatus according to claim 1, wherein
the time data attached to each of the plurality of data sets indicates a time at which reflected light of the light beam for a corresponding one of the plurality of data sets from among the plurality of light beams was received by one of the plurality of light-receiving elements.

4. The distance measurement apparatus according to claim 1, wherein
the light emitter varies a parameter of the emitted plurality of light beams including at least one of a shape or a diameter of the emitted plurality of light beams, and
a number or range of the plurality of points belonging to each of the plurality of data sets is different according to the parameter of a light beam for a corresponding one of the plurality of data sets.

5. The distance measurement apparatus according to claim 1, wherein
the plurality of data sets includes two or more data sets that share the time data.

6. The distance measurement apparatus according to claim 1, wherein
the signal processing circuit generates point cloud data including information about three-dimensional coordinates of the plurality of points as the output data.

7. The distance measurement apparatus according to claim 1, wherein the signal processing circuit generates depth map data expressing a distance distribution of the plurality of points as the output data.

8. The distance measurement apparatus according to claim 1, wherein
the time data expresses time in units of microseconds or in units of nanoseconds.

9. The distance measurement apparatus according to claim 1, wherein the output data includes a plurality of frames, and the plurality of data sets are included in single frame of the output data.

10. An information processing method comprising:
acquiring first output data and second output data, the first output data including first measurement data indicating positions or distances of a plurality of points in a scene and including a plurality of data sets that each include the first measurement data for a subset of points from among the plurality of points, with individual time data attached to each of the plurality of data sets, and the second output data including second measurement data indicating positions or distances of another plurality of points in the scene, with time data attached to the second measurement data for each of the other plurality of points; and
generating three-dimensional point cloud data by respectively extracting, from the first output data and the second output data, the first measurement data for one or more points and the second measurement data for one or more points having time data included within a predetermined time range, and combining the extracted data into the same coordinate system,
wherein each of the plurality of data sets includes a plurality of data points representing the measurement data of each of the plurality of points in the scene.

11. The information processing method according to claim 10, wherein
the combining includes merging data from the first measurement data and the second measurement data that overlap each other in a spatiotemporal region on a basis of a confidence level of the first measurement data and a confidence level of the second measurement data.

12. The information processing method according to claim 11, wherein
the confidence level is determined on a basis of at least one selected from the group consisting of:
(a) at least one of a movement speed of a first measurement apparatus that generated the first measurement data or a movement speed of a second measurement apparatus that generated the second measurement data,
(b) a relationship between a position and an attitude of at least one of the first measurement apparatus or the second measurement apparatus, and a direction of the sun,
(c) at least one of a spatial density of the plurality of points expressed by the first measurement data or a spatial density of the other plurality of points expressed by the second measurement data, and
(d) a relationship between at least one of the positions of the plurality of points expressed by the first measurement data or the positions of the other plurality of points expressed by the second measurement data, and a position of one or more structures indicated by map data.

13. The information processing method according to claim 9, wherein
at least one of the first measurement apparatus that measured the first measurement data or the second measurement apparatus that measured the second measurement data is installed in a moving body, the combining is executed by an information processing apparatus provided in a stationary object or in communication with the stationary object, and in a case where the moving body is positioned within a predetermined distance range from the stationary object, the information processing apparatus acquires the measurement data from at least one of the first measurement apparatus or the second measurement apparatus.

14. The information processing method according to claim 10, further comprising:

extracting, in response to an analysis request signal, partial three-dimensional point cloud data from the combined three-dimensional point cloud data that corresponds to a spatiotemporal region designated by the analysis request signal.

15. The information processing method according to claim 14, wherein the extracting includes configuring the partial three-dimensional point cloud data as the data of a plurality of frames sampled at a predetermined period.

16. The information processing method according to claim 14, wherein the extracting includes extracting point cloud data corresponding to a moving body from among the three-dimensional point cloud data, and the method further comprises generating tracking data expressing a temporal change in the position of the moving body.

17. An information processing apparatus comprising:

a processor executing a process to:

acquire first output data and second output data, the first output data including first measurement data indicating positions or distances of a plurality of points in a scene and including a plurality of data sets that each include the first measurement data for a subset of points from among the plurality of points, with individual time data attached to each of the plurality of data sets, and the second output data including second measurement data indicating positions or distances of another plurality of points in the scene, with time data attached to the second measurement data for each of the other plurality of points; and generate three-dimensional point cloud data by respectively extracting, from the first output data and the second output data, the first measurement data for one or more points and the second measurement data for one or more points having time data included within a predetermined time range, and combining the extracted data into the same coordinate system, wherein each of the plurality of data sets includes a plurality of data points representing the measurement data of each of the plurality of points in the scene.

18. An information processing apparatus comprising:

a processor executing a process to:

acquire light reception data generated at different timings by a light receiver including an array of a plurality of light-receiving elements;

generate measurement data indicating positions or distances of a plurality of points in a scene on a basis of the light reception data; and generate and output, on a basis of the measurement data, output data including a plurality of data sets, with individual time data attached to each of the plurality of data sets, wherein each of the plurality of data sets includes a plurality of data points representing the measurement data of each of the plurality of points in the scene, measured using the same light beam.

* * * * *

UNITED STATES PATENT AND TRADEMARK OFFICE
CERTIFICATE OF CORRECTION

| | | |
|---|---|---|
| PATENT NO. | : 12,146,966 B2 | Page 1 of 1 |
| APPLICATION NO. | : 17/529239 | |
| DATED | : November 19, 2024 | |
| INVENTOR(S) | : Yumiko Kato et al. | |

It is certified that error appears in the above-identified patent and that said Letters Patent is hereby corrected as shown below:

In the Claims

In Claim 13, Column 62, Line 65, the referenced claim number "9" should be replaced with --10--.

Signed and Sealed this
Seventh Day of January, 2025

Derrick Brent
*Acting Director of the United States Patent and Trademark Office*